US012732826B2

(12) United States Patent
Furuichi

(10) Patent No.: US 12,732,826 B2
(45) Date of Patent: Sep. 8, 2026

(54) COMMUNICATION CONTROL DEVICE, COMMUNICATION DEVICE, COMMUNICATION CONTROL METHOD, AND COMMUNICATION METHOD

(71) Applicant: SONY GROUP CORPORATION, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 248 days.

(21) Appl. No.: 18/698,791

(22) PCT Filed: Oct. 5, 2022

(86) PCT No.: PCT/JP2022/037215
§ 371 (c)(1),
(2) Date: Apr. 5, 2024

(87) PCT Pub. No.: WO2023/063181
PCT Pub. Date: Apr. 20, 2023

(65) Prior Publication Data

US 2025/0240639 A1 Jul. 24, 2025

(30) Foreign Application Priority Data

Oct. 13, 2021 (JP) ................................ 2021-168178

(51) Int. Cl.

| | |
|---|---|
| ***H04W 16/14*** | (2009.01) |
| ***H04W 72/02*** | (2009.01) |
| ***H04W 72/0457*** | (2023.01) |

(52) U.S. Cl.
CPC .......... *H04W 16/14* (2013.01); *H04W 72/02* (2013.01); *H04W 72/0457* (2023.01)

(58) Field of Classification Search
CPC . H04W 16/14; H04W 72/02; H04W 72/0457; H04W 28/0236; H04W 28/0263; H04W 4/44
See application file for complete search history.

(56) References Cited

U.S. PATENT DOCUMENTS

| | | | | |
|---|---|---|---|---|
| 2020/0305159 | A1* | 9/2020 | Raghothaman | ... H04W 72/0453 |
| 2021/0258870 | A1* | 8/2021 | Yamakawa | ........... H04W 76/18 |
| 2023/0085580 | A1* | 3/2023 | Kakishima | ............ H04L 5/0053 370/329 |

FOREIGN PATENT DOCUMENTS

| | | | | |
|---|---|---|---|---|
| CA | 3169115 | A1 * | 10/2021 | .......... H04W 72/566 |
| EP | 3065459 | A1 * | 9/2016 | ............ H04W 28/18 |

(Continued)

OTHER PUBLICATIONS

S. V. Swamy, G. N. Srinivasan and R. Rashmi, "Study of Redundancy with Domain Proxy for Citizen Broadband Radio Service in 5G Network," 2020 Second International Conference on Inventive Research in Computing Applications (ICIRCA), Coimbatore, India , 2020, pp. 875-880, (Year: 2020).*

(Continued)

*Primary Examiner* — Phirin Sam
*Assistant Examiner* — Louis Samara
(74) *Attorney, Agent, or Firm* — CHIP LAW GROUP

(57) ABSTRACT

A communication control device includes: an acquisition unit configured to acquire a request to allow a communication device configuring a second radio system to secondarily use at least a part of a frequency band used by a first radio system, the request including information on at least one basic zone related to a basic operation of the communication device and information on at least one extension zone obtained by extending the basic zone; a first determination unit configured to perform a first determination related to the information on the basic zone; a second determination unit (Continued)

configured to perform a second determination related to the information on the extension zone; and a notification unit configured to notify the second radio system of a first response corresponding to the first determination and a second response corresponding to the second determination by enclosing the first response and the second response in one message.

20 Claims, 40 Drawing Sheets

(56) References Cited

FOREIGN PATENT DOCUMENTS

| | | | | |
|---|---|---|---|---|
| EP | 3849229 A1 * | 7/2021 | .......... | H04W 72/541 |
| EP | 4221298 A1 | 8/2023 | | |
| JP | WO2014185185 A1 * | 2/2017 | .......... | H04W 72/542 |
| WO | WO-2020049992 A1 * | 3/2020 | .......... | H04W 72/541 |
| WO | WO-2020137915 A1 * | 7/2020 | ............ | H04W 16/14 |
| WO | 2020/262266 A1 | 12/2020 | | |
| WO | 2021/192869 A1 | 9/2021 | | |
| WO | WO-2021200237 A1 * | 10/2021 | ............ | H04W 16/14 |
| WO | WO-2022065104 A1 * | 3/2022 | ............ | H04W 16/14 |

OTHER PUBLICATIONS

Markus Mueck; María Dolores (Lola) Pérez Guirao; Rao Yallapragada; Srikathyayani Srikanteswara, "Regulation and Standardization Activities Related to Spectrum Sharing," in Spectrum Sharing: The Next Frontier in Wireless Networks , IEEE, 2019 , pp. 17-33, doi: 10.1002/9781119551539.ch2 (Year: 2019).*

S. -Y. Liu, H. -S. Lin and C. -Y. Huang, "Design and Implement Domain Proxy based CBRS System for 5G," 2019 IEEE VTS Asia Pacific Wireless Communications Symposium (APWCS), Singapore, 2019, pp. 1-6, doi: 10.1109/VTS-APWCS.2019.8851654 (Year: 2019).*

International Search Report and Written Opinion of PCT Application No. PCT/JP2022/037215, issued on Dec. 13, 2022, 09 pages of ISRWO.

"CBRS Certified Professional Installer Accreditation Technical Specification", WINNF-TS-0247, Version V1.5.0, Oct. 27, 2020, 19 pages.

"Signaling Protocols and Procedures for Citizens Broadband Radio Service (CBRS): Spectrum Access System (SAS)—Citizens Broadband Radio Service Device (CBSD) Interface Technical Specification", WINNF-TS-0016-V1.2.6, Nov. 25, 2020, 60 pages.

ECC Report 186, "Technical and operational requirements for the operation of white space devices under geo-location approach", Jan. 2013, 181 pages.

"White Space Database Provider (WSDB) Contract", Subject to contract—Not complete, Feb. 12, 2015, 125 pages.

"Signaling Protocols and Procedures for Citizens Broadband Radio Service (CBRS): Spectrum Access System (SAS)—SAS Interface Technical Specification", WINNF-TS-0096, Version 1.3.2, Mar. 11, 2020, 44 pages.

"Requirements for Commercial Operation in the U.S. 3550-3700 MHZ Citizens Broadband Radio Service Band", WINNF-TS-0112, Version V1.9.1, Mar. 11, 2020, 81 pages.

"Test and Certification for Citizens Broadband Radio Service (CBRS); Conformance and Performance Test Technical Specification; SAS as Unit Under Test (UUT)", WINNF-TS-0061, Version V1.5.1, Oct. 7, 2019, 196 pages.

"Spectrum Sharing Committee Policy and Procedure Coordinated Periodic Activities Policy", WINNF-SSC-0008-V1.3.0, 2018, 03 pages.

"Operations for Citizens Broadband Radio Service (CBRS); GAA Spectrum Coordination—Approach 2", WINNF-TR-2004, Version V1.0.0, May 16, 2019, 20 pages.

"Signaling Protocols and Procedures for Citizens Broadband Radio Service (CBRS); Extensions to Spectrum Access System (SAS)—Citizens Broadband Radio Service Device (CBSD) Interface Technical Specifications (Release 2)" WINNF-TS-3002-V1.2.1.

CBRS Alliance, "CBRS Coexistence Technical Specifications", CBRSA-TS-2001, V3.0.0, Feb. 18, 2020, 35 pages.

Wi-Fi Alliance, "AFC System to AFC Device Interface Specification", Version 1.0, 2021, 22 pages.

Anonymous: "Signaling Protocols and Procedures for Citizens Broadband Radio Service (CBRS): Extensions to Spectrum Access System (SAS)—Citizens Broadband Radio Service Device (CBSD) Interface Technical Specification (Release 2)" Mar. 5, 2020 (Mar. 5, 2020).

* cited by examiner

1
PRIMARY SYSTEM
ALLOWABLE INTERFERENCE AMOUNT $I_{accept}$
RECEIVED INTERFERENCE AMOUNT $I_1+I_2+I_3$ ($\leq I_{accept}$)
$10_1$
2
ALLOCATED INTERFERENCE AMOUNT $I_1$ ($\leq I_{accept}/3$)
ALLOCATED INTERFERENCE AMOUNT $I_2$ ($\leq I_{accept}/3$)
$40_1$
ALLOCATED INTERFERENCE AMOUNT $I_3$ ($\leq I_{accept}/3$)
SECONDARY SYSTEM
$40_2$
$40_3$

FIG.8

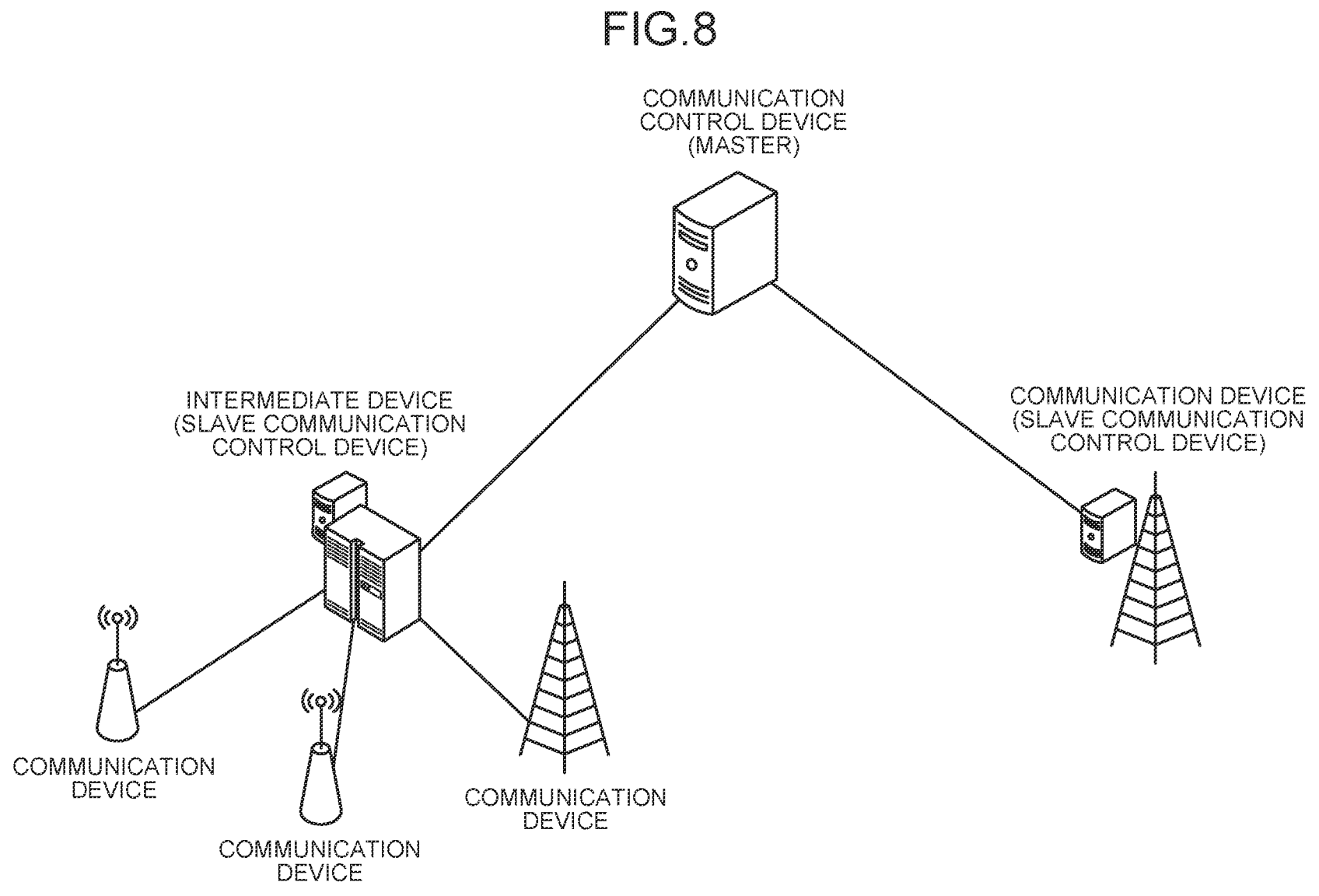

COMMUNICATION CONTROL DEVICE (MASTER)

COMMUNICATION DEVICE (SLAVE COMMUNICATION CONTROL DEVICE)

INTERMEDIATE DEVICE (SLAVE COMMUNICATION CONTROL DEVICE)

COMMUNICATION DEVICE

COMMUNICATION DEVICE

COMMUNICATION DEVICE

1
$10_1$
PROTECTION POINT
AGGREGATED INTERFERENCE
PROTECTION AREA
2
$40_7$
$40_8$
$40_9$
$40_{10}$
$40_{11}$
$60_3$
$60_4$ 1
2
10₂
40₇
40₈
40₉
40₁₀
40₁₂
60₃
60₄

Transmission bandwidth configuration $N_{RB}$ in E-UTRA channel bandwidths

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Minimum guardband (kHz) (FR1)

| SCS (kHz) | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|
| 15 | 242.5 | 312.5 | 382.5 | 452.5 | 522.5 | 592.5 | 552.5 | 692.5 | N.A | N.A | N.A | N.A | N.A |
| 30 | 505 | 665 | 645 | 805 | 785 | 945 | 905 | 1045 | 825 | 965 | 925 | 885 | 845 |
| 30 | N.A | 1010 | 990 | 1330 | 1310 | 1290 | 1610 | 1570 | 1530 | 1490 | 1450 | 1410 | 1370 |

FIG.24

Minimum guardband (kHz) (FR2)

| SCS (kHz) | 50MHz | 100MHz | 200MHz | 400MHz |
|---|---|---|---|---|
| 60 | 1210 | 2450 | 4930 | N.A |
| 120 | 1900 | 2420 | 4900 | 9860 |

FIG.25

Minimum guardband (kHz) of SCS 240 kHz SS/PBCH block (FR2)

| SCS (kHz) | 100MHz | 200MHz | 400MHz |
|---|---|---|---|
| 240 | 3800 | 7720 | 15560 |

FIG.36

AFC Methods

| $METHOD | Request message | Response message |
|---|---|---|
| availableSpectrumInquiry | Available Spectrum Inquiry Request message | Available Spectrum Inquiry Response message |
| vendorExtensions | Standalone Vendor Extension message optionally defined by vendor(s). Vendor specific version if it exists, may be indicated in this message. | |

FIG.37

AvailableSpectrumInquiryRequestMessage object

| Fields | Presence | Descriptions |
|---|---|---|
| NAME: version<br>DATA TYPE: string | R | The version number of the AvailableSpectrumInquiryRequest. The string shall be parsed as two non-negative integers separated by a decimal point, for example, n.m. The integer value to the left of the decimal point (n) is the major version number, and the integer value to the right of the decimal point (m) is the minor version number. |
| NAME:availableSpectrumInquiryRequests<br>DATA TYPE: array of object: AvailableSpectrumInquiryRequest | R | This field represents Available Spectrum Inquiry Request for one or more APs or Fixed Client Devices. |
| NAME: vendorExtensions<br>DATA TYPE: array of object: VendorExtension | O | This field contains optional vendor extensions. |

FIG.38

AvailableSpectrumInquiryRequest object

| Fields | Presence | Descriptions |
|---|---|---|
| NAME: requestId<br>DATA TYPE: string | R | Unique ID to identify an instance of an Available Spectrum Inquiry request. The value shall be unique within the request message. |
| NAME: deviceDescriptor<br>DATA TYPE: object: DeviceDescriptor | R | This field contains the information of an AP or Fixed Client Device. |
| NAME: location<br>DATA TYPE: object: Location | R | This field describes the geographic area within which the AP or Fixed Client Device is located, including location uncertainty. |
| NAME: inquiredFrequencyRange<br>DATA TYPE: array of object: FrequencyRange | CR | This field contains one or more frequency ranges for which the AP or Fixed Client Device is requesting spectrum availability. One or both of inquiredFrequencyRange and inquiredChannels shall be present. If inquiredFrequencyRange is present, it indicates that the AFC System is to provide spectrum availability on the basis of frequency. |
| NAME: inquiredChannels<br>DATA TYPE: array of object: Channels | CR | This field contains one or more lists of channels for which the AP or Fixed Client Device is requesting spectrum availability. One or both of inquiredFrequencyRange and inquiredChannels shall be present. If inquiredChannels is present, it indicates that the AFC System is to provide spectrum availability on the basis of channels. |
| NAME: minDesiredPower<br>DATA TYPE: number | O | This field contains the minimum desired EIRP in units of dBm. This field is optionally present in a query by inquiredChannels; otherwise it is absent. If a query by inquiredChannels is performed and this field is absent, the AFC is to provide a response for all inquiredChannels. |
| NAME: vendorExtensions<br>DATA TYPE: array of object: VendorExtension | O | This field contains optional vendor extensions. |

FIG.39

VendorExtension object

| Fields | Presence | Descriptions |
|---|---|---|
| NAME: extensionId<br>DATA TYPE: string | R | This field identifies the vendor and field type of a vendor extension. The format and content of the extensionId field is defined by the vendor. |
| NAME: parameters<br>DATA TYPE: any | R | This field contains the payload as specified by the vendor extension identified by the extensionId field. It may be defined using any JSON primitive or structured data type. |

FIG.40

```
{
  "version" : "1.0",
  "availableSpectrumInquiryRequests":
  [
    {
      "requestId": "11235813",
      "deviceDescriptor":
      {
        "serialNumber": "ABCDEFG",
        "certificationId": "EFGHIJK",
        "rulesetId": "47_CFR_PART_15_SUBPART_E"
      },
      "location":
      {
        "ellipse":
        {
          "center":
          {
            "longitude": 37.425056,
            "latitude": -122.984157
          },
          "majorAxis": 100,
          "minorAxis": 50,
          "orientation": 70
        },
        "height": 3.0,
        "verticalUncertainty": 2,
        "indoorDeployment": 2
      },
      "inquiredFrequencyRange":
      [
        {
          "lowFrequency": 5925,
          "highFrequency": 6425
        }
      ],
      "inquiredChannels":
      [
        {
          "globalOperatingClass": 133
        },
        {
          "globalOperatingClass" : 134,
          "channelCfi": [15, 47, 79]
        }
      ],
      "minDesiredPower": 24
    }
  ],
  "vendorExtensions":
  [
    {

    },
    {

    }
  ]
}
```

```
{
  "version" : "1.0",
  "availableSpectrumInquiryRequests":
  [
    {
      "requestId": "11235813",
      "deviceDescriptor":
      {
        "serialNumber": "ABCDEFG",
        "certificationId": "EFGHIJK",
        "rulesetId": "47_CFR_PART_15_SUBPART_E"
      },
      "location":
      {
        "ellipse":
        {
          "center":
          {
            "longitude": 37.425056,
            "latitude": -122.984157
          },
          "majorAxis": 100,
          "minorAxis": 50,
          "orientation": 70
        },
        "height": 3.0,
        "verticalUncertainty": 2,
        "indoorDeployment": 2
      },
      "inquiredFrequencyRange":
      [
        {
          "lowFrequency": 5925,
          "highFrequency": 6425
        }
      ],
      "inquiredChannels":
      [
        {
          "globalOperatingClass": 133
        },
        {
          "globalOperatingClass" : 134,
          "channelCfi": [15, 47, 79]
        }
      ],
      "minDesiredPower": 24,
      "vendorExtensions":
      [
        {

        },
        {

        }
      ]
    }
  ]
}
```

AvailableSpectrumInquiryResponseMessage object

| Fields | Presence | Descriptions |
| --- | --- | --- |
| NAME: version<br>DATA TYPE: string | R | The version number of the AvailableSpectrumInquiryRequest. The string shall be parsed as two non-negative integers separated by a decimal point, for example, n.m. The integer value to the left of the decimal point (n) is the major version number, and the integer value to the right of the decimal point (m) is the minor version number. |
| NAME: availableSpectrumInquiryResponses<br>DATA TYPE: array of object: AvailableSpectrumInquiryResponse | R | This field contains Available Spectrum Inquiry Responses for one or more APs or Fixed Client Devices. |
| NAME: vendorExtensions<br>DATA TYPE: array of object: VendorExtension | O | This field contains optional vendor extensions. |

FIG.43

AvailableSpectrumInquiryResponse object

| Fields | Presence | Descriptions |
| --- | --- | --- |
| NAME: requestId<br>DATA TYPE: string | R | Unique ID to identify an instance of an Available Spectrum Inquiry request. The value shall be same as provided in the corresponding AvailableSpectrumInquiryRequest object. |
| NAME: availableFrequencyInfo<br>DATA TYPE: array of object: AvailableFrequencyInfo | CR | This field contains the maximum EIRP levels for each of the requested frequency ranges. This field shall be included if and only if availability was requested on a frequency basis and the Response Code definitionsindicates SUCCESS. |
| NAME: availableChannelInfo<br>DATA TYPE: array of object: AvailableChannelInfo | CR | This field contains zero or more available channels and their corresponding maximum EIRP levels. This field shall be included if and only if availability was requested on a channel basis and the Response Code definitionsindicated SUCCESS.<br>NOTE - If the array size is zero, it indicates that none of the requested channels are available for the AP or Fixed Client Device at or above the requested minimum power. |
| NAME: availabilityExpireTime<br>DATA TYPE: string | CR | This field contains the time when the spectrum availability specified in the response expires.<br>This field shall be included if and only if the Response Code definitionsindicates SUCCESS.<br>The string value shall be represented with UTC and conformant with the following format:<br>FORMAT: YYYY-MM-DDThh:mm:ssZ |
| NAME: response<br>DATA TYPE: object: Response | R | This field contains information on the outcome of the Available Spectrum Inquiry. |
| NAME: vendorExtensions<br>DATA TYPE: array of object: VendorExtension | O | This field contains optional vendor extensions. |

FIG.44

Response Code definitions

| Response Code value | Presence | Name | Interpretation |
|---|---|---|---|
| -1 | R | GENERAL FAILURE | Non-specified failure |
| 0 | R | SUCCESS | The request is approved by the AFC System. |
| 100 | O | VERSION_NOT_SUPPORTED | Incompatible interface version number. The AFC System and/or the AFC Device do not support the indicated interface version. |
| 101 | O | DEVICE_DISALLOWED | This specific device as identified by the combination of its FCC ID and unique manufacturer's serial number is not allowed to operate under AFC System control due to regulatory action or other action. |
| 102 | O | MISSING_PARAM | One or more fields required to be included in the request are missing. |
| 103 | O | INVALID_VALUE | One or more fields have an invalid value. |
| 106 | O | UNEXPECTED_PARAM | Unknown parameter found, or conditional parameter found, but condition is not met. |
| 300 | O | UNSUPPORTED_SPECTRUM | The frequency range indicated in the Available Spectrum Inquiry Request message is at least partially outside of the frequency band under the management of the AFC System (e.g., 5.925-6.425 GHz and 6.525-6.875 GHz bands in the US). |

FIG.45

```
{
  "version": "1.0",
  "availableSpectrumInquiryResponses":
  [
    {
      "requestId": "11235813",
      "availableFrequencyInfo" :
      [
        {
          "frequencyRange" :
          {
            "lowFrequency" : 5925,
            "highFrequency" : 6020
          },
          "maxPSD" : 23.0
        },
        {
          "frequencyRange" :
          {
            "lowFrequency" : 6020,
            "highFrequency" : 6050
          },
          "maxPSD" : 1.0
        }
      ],
      "availableChannelInfo" :
      [
        {
          "globalOperatingClass" : 133,
          "channelCfi" : [7, 39, 55, 71, 135, 151, 167],
          "maxEirp" : [27.8, 36, 36, 36, 36, 33.0, 36]
        },
        {
          "globalOperatingClass" : 134,
          "channelCfi" : [47],
          "maxEirp" : [36]
        }
      ],
      "availabilityExpireTime" : "2020-11-03T13:34:05Z",
      "response" :
      {
          "responseCode" : 0,
          "shortDescription" : "Success."
      }
    }
  ],
  "vendorExtensions":
  [
    {

    },
    {

    }
  ]
}
```

```
{
  "version": "1.0",
  "availableSpectrumInquiryResponses":
  [
    {
      "requestId": "11235813",
      "availableFrequencyInfo" :
      [
        {
          "frequencyRange" :
          {
            "lowFrequency" : 5925,
            "highFrequency" : 6020
          },
          "maxPSD" : 23.0
        },
        {
          "frequencyRange" :
          {
            "lowFrequency" : 6020,
            "highFrequency" : 6050
          },
          "maxPSD" : 1.0
        }
      ],
      "availableChannelInfo" :
      [
        {
          "globalOperatingClass" : 133,
          "channelCfi" : [7, 39, 55, 71, 135, 151, 167],
          "maxEirp" : [27.8, 36, 36, 36, 36, 33.0, 36]
        },
        {
          "globalOperatingClass" : 134,
          "channelCfi" : [47],
          "maxEirp" : [36]
        }
      ],
      "availabilityExpireTime" : "2020-11-03T13:34:05Z",
      "response" :
      {
          "responseCode" : 0,
          "shortDescription" : "Success."
      },
      "vendorExtensions":
      [
        {

        },
        {

        }
      ]
    }
  ]
}
```

R12

R22

R221

R222

COMMUNICATION CONTROL DEVICE, COMMUNICATION DEVICE, COMMUNICATION CONTROL METHOD, AND COMMUNICATION METHOD

CROSS REFERENCE TO RELATED APPLICATIONS

This application is a U.S. National Phase of International Patent Application No. PCT/JP2022/037215 filed on Oct. 5, 2022, which claims priority benefit of Japanese Patent Application No. JP 2021-168178 filed in the Japan Patent Office on Oct. 13, 2021. Each of the above-referenced applications is hereby incorporated herein by reference in its entirety.

FIELD

The present disclosure relates to a communication control device, a communication device, a communication control method, and a communication method.

BACKGROUND

A problem of exhaustion of radio wave resources (radio resources) that can be allocated to a radio system (a radio device) has emerged. Therefore, in recent years, "dynamic spectrum access (DSA)" that utilizes a temporal or spatial free space (white space) among frequency bands allocated to a specific radio system has rapidly attracted attention.

An example of the DSA is a citizens broadband radio service (CBRS) standardized by a wireless innovation forum (WINNF). Non Patent Literature 2 discloses a protocol for exchange between a spectrum access system (SAS) and a citizens broadband service device (CBSD).

Another example of the DSA is an automated frequency coordination (AFC) system standardized by Wi-Fi Alliance. Non Patent Literature 12 discloses an interface specification between the AFC system and an AFC device.

CITATION LIST

Non Patent Literature

Non Patent Literature 1: WINNF-TS-0247-V1.5.0 CBRS Certified Professional Installer Accreditation Technical Specification Non Patent Literature 2: WINNF-TS-0016-V1.2.6 Signaling Protocols and Procedures for Citizens Broadband Radio Service (CBRS): Spectrum Access System (SAS)—Citizens Broadband Radio Service Device (CBSD) Interface Technical Specification Non Patent Literature 3: ECC Report 186, Technical and operational requirements for the operation of white space devices under geo-location approach, CEPT ECC, 2013 January Non Patent Literature 4: White Space Database Provider (WSDB) Contract, available at https://www.ofcom.org.uk/_data/assets/pdf_file/0026/84077/white_space_database_contract_for_operational_use_of_wsds.pdf Non Patent Literature 5: WINNF-TS-0096-V1.3.2 Signaling Protocols and Procedures for Citizens Broadband Radio Service (CBRS): Spectrum Access System (SAS)—SAS Interface Technical Specification Non Patent Literature 6: WINNF-TS-0112-V1.9.1 Requirements for Commercial Operation in the U.S. 3550-3700 MHz Citizens Broadband Radio Service Band Non Patent Literature 7: WINNF-TS-0061-V1.5.1 Test and Certification for Citizens Broadband Radio Service (CBRS); Conformance and Performance Test Technical Specification; SAS as Unit Under Test (UUT)

Non Patent Literature 8: WINNF-SSC-0008-V1.3.0 Spectrum Sharing Committee Policy and Procedure Coordinated Periodic Activities Policy Non Patent Literature 9: WINNF-TR-2004-V1.0.0 Operations for Citizens Broadband Radio Service (CBRS); GAA Spectrum Coordination—Approach 2

Non Patent Literature 10: WINNF-TS-3002-V1.2.1 "Signaling Protocols and Procedures for Citizens Broadband Radio Service (CBRS); Extensions to Spectrum Access System (SAS)—Citizens Broadband Radio Service Device (CBSD) Interface Technical Specifications (Release 2)!"

Non Patent Literature 11: CBRSA-TS-2001 V3.0.0, "CBRS Coexistence Technical Specifications", CBRS Alliance Non Patent Literature 12: AFC System to AFC Device Interface Specification Version 1.0, Wi-Fi Alliance

SUMMARY

Technical Problem

Generally, in dynamic spectrum access (DSA), a second radio system (a secondary system) secondarily uses a frequency band preferentially used by a first radio system (a primary system). At this time, a communication control device for dynamically managing the secondary use of the frequency band is disposed. The communication control device gives permission of using the frequency band to a communication device constituting the second radio system. The communication device provides a radio communication service based on permission from the communication control device.

However, there is a possibility that effective use of radio wave resources cannot be achieved with a current method. For example, exchange between the communication control device and the communication device is performed in such a manner that the communication device issues a request to the communication control device and the communication control device responds to the request. At this time, if the exchange between the communication control device and the communication device is not successful, there is a possibility that the effective use of radio wave resources is not achieved due to delay of processing related to use permission of the frequency band, or the like.

Therefore, the present disclosure proposes a communication control device, a communication device, a communication control method, and a communication method capable of achieving effective use of radio wave resources.

It is noted that the above-described problem or object is merely one of a plurality of problems or objects that can be solved or achieved by a plurality of embodiments disclosed in the present specification.

Solution to Problem

In order to solve the above problem, a communication control device according to one embodiment of the present disclosure includes: an acquisition unit configured to acquire a request to allow a communication device configuring a second radio system to secondarily use at least a part of a frequency band used by a first radio system, the request including information on at least one basic zone related to a basic operation of the communication device and information on at least one extension zone obtained by extending the basic zone; a first determination unit configured to perform a first determination related to the information on the basic zone; a second determination unit configured to perform a second determination related to the information on the extension zone; and a notification unit configured to notify the second radio system of a first response corresponding to the first determination and a second response corresponding to the second determination by enclosing the first response and the second response in one message.

BRIEF DESCRIPTION OF DRAWINGS

FIG. 8 is a diagram illustrating another example of the arrangement model of the communication control device.

FIG. 24 is a diagram illustrating the specification of the transmission bandwidth in NR.

FIG. 25 is a diagram illustrating the specification of the transmission bandwidth in NR.

FIG. 36 is a diagram illustrating a procedure included in an AFC system.

FIG. 37 is a diagram illustrating a configuration example of a request message.

FIG. 38 is a diagram illustrating a configuration example of available spectrum inquiry request information.

FIG. 39 is a diagram illustrating a configuration example of vendor extension information.

FIG. 40 is a diagram illustrating a description example of an available spectrum inquiry request message.

FIG. 41 is a diagram illustrating another description example of the available spectrum inquiry request message.

FIG. 42 is a diagram illustrating a configuration example of a response message.

FIG. 43 is a diagram illustrating a configuration example of available spectrum inquiry response information.

FIG. 44 is a diagram illustrating a specific example of a code group of a response code.

FIG. 45 is a diagram illustrating a description example of an available spectrum inquiry response message.

FIG. 46 is a diagram illustrating another description example of the available spectrum inquiry response message.

DESCRIPTION OF EMBODIMENTS

Figure 1:
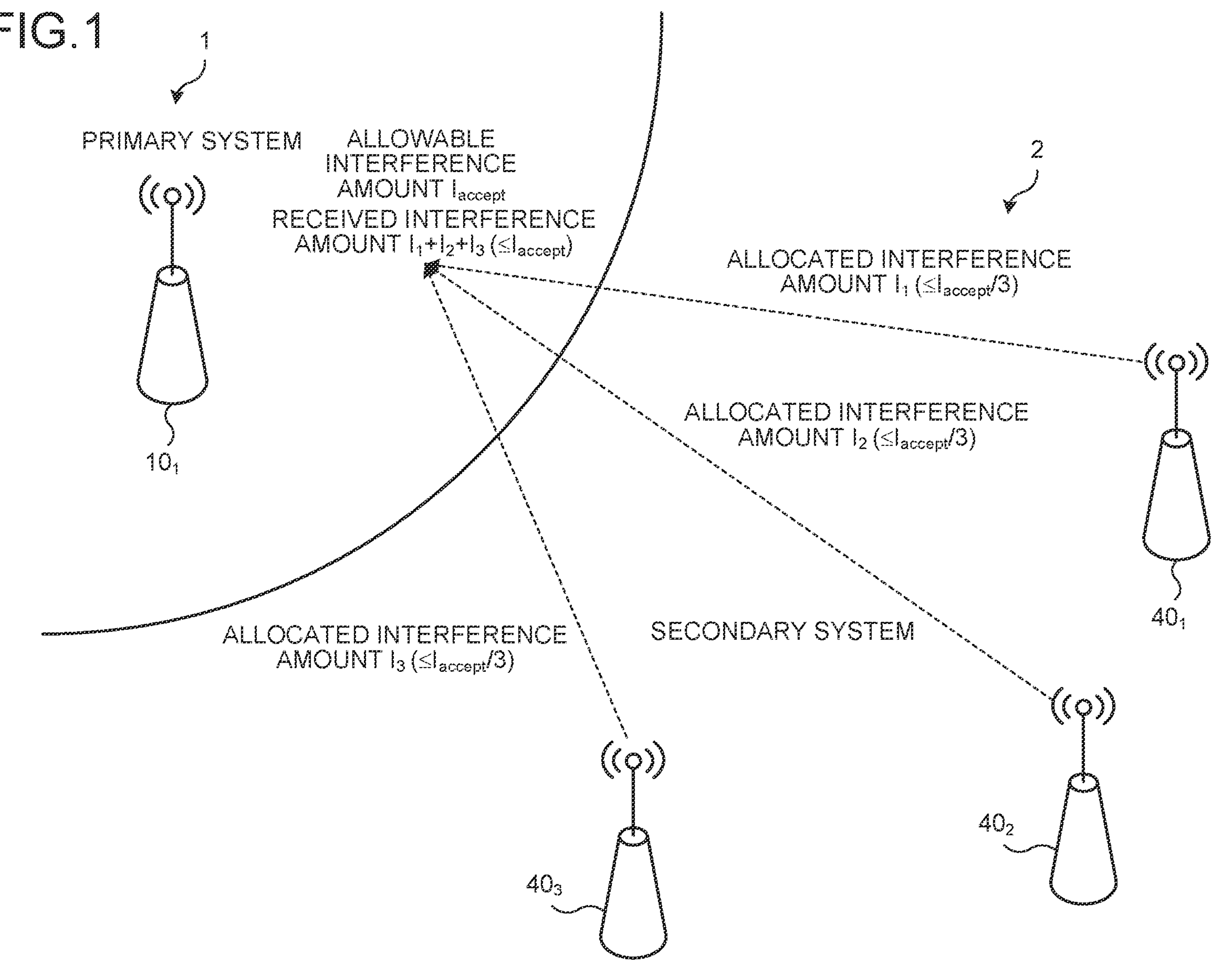
FIG. 1 is an explanatory diagram illustrating an example of allocation of an interference margin to each communication device constituting a secondary system.

Hereinafter, embodiments of the present disclosure will be described in detail with reference to the drawings. It is noted that, in each of the following embodiments, the same parts are denoted by the same reference numerals, and a redundant description thereof will be omitted.

In addition, in the present specification and the drawings, a plurality of components having substantially the same functional configuration may be distinguished by attaching different numbers or alphabets after the same reference numeral. For example, a plurality of configurations having substantially the same functional configuration are distinguished as communication control devices 60$_1$ and 60$_2$ as necessary. Further, a plurality of configurations having substantially the same functional configuration are distinguished as communication systems 2A and 2B as necessary. However, in a case where it is not particularly necessary to distinguish each of the plurality of components having substantially the same functional configuration, only the same reference numeral is attached thereto. For example, in a case where it is not necessary to particularly distinguish the communication control devices 60$_1$ and 60$_2$, the devices are simply referred to as a communication control device 60. Furthermore, in a case where it is not necessary to particularly distinguish the communication systems 2A and 2B, the communication systems 2A and 2B are simply referred to as a communication system 2.

Hereinafter, the present embodiment will be described. It is noted that the present embodiment will be described in the following order of items.

1. Introduction
1-1. Control of radio system for spectrum sharing achievement
1-2. Outline of present embodiment
1-3. Terms of frequency and sharing
2. Configuration of communication system
2-1. Overall configuration of communication system
2-2. Configuration of radio wave use device
2-3. Configuration of management device
2-4. Configuration of terminal device
2-5. Configuration of base station
2-6. Configuration of intermediate device
2-7. Configuration of communication control device
3. Interference model
4. Primary system protection method
4-1. Interference margin simultaneous allocation type
4-2. Interference margin sequential allocation type
5. Description of various procedures
5-1. Registration procedure
5-2. Available spectrum inquiry procedure
5-3. Spectrum grant procedure
5-4. Spectrum use notification
5-5. Supplement of various procedures
5-6. Various procedures related to terminal device
5-7. Procedure occurring between communication control devices
5-8. Information transmission means
5-9. Representative operation flow
6. Operation of proposed system
6-1. Functional configuration example of communication control device
6-2. Configuration example of message
6-3. First embodiment
6-4. Second embodiment
7. Modification
7-1. Modification of communication system
7-2. Modification of communication control device
7-3. Other modifications
8. Conclusion

1. Introduction

In recent years, due to a radio environment in which various radio systems are mixed and an increase and diversification of a content amount via radio, a problem that radio wave resources (for example, a frequency) that can be allocated to the radio systems are depleted has emerged. However, since all radio wave bands are already used by the existing radio systems, it is difficult to allocate new radio wave resources. Therefore, in recent years, more effective use of radio wave resources by the utilization of a cognitive radio technology has started to attract attention.

In the cognitive radio technology, radio wave resources are generated by utilizing (for example, dynamic spectrum access (DSA)) a temporally and spatially empty radio wave (white space) of an existing radio system. For example, in the United States, with the aim of opening a federal use band (3.55 to 3.70 GHz), which overlaps with frequency bands that are 3GPP bands 42 and 43 worldwide, to the general public, the legalization and standardization of a citizens broadband radio service (CBRS) utilizing a spectrum sharing technology are accelerating. The wireless innovation forum (WINNF) has developed a standard for the CBRS. In recent years, an automated frequency coordination system (AFC system) in which the Wi-Fi Alliance (Wi-Fi Alliance) has formulated a standard has also attracted attention as an example of the DSA.

It is noted that the cognitive radio technology contributes not only to the DSA but also to improvement in spectrum use efficiency by the radio system. For example, in ETSI EN 303 387 and IEEE 802.19.1-2014, a technology of coexistence between the radio systems using an empty radio wave is defined.

1-1. Control of Radio System for Spectrum Sharing Achievement

In general, in the spectrum sharing, national regulatory authority (NRA) of each country/region is required to protect a radio system (a primary system) of a primary user (a primary user) who is licensed or authorized for the use of a frequency band. Typically, an allowable interference reference value of the primary system is provided by the NRA, and a radio system (a secondary system) of a secondary user (a secondary user) is required to cause interference generated by the spectrum sharing to fall below the allowable interference reference value.

It is noted that, in the following description, a "system" means a set of a plurality of components (devices, modules (parts), and the like). At this time, it does not matter whether all the components are housed in the same housing. For example, a plurality of devices housed in separate housings and connected to each other via a network or the like, and one device in which a plurality of modules are housed in one housing are both "systems". That is, each of the radio systems such as the primary system and the secondary system may be configured by a plurality of devices or may be configured by one device.

In order to achieve spectrum sharing, for example, a communication control device (for example, a frequency management database) controls communication of the secondary system so as not to give fatal interference to the primary system. The communication control device is a device that manages communication and the like of a communication device. For example, the communication control device is a system for managing radio wave resources (for example, a frequency) such as a geo-location database (GLDB), a spectrum access system (SAS), and an automated frequency coordination (AFC) system. In the case of the present embodiment, the communication control device corresponds to a communication control device 60 to be described later. The communication control device 60 will be described in detail later.

Here, the primary system is, for example, a system (for example, an existing system) that preferentially uses a predetermined frequency band over other systems. In addition, the secondary system is, for example, a system that secondarily uses (for example, the DSA) the frequency band used by the primary system. Each of the primary system and the secondary system may include a plurality of communication devices or may include one communication device. The communication control device allocates an interference allowable amount to one or a plurality of communication devices so that interference aggregation of the one or the plurality of communication devices constituting the secondary system with respect to the primary system does not exceed the interference allowable amount (also referred to as an interference margin) of the primary system. At this time, the interference allowable amount may be an interference amount determined in advance by an operator of the primary system, a public organization that manages radio waves, or the like. In the following description, the interference margin refers to the interference allowable amount. In addition, the interference aggregation may be referred to as aggregated interference power.

FIG. 1 is an explanatory diagram illustrating an example of allocation of the interference margin to each communication device constituting the secondary system. In the example of FIG. 1, a communication system 1 is the primary system, and a communication system 2 is the secondary system. The communication system 1 includes a radio wave use device $\mathbf{10}_1$ and the like. Furthermore, the communication system 2 includes base stations $\mathbf{40}_1$, $\mathbf{40}_2$, $\mathbf{40}_3$, and the like. It is noted that, in the example of FIG. 1, the communication system 1 includes only one radio wave use device 10, but the communication system 1 may include a plurality of radio wave use devices 10. Further, in the example of FIG. 1, the communication system 2 includes three base stations 40, but the number of base stations 40 included in the communication system 2 may be less than or more than three. In addition, the radio communication device included in the communication system 2 is not necessarily a base station. It is noted that, although only one primary system (the communication system 1 in the example of FIG. 1) and one secondary system (the communication system 2 in the example of FIG. 1) are illustrated in the example of FIG. 1, a plurality of primary systems and a plurality of secondary systems may be provided.

The radio wave use device $\mathbf{10}_1$ and the base stations $\mathbf{40}_1$, $\mathbf{40}_2$, and $\mathbf{40}_3$ can transmit and receive radio waves. An interference amount allowed by the radio wave use device $\mathbf{10}_1$ is $I_{accept}$. In addition, the interference amounts given to predetermined protection points of the communication system 1 (the primary system) by the base stations $\mathbf{40}_1$, $\mathbf{40}_2$, and $\mathbf{40}_3$ are allocated interference amounts $I_1$, $I_2$, and $I_3$, respectively. Here, the protection point is an interference calculation reference point for protection of the communication system 1.

The communication control device allocates an interference margin $I_{accept}$ to the plurality of base stations 40 so that the interference aggregation to a predetermined protection point of the communication system 1 (received interference amount $I_1+I_2+I_3$ illustrated in FIG. 1) does not exceed the interference margin $I_{accept}$. For example, the communication control device allocates the interference margin $I_{accept}$ to each of the base stations 40 so that each of the allocated interference amounts $I_1$, $I_2$, and $I_3$ becomes $I_{accept}/3$, respectively. Alternatively, the communication control device allocates the interference margin $I_{accept}$ to each of the base stations 40 so that each of the allocated interference amounts $I_1$, $I_2$, and $I_3$ becomes $I_{accept}/3$ or less. Of course, the method of allocating the interference margin is not limited to this example, and includes a method of sequentially allocating the interference margin as described later.

The communication control device calculates maximum transmission power (hereinafter, referred to as maximum allowable transmission power) allowed for each base station 40 based on the allocated interference amount (hereinafter, referred to as an allocation interference amount). For example, the communication control device calculates the maximum allowable transmission power of each base station 40 by calculating back from the allocation interference amount based on propagation loss, antenna gain, and the like. Then, the communication control device notifies each base station 40 of information on the calculated maximum allowable transmission power.

1-2. Outline of Present Embodiment

As described above, in the DSA, the communication control device is arranged in order to dynamically manage the secondary use of a frequency band. The communication control device gives permission of using the frequency band used by the primary system to the communication device constituting the secondary system. The communication device provides a radio communication service to a user based on the permission from the communication control device.

Here, in the case of the above-described WINNF, the communication control device is, for example, the SAS, and the communication device constituting the secondary system is, for example, the citizens broadband service device (CBSD). Furthermore, in the example of the above-described Wi-Fi Alliance, the communication control device is, for example, the AFC system, and the communication device constituting the secondary system is, for example, an automated frequency coordination device (an AFC device).

Communication between the communication control device and the communication device is often performed in such a manner that the communication device issues a request to the communication control device and the communication control device responds to the request. Various methods are disclosed for this communication. For example, Non Patent Literature 2 (WINNF-TS-0016) discloses a protocol for communication between the SAS and the CBSD. In addition, Non Patent Literature 12 (AFC System to AFC Device Interface Specification) discloses an interface specification between the AFC system and the AFC device.

According to these methods, it is assumed that the communication control device and the communication device can smoothly perform communication of information to some extent. However, the method disclosed in the above-described literature is not yet sufficient. When the communication control device and the communication device do not sufficiently communicate with each other, processing related to the DSA is delayed, and as a result, effective use of radio wave resources may not be achieved.

For example, it is assumed that a request message transmitted from the communication device to the communication control device includes information on an extension zone in addition to information on a basic zone. Here, the basic zone is, for example, a zone in which request information defined in advance with a standard such as the WINNF or the Wi-Fi Alliance is stored. In an example of the AFC system of the Wi-Fi Alliance, the basic zone is, for example, a zone in which information of an available spectrum inquiry request is stored. The extension zone is, for example, a zone in which a parameter uniquely defined by a vendor is stored. As an example of the parameter uniquely defined by the vendor, for example, there are a wide variety of information such as information on enhancement of a basic operation and information that does not affect the basic operation regarding secondary use such as authentication regarding the use of the AFC system by the communication device.

At this time, it is assumed that there is no error in the request in the basic zone and the communication control device can normally process the request. For example, it is assumed that the request in the basic zone is the available spectrum inquiry request, and the communication control device can provide available spectrum information to the communication device. Meanwhile, it is assumed that a parameter in the extension zone includes an error. Alternatively, it is assumed that, even if no error is included in the parameter in the extension zone, it is necessary to notify an abnormality as a result of the processing.

If the information on the extension zone is not included in the request message, the communication control device can notify the communication device of a response code indicating normal completion of the processing together with information such as an available spectrum. However, in the above example, since there is a problem in the information on the extension zone in the request message, the communication control device has to make the response code to be notified to the communication device mean an abnormality. At this time, the communication device that has received the response code recognizes that the abnormality has occurred, and in some cases, transmits the same request again or stops the operation. In this case, effective use of radio wave resources may not be achieved due to delay in processing for the DSA, or the like.

Therefore, in the present embodiment, when there are a plurality of different determination units in one communication control device, the communication control device solves the above-described problem by including a plurality of response codes indicating processing results of the plurality of determination units in one response message to be returned to one communication device. In addition, the problem to be solved by the present embodiment is not limited to the above-described problem.

Figure 2:
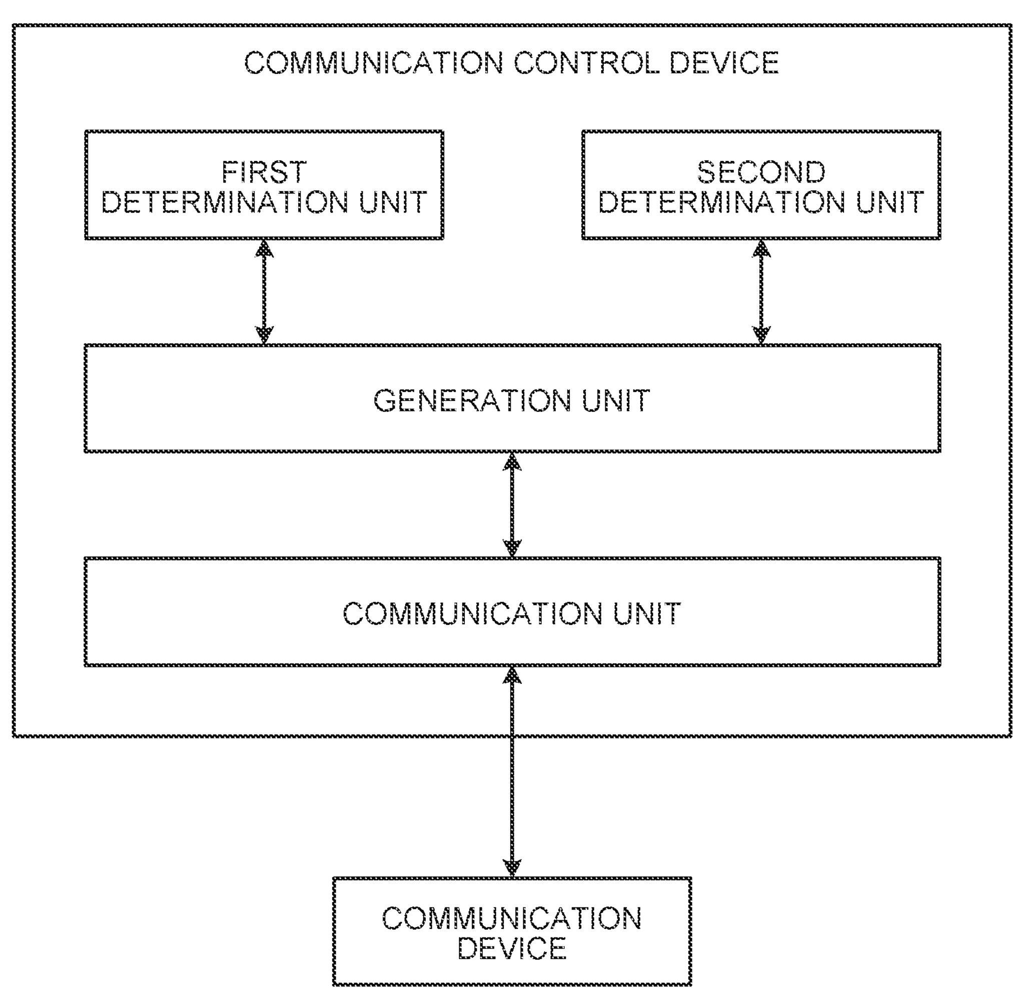
FIG. 2 is a diagram illustrating an outline of the present embodiment.

FIG. 2 is a diagram illustrating an outline of the present embodiment. FIG. 2 illustrates a functional configuration example of the communication control device. The communication control device includes two different determination units. A first determination unit performs, for example, processing of information on the basic zone, and a second determination unit performs, for example, processing of information on the extension zone. Furthermore, the communication control device includes a generation unit that generates a response message to the communication device. The generation unit generates the response message to the communication device according to the determination of the first determination unit and the determination of the second determination unit. Specifically, the generation unit acquires a determination content (for example, a calculation result) and a response code indicating an outline of the determination content from each of the first determination unit and the second determination unit. Alternatively, the generation unit acquires only the determination content from each of the first determination unit and the second determination unit, and sets a corresponding response code for each determination according to each determination content. Then, the generation unit generates the response message in a predetermined message format based on these pieces of information. A communication unit of the communication control device transmits the response message to the communication device.

As a result, it is possible to prevent a response code (hereinafter, referred to as a first response code) corresponding to the determination of the first determination unit from being overwritten with a response code (hereinafter, referred to as a second response code) corresponding to the determination of the second determination unit. That is, the communication control device can notify normal completion with the first response code and notify an abnormality of information in the extension zone with the second response code. As a result, the communication device can recognize, for example, the available spectrum information and the abnormality information in the extension zone separately. As a result, the communication device can effectively perform a procedure of only retransmitting the information in the extension zone without performing the available spectrum inquiry request again.

It is noted that, in many cases, the processing of generating the available spectrum information involves a large load. By adopting the method of the present embodiment, it is possible to prevent the communication control device from unnecessarily repeating the processing. As a result, processing related to the DSA is smoothly performed, and thus effective use of radio wave resources is achieved.

1-3. Terms Related to Frequency and Sharing

Although the outline of the present embodiment has been described above, the present embodiment will be described in detail below. Prior to a detailed description of the present embodiment, terms related to frequency and sharing used in the present embodiment will be summarized.

It is noted that, in the present embodiment, it is assumed that the primary system (for example, the communication system 1) and the secondary system (for example, the communication system 2) are in an environment of the dynamic spectrum access (DSA). Hereinafter, terms related to frequency and sharing will be described by taking, as an example, a citizens broadband radio service (CBRS) developed by the United States Federal Communications Commission (FCC). It is noted that the communication system 1 and the communication system 2 of the present embodiment are not limited to systems in the CBRS. For example, the communication system 1 and the communication system 2 may be communication systems related to the AFC system defined by the Wi-Fi Alliance.

Figure 3:
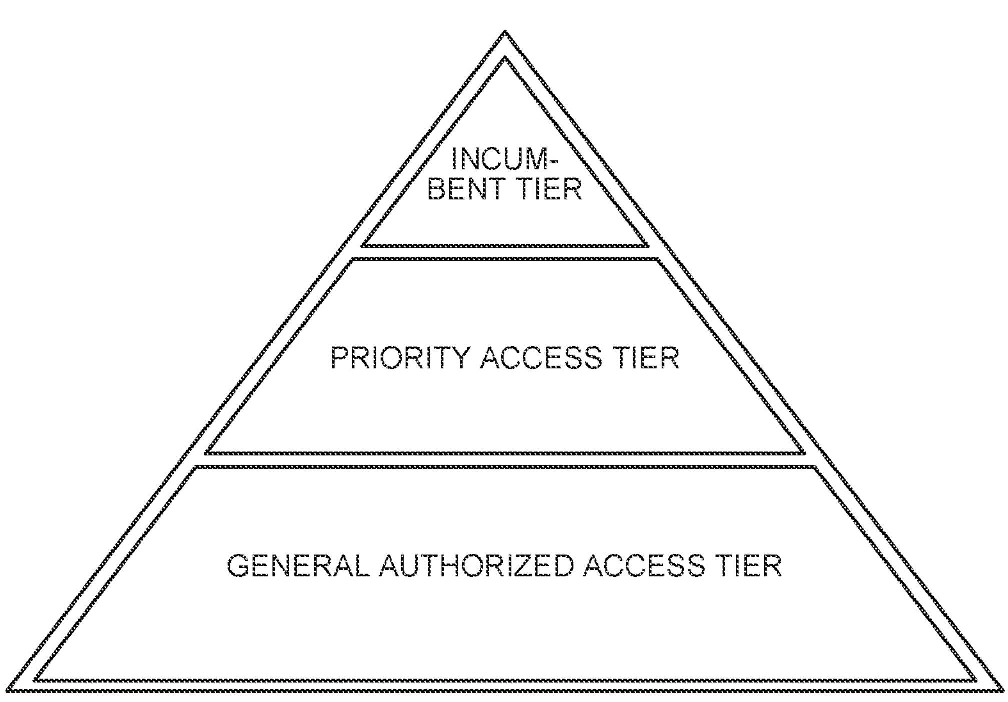
FIG. 3 is an explanatory diagram illustrating a hierarchical structure in a CBRS.

FIG. 3 is an explanatory diagram illustrating a hierarchical structure in the CBRS. As illustrated in FIG. 3, each of the users in the shared frequency band is classified into one of three groups. This group is called a "tier". The three groups are referred to as an incumbent tier, a priority access tier, and a general authorized access tier, respectively. In the example in FIG. 3, the priority access tier is located above the general authorized access tier, and the incumbent tier is located above the priority access tier. Using the CBRS as an example, for example, a system (existing system) located in the incumbent tier is the primary system, and systems located in the general authorized access tier and the priority access tier are the secondary systems.

The incumbent tier is a group of existing users who conventionally use a frequency band defined as a shared frequency band. The existing user may be referred to as a primary user. In the CBRS, a department of defense (DOD), a fixed satellite operator, and a new rule application excluded radio broadband licensee (GWBL: grandfathered wireless broadband licensee) are defined as existing users. The incumbent tier is not required to avoid or suppress interference to the priority access tier and the general authorized access (GAA) tier with lower priority. In addition, the incumbent tier is protected from interference by the priority access tier and the general authorized access tier (GAA tier). That is, the users of the "incumbent tier" can use the frequency band without considering the existence of other groups.

The priority access tier is a group of users who use the above-described shared frequency band based on a license called a priority access license (PAL). The user who uses the above-described shared frequency band may be referred to as a secondary user. In the spectrum sharing in the priority access tier, it is required to avoid or suppress interference with the incumbent tier having a higher priority than that of the priority access tier, but it is not required to avoid or suppress interference with the general authorized access tier (GAA tier) having a lower priority. In addition, the priority access tier is not protected from interference by the incumbent tier having a higher priority, but is protected from interference by the general authorized access tier (GAA tier) having a lower priority.

The general authorized access tier (GAA tier) is a group including other users that do not belong to the incumbent tier and the priority access tier. A user at this tier may also be referred to as the secondary user. However, this tier may be referred to as a low priority secondary user because it has a lower priority of shared use than the priority access tier. In the frequency shared use in the general authorized access tier (GAA tier), it is required to avoid or suppress interference with the incumbent tier and the priority access tier having a higher priority. In addition, the general authorized access tier (GAA tier) is not protected from interference by the incumbent tier and the priority access tier having a higher priority. That is, the general authorized access tier (GAA tier) is a "tier" that is required to use an opportunistic shared frequency in a legal sense.

It is noted that the hierarchical structure is not limited to these definitions. The CBRS is generally called a three-tier structure, but may be a two-tier structure. A typical example is a two-tier structure such as a licensed shared access (LSA) and a TV band white space (TVWS). In the LSA, a structure equivalent to a combination of the incumbent tier and the priority access tier is adopted. In addition, in the TVWS, a structure equivalent to a combination of the incumbent tier and the general authorized access tier (GAA tier) is adopted. In addition, there may be four or more tiers. Specifically, for example, an intermediate tier corresponding to the priority access tier may be further prioritized. In addition, for example, the general authorized access tier (GAA tier) may be similarly prioritized.

Figure 4:
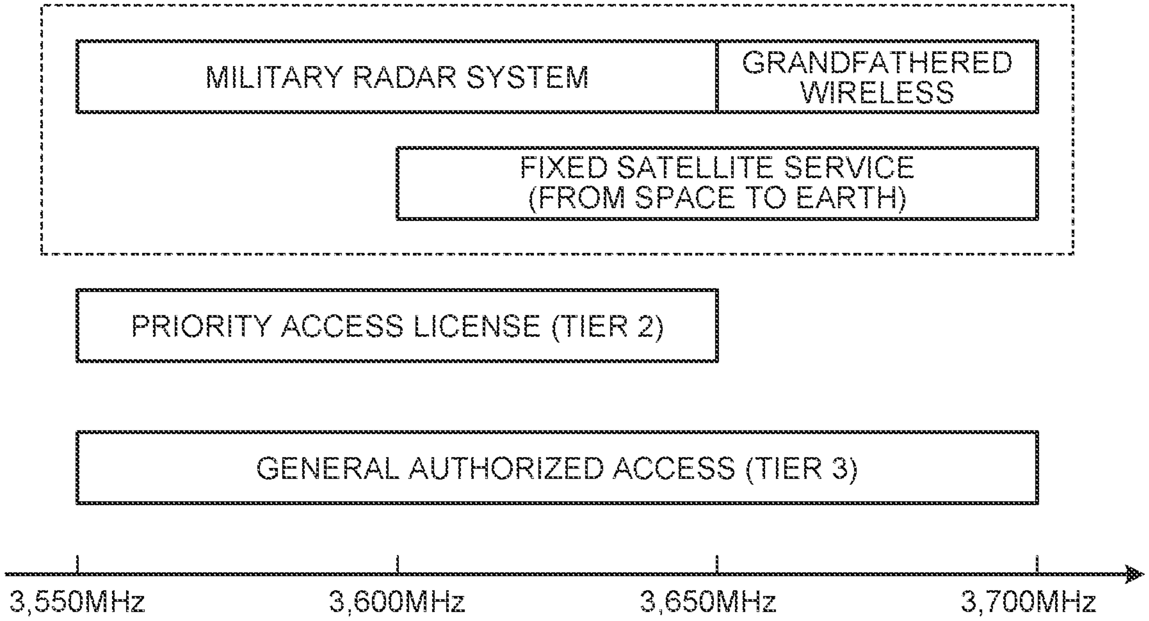
FIG. 4 is an explanatory diagram illustrating a band of the CBRS.

FIG. 4 is an explanatory diagram illustrating a band of the CBRS. Taking the CBRS described above as an example, the primary system is a military radar system, an existing radio system (grandfathered wireless system), or a fixed satellite service (space-to-earth). Here, the military radar system is typically a ship-based radar. In addition, the secondary system is a radio network system including a base station and a terminal called a citizens broadband radio service device (CBSD) and an end user device (EUD). A priority further exists in the secondary system, and a priority access license (PAL) with which a shared band can be used and a general authorized access (GAA) equivalent to not requiring a license are determined. A tier 1 illustrated in FIG. 4 corresponds to the incumbent tier illustrated in FIG. 3. Further, a tier 2 illustrated in FIG. 4 corresponds to the priority access tier illustrated in FIG. 3. Further, a tier 3 illustrated in FIG. 4 corresponds to the general authorized access tier illustrated in FIG. 3.

It is noted that the primary system and the secondary system are not limited to the above examples. For example, a radio system included in the priority access tier may be regarded as the primary system, and a system included in the general authorized access tier (GAA tier) may be regarded as the secondary system.

In addition, the primary system (the communication system 1) of the present embodiment is not limited to the example illustrated in FIG. 4. Another type of the radio system may be used as the primary system (the communication system 1). For example, examples of the primary system include radio systems such as a TV broadcast, a fixed microwave line (FS: fixed system), a meteorological radar, a radio altimeter, a communications-based train control, and a radio astronomy. In addition, the primary system may be a television broadcasting system such as a digital video broadcasting-terrestrial (DVB-T) system or a cellular communication system such as long term evolution (LTE) or new radio (NR). The primary system may also be an aeronautical radio system such as an aeronautical radio navigation service (ARNS). Of course, the primary system is not limited to the above-described radio system, and may be another type of radio system. Another radio system may be used as the primary system according to a country, a region, and a frequency band to be applied.

Further, an empty radio wave (a white space) used by the communication system 2 is not limited to a radio wave of the Federal use band (3.55 to 3.70 GHz). The communication system 2 may use a radio wave in a frequency band different from the Federal use band (3.55 to 3.70 GHz) as the empty radio wave. For example, when the primary system (the communication system 1) is a television broadcasting system, the communication system 2 may be a system that uses a TV white space as the empty radio wave. Here, the TV white space refers to a frequency band that is not used by the television broadcasting system among frequency channels allocated to the television broadcasting system (the primary system). At this time, the TV white space may be a channel that is not used according to the region.

A relationship between the communication system 1 and the communication system 2 is not limited to a spectrum sharing relationship in which the communication system 1 is the primary system and the communication system 2 is the secondary system. The relationship between the communication system 1 and the communication system 2 may be a network coexistence relationship between the same or different radio systems using the same frequency.

In addition, the application of the present embodiment is not limited to a spectrum sharing environment. In general, in spectrum sharing or frequency secondary use, an existing system using a target band is referred to as the primary system, and a system of the secondary user is referred to as the secondary system. However, in a case where the present embodiment is applied to an environment other than the spectrum sharing environment, these systems (the primary system and the secondary system) may be replaced with a system of another term. For example, the primary system and the secondary system are not necessarily distinguished based on the priority. Further, for example, a macrocell base station in a heterogeneous network (HetNet) may be the primary system, and a small cell or a relay station may be the secondary system. In addition, the base station may be the primary system, and a relay UE or a vehicle UE that implements D2D or V2X existing in its coverage may be the secondary system. The base station is not limited to a fixed type, and may be a portable/mobile type. In such a case, for example, the communication control device provided by the present invention may be included in a core network, a base station, a relay station, a relay UE, or the like.

It is noted that the term "frequency" appearing in the following description may be replaced with another term. For example, the term "frequency" may be replaced with terms such as "resource", "resource block", "resource element", "resource pool", "channel", "component carrier", "bandwidth part (BWP)", "carrier", "subcarrier", "bandwidth part (BWP)", and "beam" or terms having equivalent or similar meanings.

2. Configuration of Communication System

Hereinafter, a communication system 1000 according to the embodiment of the present disclosure will be described. The communication system 1000 includes the communication system 1 and the communication system 2. The communication system 1 (a first radio system) is a radio communication system that performs radio communication using a predetermined frequency band (primary use). In addition, the communication system 2 (a second radio system) is a radio communication system that performs radio communication by secondarily using a frequency band used by the communication system 1. For example, the communication system 2 is a radio communication system that shares an empty radio wave of the communication system 1 with the DSA. The communication system 2 provides a radio service to a user or a device owned by a user by using a predetermined radio access technology.

Here, each of the communication systems 1 and 2 may be a cellular communication system such as wideband code division multiple access (W-CDMA), code division multiple access 2000 (cdma2000), LTE, or NR. In the following descriptions, "LTE" includes LTE-advanced (LTE-A), LTE-advanced pro (LTE-A Pro), and evolved universal terrestrial radio access (EUTRA). In addition, "NR" includes a new radio access technology (NRAT) and further EUTRA (FEUTRA).

NR is a next generation (fifth generation) radio access technology (RAT) of LTE. The NR is a radio access technology capable of being compatible with various use cases including enhanced mobile broadband (eMBB), massive machine type communications (mMTC), and ultra-reliable and low latency communications (URLLC).

It is noted that the communication systems 1 and 2 are not limited to the cellular communication system. For example, the communication system 2 may be another radio communication system such as a wireless local area network (LAN) system, a television broadcasting system, an aviation radio system, or a space radio communication system.

In the present embodiment, the communication system 1 is the primary system, and the communication system 2 is the secondary system. As described above, a plurality of communication systems 1 and a plurality of communication systems 2 may be provided. It is noted that, in the example of FIG. 1, the communication system 1 includes one radio wave use device 10 (the radio wave use device $\mathbf{10}_1$ illustrated in FIG. 1). However, as described above, the communication system 1 may include a plurality of radio wave use devices 10. The configuration of the radio wave use device 10 may be the same as or different from the configuration of the base station 40 or a terminal device 30 to be described later.

2-1. Overall Configuration of Communication System

The communication system 1000 typically includes the following entities.

A communication device (for example, a radio wave use device, a base station, or an intermediate device)

A terminal device

A management device (for example, a communication control device)

It is noted that, in the following description, the entities serving as the communication devices are assumed to be the radio wave use device 10, the base station 40, and an intermediate device 50, but the entities serving as the communication devices are not limited to these devices, and may be other communication devices (for example, the management device 20, the terminal device 30, and the communication control device 60). For example, an external device to be described later may be regarded as a part of the communication system 1000. Of course, the external device may not be a part of the communication system 1000. Furthermore, the terminal device 30 may be regarded as an external device.

In the present embodiment, unless otherwise noted, the terminal device 30 and the base station 40 are entities constituting the secondary system that shares a part or all of a frequency band allocated to the primary system. In the present embodiment, it is assumed that two types of communication devices having different types exist in these communication devices constituting the secondary system.

First, a communication device that can access the communication control device 60 without using a radio path with permission of the communication control device 60 is referred to as a "communication device (Type A)". Specifically, for example, a communication device capable of performing wired Internet connection can be regarded as the "communication device (Type A)". In addition, for example, even in the case of a radio relay device having no wired Internet connection function, if a radio backhaul link using a frequency that does not require permission of the communication control device 60 is constructed with another communication device (Type A), such a radio relay device may be regarded as the "communication device (Type A)".

Furthermore, a communication device that cannot access the communication control device 60 without a radio path accompanied by permission of the communication control device 60 is referred to as a "communication device (Type B)". For example, the radio relay device that needs to construct a backhaul link using a frequency that requires permission of the communication control device 60 can be regarded as the "communication device (Type B)". Furthermore, for example, a terminal device such as a smartphone having a radio network provision function typified by tethering and using a frequency that requires permission of the communication control device 60 for both a backhaul link and an access link may be treated as the "communication device (Type B)".

The communication device is not necessarily fixedly installed, and may be installed in a mobile object such as an automobile. Furthermore, the communication device is not necessarily provided on the ground, and may be provided for an object existing in the air or space, such as an aircraft, a drone, a helicopter, or a satellite, or an object existing on the sea or under the sea, such as a ship or a submarine. Typically, such a mobile communication device corresponds to the communication device (Type B), and an access route to the communication control device is secured by performing radio communication with another communication device (Type A). As a matter of course, even a mobile communication device can be handled as the communication device (Type A) as long as the frequency used in the radio communication with the communication device (Type A) is not managed by the communication control device.

Figure 5:
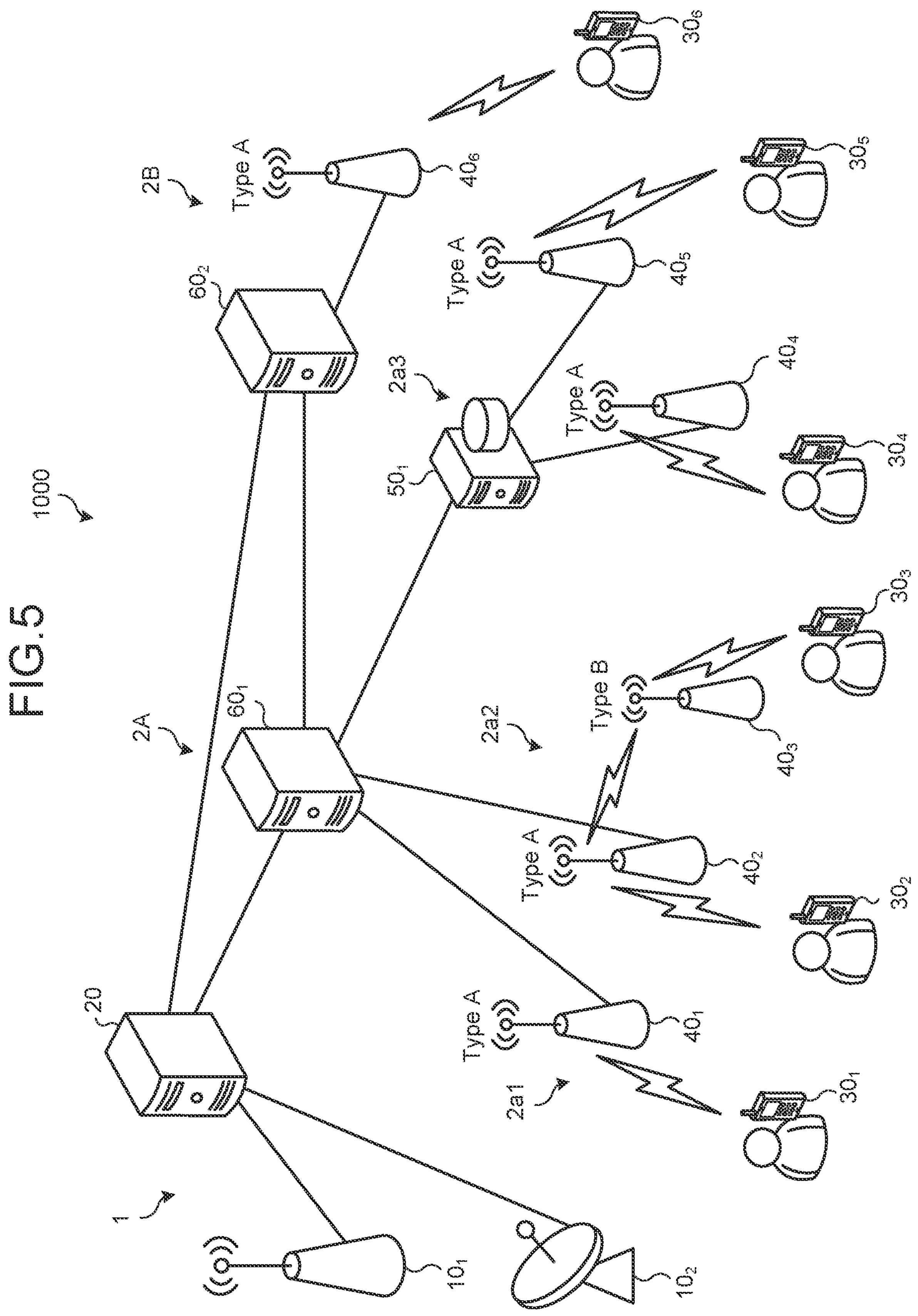
FIG. 5 is a diagram illustrating a configuration example of a communication system according to an embodiment of the present disclosure.

FIG. 5 is a diagram illustrating a configuration example of the communication system 1000 according to the embodiment of the present disclosure. As described above, the communication system 1000 includes the communication system 1 and the communication system 2. It is noted that the device in the drawing can also be considered as a device in a logical sense. That is, a part of the device in the drawing may be implemented by a virtual machine (VM), a container, a docker, or the like, and they may be implemented on physically the same hardware.

The communication system 1 includes the radio wave use device 10 and the management device 20. In the example of FIG. 5, the communication system 1 includes radio wave use devices $\mathbf{10}_1$ and $\mathbf{10}_2$ and the management device 20 that manages the radio wave use devices. It is noted that the communication system 1 may not necessarily include the management device 20. Furthermore, the communication system 1 may include a plurality of radio wave use devices 10 or may include only one radio wave use device. In the example of FIG. 5, each of the radio wave use devices $\mathbf{10}_1$ and $\mathbf{10}_2$ can be regarded as one communication system 1.

The communication system 2 includes the terminal device 30, the base station 40, the intermediate device 50, and the communication control device 60. In the example of FIG. 5, a communication system 2A and a communication system 2B are described as the communication system 2. The communication system 2A includes a communication system 2*al*, a communication system 2*a*2, and a communication system 2*a*3.

The communication system 2*al* includes a terminal device $\mathbf{30}_1$ and a base station $\mathbf{40}_1$. The communication system 2*a*2 includes terminal devices $\mathbf{30}_2$ and $\mathbf{30}_3$ and base stations $\mathbf{40}_2$ and $\mathbf{40}_3$. The communication system 2*a*3 includes terminal devices $\mathbf{30}_4$ and $\mathbf{30}_5$, base stations $\mathbf{40}_4$ and $\mathbf{40}_5$, and an intermediate device 501. Furthermore, the communication system 2B includes a terminal device $\mathbf{30}_6$ and a base station $\mathbf{40}_6$. In the example of FIG. 5, the base stations $\mathbf{40}_1$ and $\mathbf{40}_2$ and $\mathbf{40}_4$ to $\mathbf{40}_6$ are the communication devices (Type A), and the base station $\mathbf{40}_3$ is the communication device (Type B).

It is noted that the communication system 2 may not necessarily include the communication control device 60. When the embodiment is described using the example of FIG. 5, each of the communication system 2*a*2 and the communication system 2*a*3 having the communication control device 60 outside may be regarded as one communication system 2. Furthermore, the communication system 2 may not necessarily include the intermediate device 50. In the example of FIG. 5, the communication system 2*al* not including the intermediate device 50 may be regarded as one communication system 2.

The communication systems 1 and 2 provide radio services to a user or a device owned by the user by allowing the respective devices (for example, communication devices such as radio communication devices) constituting the communication systems 1 and 2 to work together. The radio communication device is a device having a function of radio communication. In the example of FIG. 5, the radio wave use device 10, the base station 40, and the terminal device 30 correspond to a radio communication device.

It is noted that the intermediate device 50 and the communication control device 60 may have a radio communication function. In this case, the intermediate device 50 and the communication control device 60 can also be regarded as radio communication devices. In the following description, the radio communication device may be simply referred to as a communication device. It is noted that the communication device is not limited to the radio communication device, and for example, a device that does not have the radio communication function and can only perform wired communication can also be regarded as the communication device.

It is noted that, in the present embodiment, the concept of the "communication device" includes not only a portable mobile device (for example, the terminal device) such as a mobile terminal but also a device installed in a structure or a mobile body. A structure or a mobile body itself may be regarded as the communication device. In addition, the concept of the communication device includes not only a terminal device but also a base station and a relay device. The communication device is a type of processing device and information processing device. The description of the "communication device" appearing in the following description can be appropriately rephrased as a "transmission device" or a "reception device". It is noted that, in the present embodiment, the concept of "communication" includes "broadcasting". In this case, the description of the "communication device" can be appropriately rephrased as a "broadcasting device". Of course, the description of the "communication device" may be appropriately rephrased as the "transmission device" or the "reception device".

The communication system 2 may include a plurality of terminal devices 30, a plurality of base stations 40, a plurality of communication control devices 60, and a plurality of intermediate devices 50. In the example of FIG. 5, the communication system 2 includes the terminal devices $\mathbf{30}_1$, $\mathbf{30}_2$, $\mathbf{30}_3$, $\mathbf{30}_4$, $\mathbf{30}_5$, and the like as the terminal device 30. Furthermore, the communication system 2 includes the base stations $\mathbf{40}_1$, $\mathbf{40}_2$, $\mathbf{40}_3$, $\mathbf{40}_4$, $\mathbf{40}_5$, $\mathbf{40}_6$, and the like as the base station 40. Furthermore, the communication system 2 includes the communication control devices $\mathbf{60}_1$ and $\mathbf{60}_2$ as the communication control device 60.

It is noted that, in the following description, a radio communication device may be referred to as a radio system. For example, each of the terminal devices $\mathbf{30}_1$ to $\mathbf{30}_5$ is one radio system. In addition, each of the radio wave use device 10 and the base stations $\mathbf{40}_1$ to $\mathbf{40}_6$ is one radio system. It is noted that, in the following description, the communication system 1 is referred to as the first radio system, but each of one or a plurality of radio wave use devices 10 included in the communication system 1 may be regarded as the first radio system. In the following description, each of one or a plurality of base stations 40 included in the communication system 2 is referred to as the second radio system, but the communication system 2 itself may be regarded as the second radio system, or each of one or a plurality of terminal devices 30 included in the communication system 2 may be regarded as the second radio system. If the intermediate device 50 and the communication control device 60 have the radio communication function, each of the intermediate devices 50 or each of the communication control devices 60 may be regarded as the second radio system.

It is noted that the radio system may be one system including a plurality of communication devices including at least one radio communication device. For example, a system including one or a plurality of base stations 40 and one or a plurality of terminal devices 30 that are subordinate to the base stations 40 may be regarded as one radio system. Furthermore, each of the communication system 1 and the communication system 2 can be regarded as one radio system. In the following description, a communication system including a plurality of communication devices including at least one radio communication device may be referred to as a radio communication system or simply referred to as a communication system. It is noted that one system including a plurality of communication devices including one radio communication device may be regarded as the first radio system or the second radio system.

It is noted that, in the present embodiment, the system means a set of a plurality of components (devices, modules (parts), and the like). At this time, all the components constituting the system may or may not be housed in the same housing. For example, a plurality of devices housed in separate housings and connected to each other by wire and/or wirelessly is one system. One device in which a plurality of modules are housed in one housing is also one system.

It is noted that, in the example of FIG. 5, there is only one communication control device 60 for each of the two communication systems 2 (the communication systems 2A and 2B). However, a plurality of communication control devices 60 may be provided in one communication system 2. In a case where there are a plurality of communication control devices, at least one of the following three types of decision-making topologies can be applied to the communication control device 60.

Autonomous decision-making

Centralized decision-making

Distributed decision-making

Figure 6:
FIG. 6 is a diagram illustrating a model in which communication control devices are arranged in a distributed manner.

The autonomous decision-making is a decision-making topology in which an entity (a decision-making entity, here the communication control device) that performs decision-making performs decision-making independently from another decision-making entity. The communication control device independently performs allocation of necessary frequencies and calculation of interference control. FIG. 6 is a diagram illustrating a model in which the communication control device 60 is arranged in a distributed manner. The autonomous decision-making can be applied, for example, in a case where a plurality of communication control devices 60 are arranged in a distributed manner, as illustrated in FIG. 6. In this case, the plurality of communication control devices 60 (in the case of the example of FIG. 6, the communication control device $\mathbf{60}_3$ and the communication control device $\mathbf{60}_4$) exchange information of the base stations 40 to be managed with each other, and perform allocation of necessary frequencies and calculation of interference control.

Figure 7:
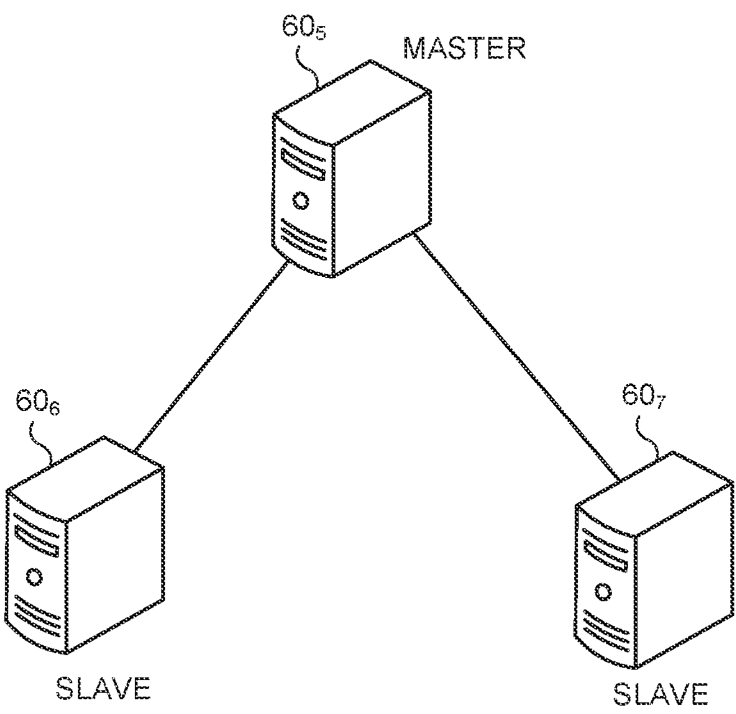
FIG. 7 is a diagram illustrating a model in which one communication control device centrally controls a plurality of communication control devices.

The centralized decision-making is a decision-making topology in which a decision-making entity delegates decision-making to another decision-making entity. FIG. 7 is a diagram illustrating a model (so-called master-slave model) in which one communication control device centrally controls a plurality of communication control devices. In a case where middle-sized decision-making is performed, for example, a model as illustrated in FIG. 7 is assumed. In the example of FIG. 7, a communication control device $\mathbf{60}_5$ is a master communication control device, and communication control devices $\mathbf{60}_6$ and $\mathbf{60}_7$ are slave communication control devices. In such a system, the master communication control device can control the plurality of slave communication control devices to intensively perform decision-making. In addition, the master communication control device can also perform delegation, discarding, and the like of decision-making authority with respect to each of the slave communication control devices for the purpose of a load distribution (load balancing) and the like.

The distributed decision-making is a decision-making topology in which a decision-making entity performs decision-making in cooperation with another decision-making entity. For example, in a case where a plurality of communication control devices are arranged as illustrated in FIG. 6, mutual adjustment, negotiation, and the like of decision-making results after each communication control device performs decision-making may correspond to the “distributed decision-making”. Furthermore, for example, in the model as illustrated in FIG. 7, it can also be considered as the “distributed decision-making” that the master communication control device dynamically performs delegation, discarding, and the like of the decision-making authority with respect to each of the slave communication control devices for the purpose of a load distribution (load balancing) and the like.

In a scenario in which the centralized decision-making and the distributed decision-making are applied, implementation as illustrated in FIG. 8 is also possible as a modification. The master communication control device may exist outside, and a communication device (for example, the base station 40) or an intermediate device (for example, the intermediate device 50) that bundles a plurality of communication devices may be implemented to behave as a slave communication control device.

Hereinafter, a configuration of each device included in the communication system 1000 and an external device will be specifically described.

2-2. Configuration of Radio Wave Use Device

First, a configuration of the radio wave use device 10 will be described.

The radio wave use device 10 is a communication device (a radio system) that primarily uses a predetermined frequency band. For example, the radio wave use device 10 is a radio communication device constituting the communication system 1 (the primary system). The radio wave use device 10 is a type of information processing device. The radio wave use device 10 may be a radio wave emission device such as a radar or a reflected wave reception device. As described above, the primary system is, for example, a military radar system, an existing system (for example, a television broadcasting system or an existing cellular communication system), or a system for a fixed satellite operation.

In a case where the communication system 1 is the military radar system, the radio wave use device 10 is, for example, a ship-based radar. In a case where the communication system 1 is the television broadcasting system, the radio wave use device 10 is, for example, a broadcasting station (a broadcasting station as equipment) such as a broadcasting relay station. In a case where the communication system 1 is the system for the fixed satellite operation, the radio wave use device 10 is, for example, a parabolic antenna that receives radio waves from an artificial satellite. Of course, the radio wave use device 10 is not limited thereto. For example, when the communication system 1 is the existing cellular communication system, the radio wave use device 10 may be a base station.

Similarly to the base station 40 to be described later, the radio wave use device 10 may be capable of communicating with other communication devices using a radio access technology. At this time, the radio access technology used by the radio wave use device 10 may be a cellular communication technology or a wireless LAN technology. Of course, the radio access technology used by the base station 40 is not limited thereto, and may be another radio access technology. For example, the radio access technology used by the radio wave use device 10 may be a low power wide area (LPWA) communication technology. Here, LPWA communication is communication conforming to an LPWA standard. Examples of the LPWA standard include ELTRES, ZETA, SIGFOX, LoRaWAN, and NB-IoT. Of course, the LPWA standard is not limited thereto, and may be another LPWA standard. In addition, the radio communication used by the radio wave use device 10 may be radio communication using millimeter waves. Further, the radio communication used by the radio wave use device 10 may be radio communication using radio waves or radio communication (optical radio) using infrared rays or visible light.

In addition, the configuration of the radio wave use device 10 may be similar to that of the terminal device 30 or the base station 40 to be described later.

Figure 9:
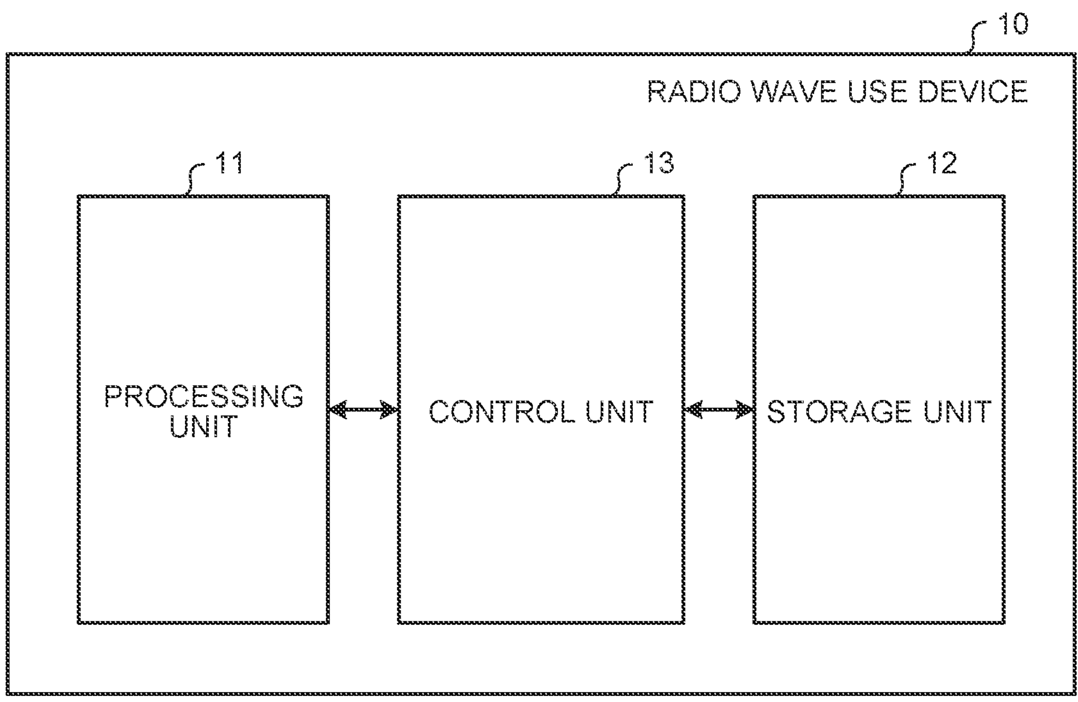
FIG. 9 is a diagram illustrating a configuration example of a radio wave use device according to the embodiment of the present disclosure.

FIG. 9 is a diagram illustrating a configuration example of the radio wave use device 10 according to the embodiment of the present disclosure. The radio wave use device 10 includes a processing unit 11, a storage unit 12, and a control unit 13. It is noted that the configuration illustrated in FIG. 9 is a functional configuration, and a hardware configuration may be different from the functional configuration. Furthermore, the functions of the radio wave use device 10 may be implemented in a distributed manner in a plurality of physically separated configurations.

The processing unit 11 is a processing unit for using a radio wave in a predetermined frequency band. For example, the processing unit 11 is a signal processing unit that performs various types of processing for outputting and receiving a radio wave in a predetermined frequency band. If the radio wave use device 10 is a radio communication device, the processing unit 11 may be a radio communication interface that performs radio communication with another communication device. Here, the other communication devices include not only a communication device that performs cellular communication or the like but also a transmission device that transmits a broadcast wave such as television broadcasting and a reception device that receives a broadcast wave.

The storage unit 12 is a storage device capable of reading and writing data, such as a dynamic random access memory (DRAM), a static random access memory (SRAM), a flash memory, or a hard disk. The storage unit 12 functions as a storage means of the radio wave use device 10.

The control unit 13 is a controller that controls each unit of the radio wave use device 10. The control unit 13 is implemented by, for example, a processor such as a central processing unit (CPU) or a micro processing unit (MPU). For example, the control unit 13 is implemented by allowing a processor to execute various programs stored in a storage device in the radio wave use device 10 using a random access memory (RAM) or the like as a work area. It is noted that the control unit 13 can be implemented by, for example, an integrated circuit such as an application specific integrated circuit (ASIC) or a field programmable gate array (FPGA). Any of the CPU, the MPU, the ASIC, and the FPGA can be regarded as a controller.

It is noted that the radio wave use device 10 may have a function as the management device 20. In this case, the control unit 13 may include each functional block included in the control unit of the management device 20.

2-3. Configuration of Management Device

Next, a configuration of the management device 20 will be described.

The management device 20 is a device that manages the radio wave use device 10. For example, the management device 20 is a server or a database owned by an operator or an administrator of the communication system 1. The management device 20 may be a device that manages a radio wave output of the radio wave use device 10, or may be a device that manages information such as an installation mode and a management entity of the radio wave use device 10. The management device 20 is a type of information processing device.

It is noted that the management device 20 may be a server or a database owned by a public institution. For example, the management device 20 may be a database (for example, a regulatory database) managed and operated by a radio administration agency in each country or region. An example of the regulatory database includes a universal licensing system (ULS) operated by federal communications commissions (FCC).

In addition, in a case where the communication system 1 is an existing cellular communication system, the management device 20 may be a device that manages a radio network. For example, the management device 20 may be a device that functions as a mobility management entity (MME), an access and mobility management function (AMF), or a session management function (SMF).

When the communication system 2 configures a network including the radio wave use device 10 as one of the nodes, the management device 20 may be, for example, a network manager that integrally controls the radio wave use device 10 in the network.

Of course, the management device 20 is not limited to these examples. It is noted that the radio wave use device 10 may have a function of the management device 20. In this case, the radio wave use device 10 can be regarded as the management device 20.

In addition, the management device 20 may have a function of the communication control device. In this case, the management device 20 can be regarded as the communication control device 60.

Figure 10:
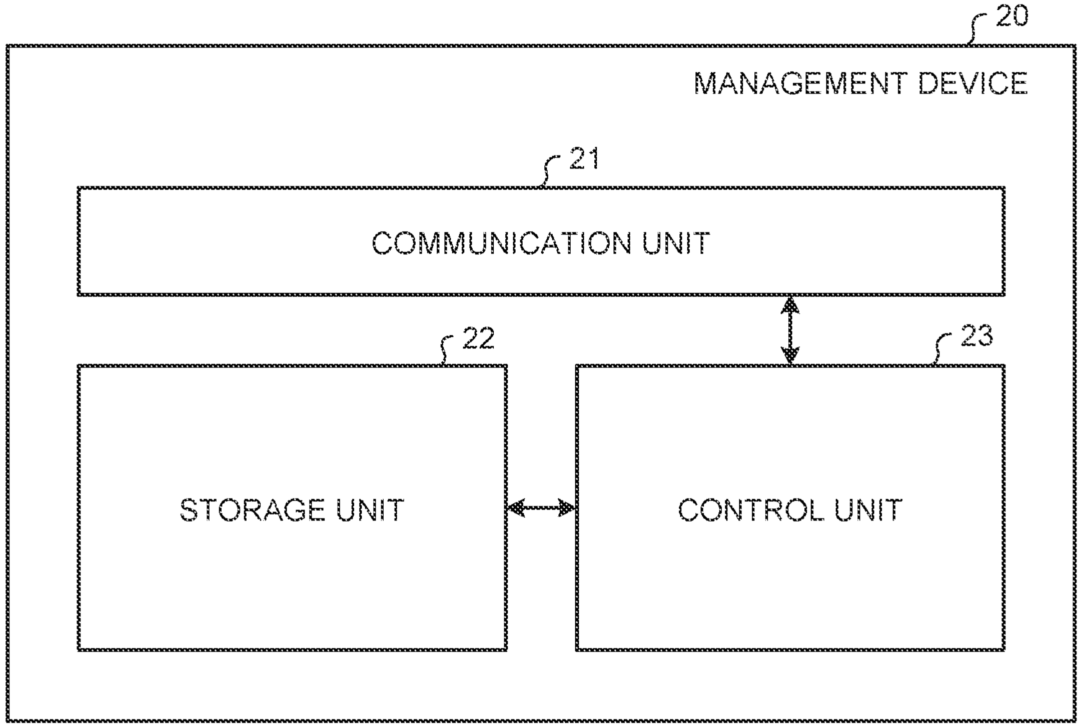
FIG. 10 is a diagram illustrating a configuration example of a management device according to the embodiment of the present disclosure.

FIG. 10 is a diagram illustrating a configuration example of the management device 20 according to the embodiment of the present disclosure. The management device 20 includes a communication unit 21, a storage unit 22, and a control unit 23. It is noted that the configuration illustrated in FIG. 9 is a functional configuration, and a hardware configuration may be different from the functional configuration. Furthermore, the functions of the management device 20 may be implemented in a distributed manner in a plurality of physically separated configurations.

The communication unit 21 is a communication interface for communicating with other devices. The communication unit 21 may be a network interface or a device connection interface. For example, the communication unit 21 may be a local area network (LAN) interface such as a network interface card (NIC), or may be a USB interface including a universal serial bus (USB) host controller, a USB port, and the like. Furthermore, the communication unit 21 may be a wired interface or a radio interface. The communication unit 21 functions as a communication means of the management device 20. The communication unit 21 communicates with the radio wave use device 10 under the control of the control unit 23.

The storage unit 22 is a storage device capable of reading and writing data, such as a DRAM, an SRAM, a flash memory, or a hard disk. The storage unit 22 functions as a storage means of the management device 20. The storage unit 22 stores a first identifier and the like. The first identifier will be described later.

The control unit 23 is a controller that controls each unit of the management device 20. The control unit 23 is implemented by, for example, a processor such as a CPU or an MPU. For example, the control unit 23 is implemented by allowing the processor to execute various programs stored in the storage device in the management device 20 using a RAM or the like as a work area. It is noted that the control unit 23 may be implemented by an integrated circuit such as an ASIC or an FPGA. Any of the CPU, the MPU, the ASIC, and the FPGA can be regarded as a controller.

As described above, the radio wave use device 10 can be regarded as the management device 20. In this case, the description of the "management device 20" appearing in the following description can be appropriately replaced with the "radio wave use device 10".

2-4. Configuration of Terminal Device

Next, a configuration of the terminal device 30 will be described.

The terminal device 30 is a communication device (a radio system) that performs radio communication with the base station 40 and/or the communication control device 60. The terminal device 30 is a type of information processing device.

The terminal device 30 is typically a communication device such as a smartphone. The terminal device 30 may be a user terminal such as a mobile phone, a smart device (a smartphone or a tablet), a wearable terminal, an internet of things (IoT) device, a personal digital assistant (PDA), or a personal computer. Furthermore, the terminal device 30 may be a business camera provided with a communication function, or may be a communication device such as a field pickup unit (FPU) for television broadcasting. Furthermore, the terminal device 30 may be a motorcycle, a mobile relay vehicle, or the like on which a communication device such as the field pickup unit (FPU) is mounted. In addition, a device called customer premises equipment (CPE) provided to ensure Internet connection may serve as a terminal. Furthermore, the terminal device 30 may be a machine to machine (M2M) device or an Internet of things (IoT) device.

The terminal device may be referred to as a user equipment, a user terminal, a user station, a mobile terminal, a mobile station, or the like. Furthermore, the terminal device 30 may be referred to as, for example, MTC UE, NB-IoT UE, or Cat.M UE. Furthermore, the terminal device 30 may be referred to as a client device.

Furthermore, the terminal device 30 may be capable of perform sidelink communication with another terminal device 30. When performing the sidelink communication, the terminal device 30 may be able to use an automatic retransmission technology such as a hybrid automatic repeat request (ARQ) (HARQ). It is noted that the radio communication (including the sidelink communication) used by the terminal device 30 may be radio communication using a radio wave or radio communication (optical radio) using infrared rays or visible light.

Furthermore, the terminal device 30 may be a mobile device. Here, the mobile device is a movable radio communication device. At this time, the terminal device 30 may be a radio communication device installed in a mobile body or may be a mobile body itself. For example, the terminal device 30 may be a vehicle that moves on a road, such as an automobile, a bus, a truck, or a motorcycle, or a radio communication device mounted on the vehicle. It is noted that the mobile body may be a mobile terminal, or may be a mobile body that moves on land (on the ground in a narrow sense), in the ground, on water, or under water. Furthermore, the mobile body may be a mobile body that moves inside the atmosphere, such as a drone or a helicopter, or may be a mobile body that moves outside the atmosphere, such as an artificial satellite.

The terminal device 30 may be simultaneously connected to a plurality of base stations or a plurality of cells to perform communication. For example, in a case where one base station supports a communication area via a plurality of cells (for example, pCell and sCell), it is possible to bundle the plurality of cells and communicate between the base station 40 and the terminal device 30 by a carrier aggregation (CA) technology, a dual connectivity (DC) technology, or a multi-connectivity (MC) technology. Alternatively, the terminal device 30 and the plurality of base stations 40 can communicate with each other by a coordinated multi-point transmission and reception (CoMP) technology via cells of different base stations 40.

It is noted that the terminal device 30 is not necessarily used by a person. The terminal device 30 may be a sensor installed in a machine or a building of a factory, such as so-called machine type communication (MTC). Furthermore, the terminal device 30 may be a machine to machine (M2M) device or an Internet of things (IoT) device. Furthermore, the terminal device 30 may be a device having a relay communication function as represented by device to device (D2D) and vehicle to everything (V2X). Furthermore, the terminal device 30 may be a device called a customer premises equipment (CPE) used for radio backhaul or the like. Furthermore, the terminal device 30 may be a radio communication device installed in a mobile body or may be a mobile body itself.

In the present embodiment, unless otherwise noted, the terminal device 30 corresponds to an entity that terminates a radio link using a frequency that requires permission of the communication control device 60. However, the terminal device 30 can perform an operation equivalent to that of the communication device depending on a function included in the terminal device 30 or an applied network topology. In other words, when the technology disclosed in the present embodiment is implemented, the communication device may be referred to as the terminal device or the terminal device may be referred to as the communication device according to the network topology.

Figure 11:
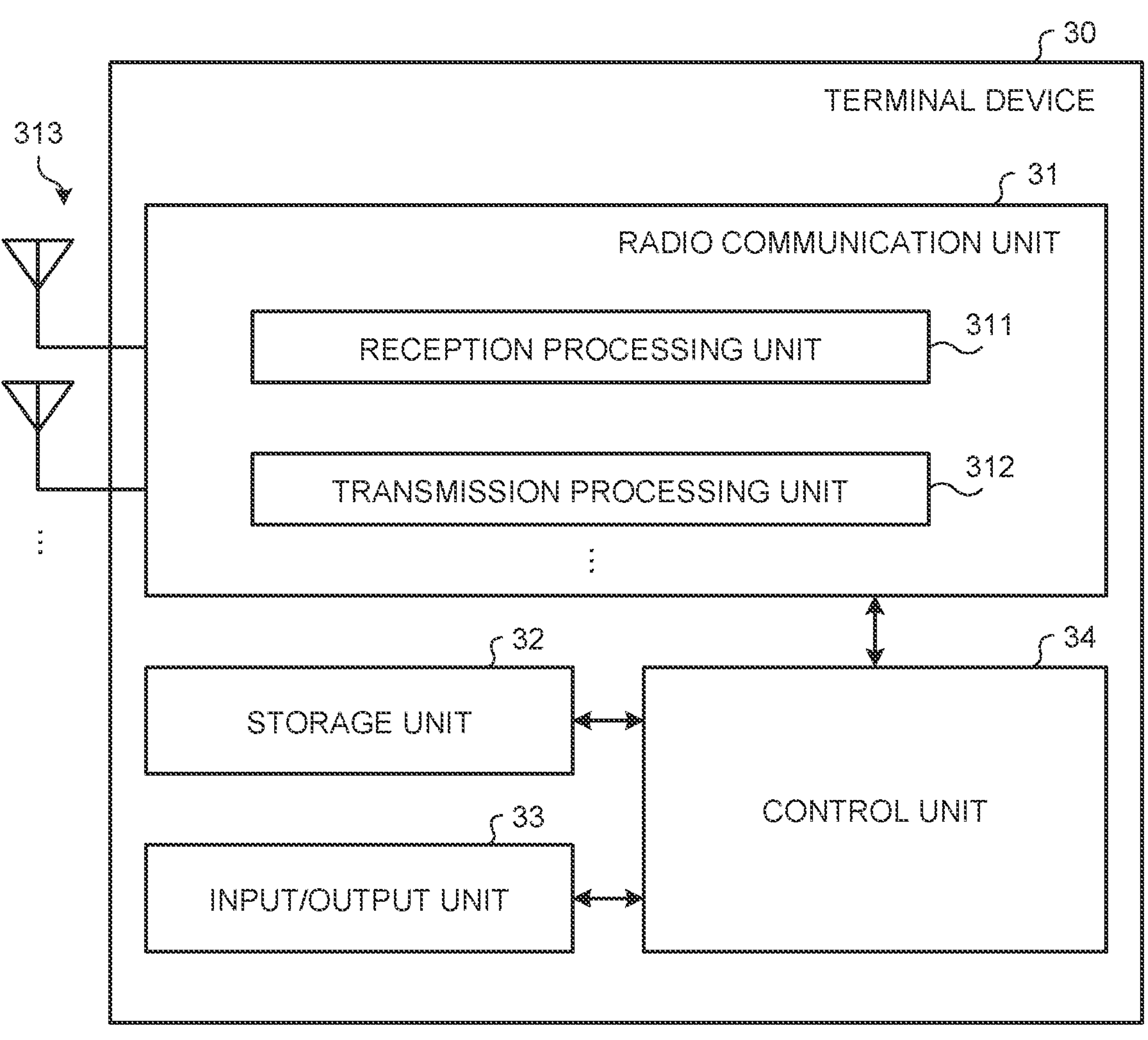
FIG. 11 is a diagram illustrating a configuration example of a terminal device according to the embodiment of the present disclosure.

FIG. 11 is a diagram illustrating a configuration example of the terminal device 30 according to the embodiment of the present disclosure. The terminal device 30 includes a radio communication unit 31, a storage unit 32, an input/output unit 33, and a control unit 34. It is noted that the configuration illustrated in FIG. 11 is a functional configuration, and a hardware configuration may be different from the functional configuration. Furthermore, the functions of the terminal device 30 may be implemented in a distributed manner in a plurality of physically separated configurations.

The radio communication unit 31 is a radio communication interface that performs radio communication with other communication devices (for example, the base station 40 and another terminal device 30). The radio communication unit 31 operates under the control of the control unit 34. The radio communication unit 31 is compatible with one or a plurality of radio access methods. For example, the radio communication unit 31 is compatible with both NR and LTE. The radio communication unit 31 may be compatible with other radio access methods such as W-CDMA and cdma2000.

The radio communication unit 31 includes a reception processing unit 311, a transmission processing unit 312, and an antenna 313. The radio communication unit 31 may include a plurality of reception processing units 311, a plurality of transmission processing units 312, and a plurality of antennas 313. It is noted that, when the radio communication unit 31 is compatible with a plurality of radio access methods, each unit of the radio communication unit 31 can be configured individually for each radio access method. For example, the reception processing unit 311 and the transmission processing unit 312 may be individually configured by LTE and NR. The configurations of the reception processing unit 311 and the transmission processing unit 312 are similar to those of a reception processing unit 411 and a transmission processing unit 412 of the base station 40.

The storage unit 32 is a storage device capable of reading and writing data, such as a DRAM, an SRAM, a flash memory, or a hard disk. The storage unit 32 functions as a storage means of the terminal device 30.

The input/output unit 33 is a user interface for exchanging information with a user. For example, the input/output unit 33 is an operation device for the user to perform various operations, such as a keyboard, a mouse, an operation key, or a touch panel. Alternatively, the input/output unit 33 is a display device such as a liquid crystal display or an organic electroluminescence display. The input/output unit 33 may be an acoustic device such as a speaker or a buzzer. The input/output unit 33 may be a lighting device such as a light emitting diode (LED) lamp. The input/output unit 33 functions as an input/output means (an input means, an output means, an operation means, or a notification means) of the terminal device 30.

The control unit 34 is a controller that controls each unit of the terminal device 30. The control unit 34 is implemented by, for example, a processor such as a CPU or an MPU. For example, the control unit 34 is implemented by allowing the processor to execute various programs stored in the storage device in the terminal device 30 using a RAM or the like as a work area. It is noted that the control unit 34 may be implemented by an integrated circuit such as an ASIC or an FPGA. Any of the CPU, the MPU, the ASIC, and the FPGA can be regarded as a controller. It is noted that the control unit 34 may include functional blocks having functions similar to those of respective functional blocks included in the control unit of the base station 40.

2-5. Configuration of Base Station

Next, a configuration of the base station 40 will be described.

The base station 40 is a communication device (a radio system) that performs radio communication with the terminal device 30 or another communication device (another base station 40 and another intermediate device 50). For example, the base station 40 is a radio device that provides a communication service to a terminal. The base station 40 is a type of communication device. Furthermore, the base station 40 is a type of information processing device.

The base station 40 is, for example, a device corresponding to a radio base station (base station, node B, eNB, gNB, or the like) or a radio access point (an access point). When the base station 40 is a radio access point, the base station 40 may be referred to as a non-3GPP access. In addition, the base station 40 may be referred to as an automated frequency coordination (AFC) device, a standalone AP, or a fixed client device.

The base station 40 may be a radio relay station (a relay node). Furthermore, the base station 40 may be an on-road base station such as a road side unit (RSU). Furthermore, the base station 40 may be an optical extension device called a remote radio head (RRH). Furthermore, the base station 40 may be a reception station device such as a field pickup unit (FPU). Furthermore, the base station 40 may be an integrated access and backhaul (IAB) donor node or an IAB relay node that provides a radio access line and a radio backhaul line by time division multiplexing, frequency division multiplexing, or space division multiplexing.

It is noted that the radio access technology used by the base station 40 may be a cellular communication technology or a wireless LAN technology. Of course, the radio access technology used by the base station 40 is not limited thereto, and may be another radio access technology. For example, the radio access technology used by the base station 40 may be a low power wide area (LPWA) communication technology. Here, LPWA communication is communication conforming to an LPWA standard. Examples of the LPWA standard include ELTRES, ZETA, SIGFOX, LoRaWAN, and NB-IoT. Of course, the LPWA standard is not limited thereto, and may be another LPWA standard.

In addition, the radio communication used by the base station 40 may be radio communication using millimeter waves. In addition, the radio communication used by the base station 40 may be radio communication using radio waves or radio communication (optical radio) using infrared rays or visible light.

In the present embodiment, a base station of a radio communication system may be referred to as a base station device. It is noted that the radio access technology used by the base station 40 may be a cellular communication technology or a wireless LAN technology. Of course, the radio access technology used by the base station 40 is not limited thereto, and may be another radio access technology. In addition, the radio communication used by the base station 40 may be radio communication using radio waves or radio communication (optical radio) using infrared rays or visible light.

The base station 40 is not necessarily fixed, and may be installed in a mobile object such as an automobile. Furthermore, the base station 40 does not necessarily exist on the ground, and the communication device function thereof may be provided for an object existing in the air or space, such as an aircraft, a drone, a helicopter, or a satellite, or an object existing on the sea or under the sea, such as a ship or a submarine. In such a case, the base station 40 may perform radio communication with other fixedly installed communication devices.

It is noted that the concept of the base station (also referred to as a base station device) includes not only a donor base station but also a relay base station (also referred to as a relay station or a relay station device). The concept of the base station also includes an access point. In addition, the concept of the base station includes not only a structure having a function of the base station but also a device installed in the structure.

The structure is, for example, a building such as an office building, a house, a steel tower, a station laying, an airport laying, a harbor laying, or a stadium. It is noted that the concept of the structure includes not only the building but also a construction (a non-building structure) such as a tunnel, a bridge, a dam, a wall, or an iron pillar, and equipment such as a crane, a gate, or a windmill. In addition, the concept of the structure includes not only a structure on land (on the ground in a narrow sense) or in the ground, but also a structure on water such as a platform or a megafloat, and a structure under water such as marine observation equipment.

The base station 40 may be a donor station or a relay station. In a case where the base station 40 is the relay station, the base station is not limited to a device on which the base station 40 is mounted as long as the function of relay is satisfied. For example, the base station 40 may be mounted on a terminal device such as a smartphone, may be mounted on an automobile or a human-powered vehicle, may be mounted on a balloon, an airplane, or a drone, or may be mounted on a home appliance such as a television, a game machine, an air conditioner, a refrigerator, or a lighting fixture. Of course, each of these devices themselves may be regarded as the base station 40.

Furthermore, the base station 40 may be a fixed station or a mobile station. The mobile station is a radio communication device (for example, a base station) configured to be movable. At this time, the base station 40 may be a device installed in a mobile body or may be a mobile body itself. For example, a relay station device having mobility can be regarded as the base station 40 as a mobile station. In addition, a device that originally has mobility, such as a vehicle, a drone, or a smartphone, and has a function of a base station (at least a part of the function of the base station) also corresponds to the base station 40 serving as a mobile station.

Here, the mobile body may be a mobile terminal such as a smartphone or a mobile phone. In addition, the mobile body may be a mobile body (for example, a vehicle such as an automobile, a bicycle, a bus, a truck, a motorcycle, a train, or a linear motor car) that moves on land (on the ground in a narrow sense) or a moving body (for example, a subway) that moves in the ground (for example, in the tunnel). In addition, the mobile body may be a mobile body (for example, a ship such as a passenger ship, a cargo ship, or a hovercraft) that moves over water or a mobile body (for example, a submersible such as a submersible, a submarine, or an unmanned diving machine) that moves under water. Furthermore, the mobile body may be a mobile body (for example, an aircraft (an aerial vehicle) such as an airplane, an airship, or a drone) that moves in the atmosphere or a mobile body (for example, an artificial body such as an artificial satellite, a spacecraft, a space station, and a probe) that moves outside the atmosphere. The mobile object moving outside the atmosphere can be rephrased as a space mobile body.

Furthermore, the base station 40 may be a ground base station (a ground station) installed on the ground. For example, the base station 40 may be a base station arranged in a structure on the ground, or may be a base station installed in a mobile body moving on the ground. More specifically, the base station 40 may be an antenna installed in a structure such as a building and a signal processing device connected to the antenna. Of course, the base station 40 may be a structure or a mobile body itself. The term "ground" means not only land (on the ground in a narrow sense) but also ground in a broad sense including underground, over water, and under water.

It is noted that the base station 40 is not limited to a ground base station. The base station 40 may be a non-ground base station (a non-ground station) capable of floating in the air or space. For example, the base station 40 may be an aircraft station device or a satellite station device.

The aircraft station device is a radio communication device capable of floating in the atmosphere (including the stratosphere), such as an aircraft. The aircraft station device may be a device mounted on an aircraft or the like, or may be an aircraft itself. It is noted that the concept of the aircraft includes not only a heavy aircraft such as an airplane or a glider but also a light aircraft such as a balloon or an airship. In addition, the concept of the aircraft includes not only the heavy aircraft and the light aircraft but also a rotorcraft such as a helicopter or an autogyro. It is noted that the aircraft station device (alternatively, an aircraft on which the aircraft station device is mounted) may be an unmanned aerial vehicle such as a drone.

It is noted that the concept of the unmanned aerial vehicle also includes an unmanned aircraft system (UAS) and a tethered UAS. The concept of the unmanned aerial vehicle also includes a lighter than air (LTA) UAS and a heavier than air (HTA) UAS. Other concepts of the unmanned aerial vehicle also include high altitude UAS platforms (HAPs).

The satellite station device is a radio communication device capable of floating outside the atmosphere. The satellite station device may be a device mounted on a space mobile body such as an artificial satellite, or may be a space mobile body itself. The satellite serving as the satellite station device may be any one of a low earth orbiting (LEO) satellite, a medium earth orbiting (MEO) satellite, a geostationary earth orbiting (GEO) satellite, and a highly elliptical orbiting (HEO) satellite. Of course, the satellite station device may be a device mounted on the low earth orbiting satellite, the medium earth orbiting satellite, the geostationary earth orbiting satellite, or the highly elliptical orbiting satellite.

As described above, the base station 40 may be a relay station device. The relay station device is, for example, an aircraft station or an earth station. The relay station device can be regarded as a type of the above-described relay device. The aircraft station is a radio station installed on the ground or a mobile body moving on the ground in order to communicate with the aircraft station device. Furthermore, the earth station is a radio station located on the earth (including air) in order to communicate with the satellite station device. The earth station may be a large earth station or a small earth station such as a very small aperture terminal (VSAT).

It is noted that the earth station may be a VSAT controlled earth station (also referred to as a master station or a HUB station) or a VSAT earth station (also referred to as a slave station). Furthermore, the earth station may be a radio station installed in a mobile body moving on the ground. For example, earth stations on board vessels (ESV) can be cited as an earth station mounted on a ship. Furthermore, the earth station may include an aircraft earth station that is installed in an aircraft (including a helicopter) and communicates with a satellite station. Furthermore, the earth station may include an aeronautical earth station that is installed in a mobile body moving on the ground and communicates with the aircraft earth station via the satellite station. It is noted that the relay station device may be a portable movable radio station that communicates with the satellite station or the aircraft station.

The coverage size of the base station 40 may be as large as a macro cell or as small as a picocell. Of course, the coverage size of the base station 40 may be extremely small, like a femtocell. Various sizes of coverage of the base station 40 can be allowed. It is noted that one cell may be formed by a plurality of base stations 40, like a distributed antenna system (DAS). In addition, the base station 40 may have a beamforming capability. In this case, in the base station 40, a cell or a service area may be formed for each beam.

The base station 40 may be used, operated, and/or managed by various entities. For example, the base station 40 may be assumed to be a mobile network operator (MNO), a mobile virtual network operator (MVNO), a mobile network enabler (MNE), a mobile virtual network enabler (MVNE), a shared equipment operator, a neutral host network (NHN) operator, a broadcaster, an enterprise, an educational institution (an educational institution, a board of local government, or the like), a real estate (a building, an apartment, or the like) administrator, an individual, or the like. Of course, the subject of use, operation, and/or management of the base station 40 is not limited thereto.

The base station 40 may be installed and/or operated by one business operator, or may be installed and/or operated by one individual. Of course, the installation/operation subject of the base station 40 is not limited thereto. For example, the base station 40 may be installed and operated jointly by a plurality of business operators or a plurality of individuals. Furthermore, the base station 40 may be shared equipment used by a plurality of business operators or a plurality of individuals. In this case, installation and/or operation of the equipment may be performed by a third party different from the user.

The base station 40 operated by the business operator is typically connected to the Internet via a core network. Furthermore, the base station 40 performs operation management and maintenance by a function called operation, administration & maintenance (OA&M). It is noted that, in the communication system 2, for example, there may be a network manager that integrally controls the base station 40 in the network.

In a case where the radio access technology used by the base station 40 is a cellular communication technology, a plurality of base stations 40 may each form a cell. The cell provided by the base station 40 is referred to as, for example, a serving cell. The serving cell may include a primary cell (pCell) and a secondary cell (sCell). When dual connectivity is provided to the UE (for example, the terminal device 30), the pCell and the sCell(s) provided by a master node (MN) are referred to as a master cell group. Examples of the dual connectivity include EUTRA-EUTRA dual connectivity, EUTRA-NR dual connectivity (ENDC), EUTRA-NR dual connectivity with 5GC, NR-EUTRA dual connectivity (NEDC), and NR-NR dual connectivity.

Further, the serving cell may include a primary secondary cell or a primary SCG Cell (PSCell). That is, in a case where the dual connectivity is provided to the UE, the PSCell and the sCell(s) provided by a secondary node (SN) are referred to as a secondary cell group (SCG).

One downlink component carrier and one uplink component carrier may be associated with one cell. In addition, a system bandwidth corresponding to one cell may be divided into a plurality of bandwidth parts (BWPs). In this case, one or more BWPs may be configured in the UE, and one BWP may be used in the UE as an active BWP. In addition, radio resources (for example, a frequency band, a numerology (subcarrier spacing), and a slot format (slot configuration)) that can be used by the terminal device 30 may be different for each cell, each component carrier, or each BWP. Furthermore, one base station 40 may provide a plurality of cells.

Figure 12:
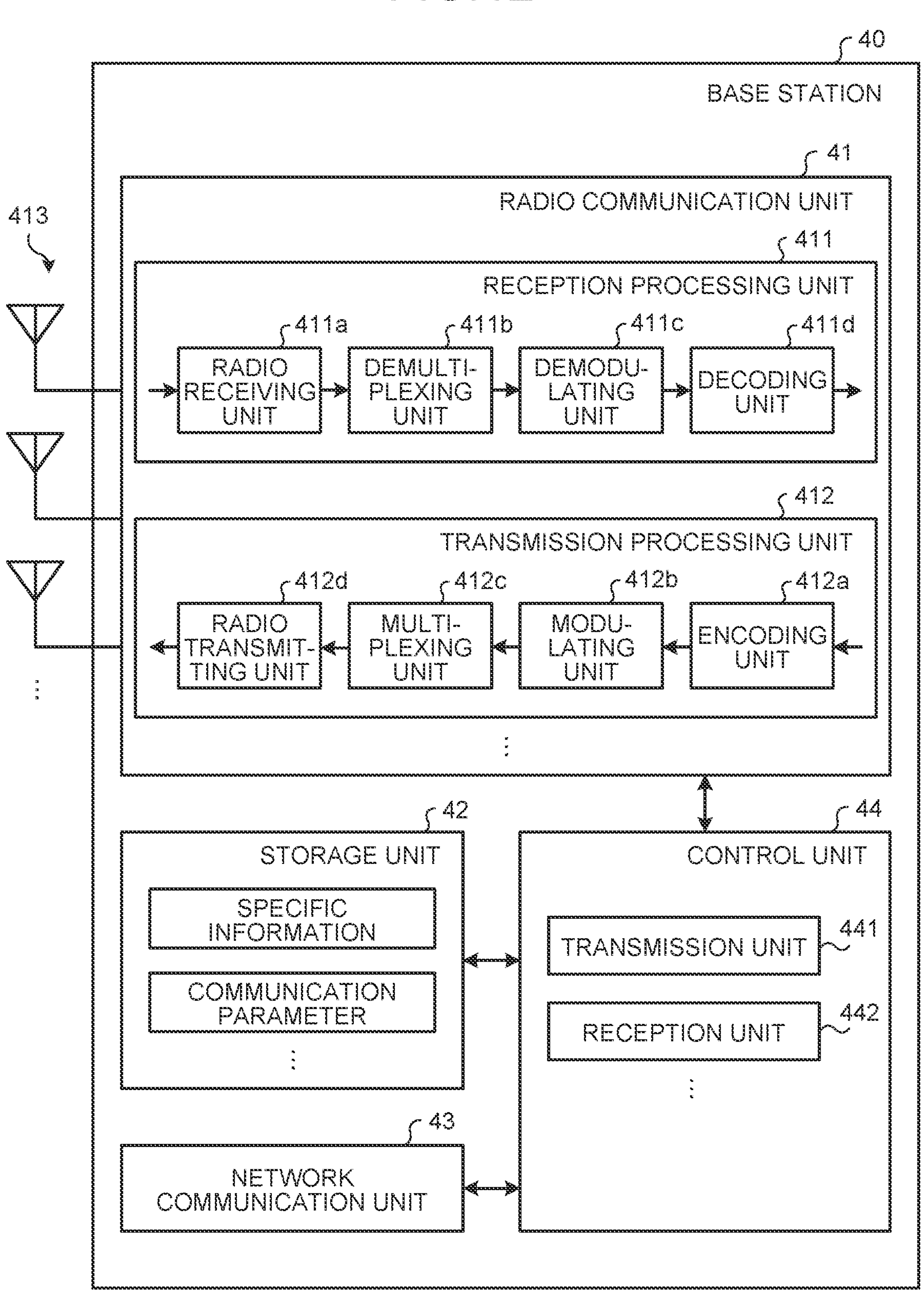
FIG. 12 is a diagram illustrating a configuration example of a base station according to the embodiment of the present disclosure.

FIG. 12 is a diagram illustrating a configuration example of the base station 40 according to the embodiment of the present disclosure. The base station 40 includes a radio communication unit 41, a storage unit 42, a network communication unit 43, and a control unit 44. It is noted that the configuration illustrated in FIG. 12 is a functional configuration, and a hardware configuration may be different from the functional configuration. Furthermore, the functions of the base station 40 may be implemented in a distributed manner in a plurality of physically separated devices.

The radio communication unit 41 is a radio communication interface that performs radio communication with other communication devices (for example, the terminal device 30, the communication control device 60, the intermediate device 50, and another base station 40). The radio communication unit 41 operates under the control of the control unit 44. The radio communication unit 41 may be compatible with a plurality of radio access methods. For example, the radio communication unit 41 may be compatible with both NR and LTE. The radio communication unit 41 may be compatible with other cellular communication methods such as W-CDMA and cdma2000. Furthermore, the radio communication unit 41 may be compatible with a wireless LAN communication method in addition to the cellular communication method. Of course, the radio communication unit 41 may be compatible with only one radio access method.

The radio communication unit 41 includes a reception processing unit 411, a transmission processing unit 412, and an antenna 413. The radio communication unit 41 may include a plurality of the reception processing units 411, a plurality of the transmission processing units 412, and a plurality of the antennas 413. It is noted that, when the radio communication unit 41 is compatible with a plurality of radio access methods, each unit of the radio communication unit 41 can be configured individually for each radio access method. For example, if the base station 40 is compatible with NR and LTE, the reception processing unit 411 and the transmission processing unit 412 may be configured separately for NR and LTE.

The reception processing unit 411 processes an uplink signal received via the antenna 413. The reception processing unit 411 includes a radio receiving unit 411*a*, a demultiplexing unit 411*b*, a demodulating unit 411*c*, and a decoding unit 411*d*.

The radio receiving unit 411*a* performs, on the uplink signal, down-conversion, removal of an unnecessary frequency component, control of an amplification level, quadrature demodulation, conversion to a digital signal, removal of a guard interval, extraction of a frequency domain signal by fast Fourier transform, and the like. For example, it is assumed that the radio access method of the base station 40 is a cellular communication method such as LTE. At this time, the demultiplexing unit 411*b* demultiplexes an uplink channel such as a physical uplink shared channel (PUSCH) or a physical uplink control channel (PUCCH) and an uplink reference signal from a signal output from the radio receiving unit 411*a*. The demodulating unit 411*c* demodulates the received signal using a modulation method such as binary phase shift keying (BPSK) or quadrature phase shift keying (QPSK) with respect to a modulation symbol of the uplink channel. The modulation method used by the demodulating unit 411*c* may be multi-level QAM such as 16 quadrature amplitude modulation (QAM), 64 QAM, or 256 QAM. The decoding unit 411*d* performs decoding processing on the demodulated encoded bits of the uplink channel. Decoded uplink data and uplink control information are output to the control unit 44.

The transmission processing unit 412 performs processing of transmitting downlink control information and downlink data. The transmission processing unit 412 includes an encoding unit 412*a*, a modulating unit 412*b*, a multiplexing unit 412*c*, and a radio transmitting unit 412*d*.

The encoding unit 412*a* encodes the downlink control information and the downlink data input from the control unit 44 using an encoding method such as block encoding, convolutional encoding, turbo encoding, or the like. The modulating unit 412*b* modulates coded bits output from the encoding unit 412*a* by a predetermined modulation method such as BPSK, QPSK, 16 QAM, 64 QAM, or 256 QAM. The multiplexing unit 412*c* multiplexes a modulation symbol of each channel and a downlink reference signal and arranges the multiplexed symbols in a predetermined resource element. The radio transmitting unit 412*d* performs various types of signal processing on the signal from the multiplexing unit 412*c*. For example, the radio transmitting unit 412*d* performs various types of processing such as conversion into a time domain by the fast Fourier transform, addition of a guard interval, generation of a baseband digital signal, conversion into an analog signal, quadrature modulation, up-conversion, removal of an extra frequency component, and power amplification. The signal generated by the transmission processing unit 412 is transmitted from the antenna 413.

The storage unit 42 is a storage device capable of reading and writing data, such as a DRAM, an SRAM, a flash memory, or a hard disk. The storage unit 42 functions as a storage means of the base station 40. The storage unit 42 stores desired transmission power information, an operation parameter, stored resource information, and the like.

The desired transmission power information is information on transmission power required by the base station 40 for transmission of radio waves to the communication control device 60.

The operation parameter is information (for example, setting information) related to the radio wave transmission operation of the base station 40. For example, the operation parameter is information of a maximum value (maximum allowable transmission power) of the transmission power allowed for the base station 40. Of course, the operation parameter is not limited to the information of the maximum allowable transmission power.

The stored resource information is information related to storage of radio resources of the base station 40. For example, the stored resource information is information of radio resources that can be currently used by the base station 40. For example, the stored resource information is information on a storage amount of an interference margin allocated from the communication control device 60 to the base station 40. The information on the storage amount may be information on a resource block unit to be described later. That is, the stored resource information may be information (for example, a resource block storage amount) on a resource block stored by the base station 40.

The network communication unit 43 is a communication interface for performing communication with other devices (for example, the communication control device 60, the intermediate device 50, and another base station 40). For example, the network communication unit 43 is a local area network (LAN) interface such as a network interface card (NIC). The network communication unit 43 may be a universal serial bus (USB) interface including a USB host controller, a USB port, and the like. Furthermore, the network communication unit 43 may be a wired interface or a radio interface. The network communication unit 43 functions as a network communication means of the base station 40. The network communication unit 43 communicates with another device under the control of the control unit 44.

The control unit 44 is a controller that controls each unit of the base station 40. The control unit 44 is implemented by, for example, a processor such as a central processing unit (CPU) or a micro processing unit (MPU). For example, the control unit 44 is implemented by allowing a processor to execute various programs stored in a storage device in the base station 40 using a random access memory (RAN) or the like as a work area. It is noted that the control unit 44 may be implemented by an integrated circuit such as an application specific integrated circuit (ASIC) or a field programmable gate array (FPGA). Any of the CPU, the MPU, the ASIC, and the FPGA can be regarded as a controller.

As illustrated in FIG. 12, the control unit 44 includes a transmission unit 441 and a reception unit 442. Each block (the transmission unit 441 and the reception unit 442) constituting the control unit 44 is a functional block indicating a function of the control unit 44. These functional blocks may be software blocks or hardware blocks. For example, each of the functional blocks described above may be one software module realized by software (including a microprogram), or may be one circuit block on a semiconductor chip (a die). Of course, each functional block may be one processor or one integrated circuit. A configuration method of the functional block is freely selected. It is noted that the control unit 44 may be configured by a functional unit different from the above-described functional block.

It is noted that the control unit 34 of the terminal device 30 may include each of the functional blocks (the transmission unit 441 and the reception unit 442) included in the control unit 44 of the base station 40. In this case, the description of the "base station 40" appearing in the following description can be appropriately replaced with the "terminal device 30". In addition, description of the "control unit 44", the "transmission unit 441", and the "reception unit 442" appearing in the following description can also be appropriately replaced with the "control unit 34".

2-6. Configuration of Intermediate Device

Next, a configuration of the intermediate device 50 will be described.

The intermediate device 50 is a device that communicates with the communication control device 60 as a proxy (a representative) of one or a plurality of communication devices (for example, the base station 40). For example, the intermediate device 50 is a proxy device (a proxy system). The intermediate device 50 is also a type of communication device. In addition, the intermediate device 50 is a type of information processing device.

Here, the intermediate device 50 may be a domain proxy (DP) defined in Non Patent Literature 2 (WINNF-TS-0016). Here, the DP refers to an entity that communicates with a communication control device, such as SAS, instead of each of a plurality of CBSDs, or an entity that communicates with a communication control device, such as SAS, instead of a network including a plurality of CBSDs. It is noted that the intermediate device 50 is not limited to the DP defined in Non Patent Literature 2 (WINNF-TS-0016) as long as the intermediate device 50 has a function of communicating with the communication control device 60 as a proxy (a representative) of one or a plurality of communication devices. For example, a network manager that integrally controls the base station 40 in the network may be regarded as the intermediate device 50.

Furthermore, the intermediate device 50 may be a proxy defined in Non Patent Literature 12 (AFC System to AFC Device Interface Specification Version). At this time, the intermediate device 50 may be referred to as an automated frequency coordination (AFC) device.

It is noted that the proxy system may include one device or a plurality of devices. Communication between the intermediate device 50 and the base station 40 may be wired communication or radio communication. Similarly, communication between the intermediate device 50 and the communication control device 60 may be wired communication or radio communication.

It is noted that the communication device represented by the intermediate device 50 (serving as a representative of the communication device) is not limited to the base station 40, and may be, for example, the terminal device 30. In the following description, one or a plurality of communication devices (for example, one or more base stations 40) represented by the intermediate device 50 (serving as a representative of one or the plurality of communication devices) may be referred to as subordinate communication devices (for example, the subordinate base station 40).

Figure 13:
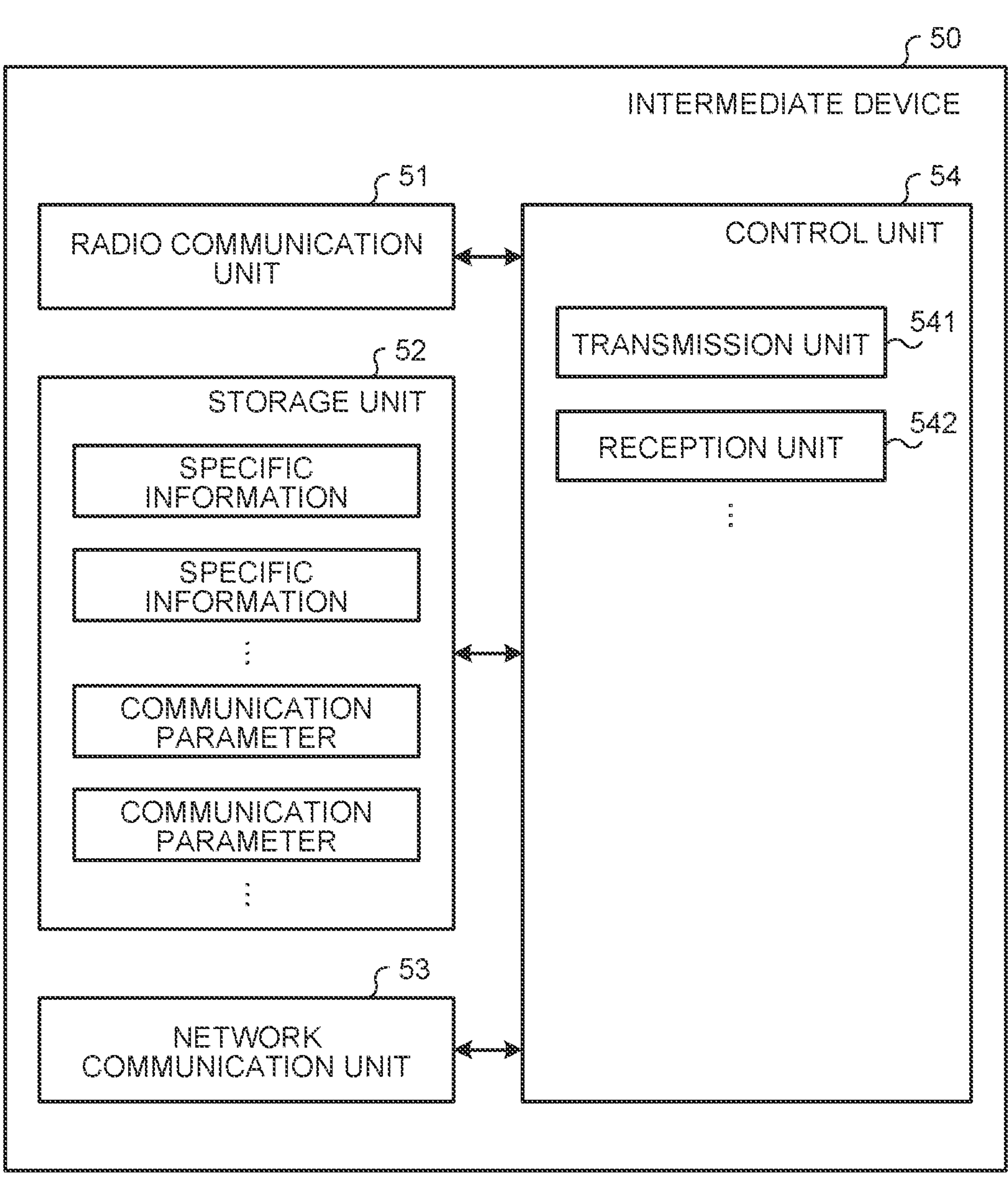
FIG. 13 is a diagram illustrating a configuration example of a proxy device according to the embodiment of the present disclosure.

FIG. 13 is a diagram illustrating a configuration example of the intermediate device 50 according to the embodiment of the present disclosure. The intermediate device 50 includes a radio communication unit 51, a storage unit 52, a network communication unit 53, and a control unit 54. It is noted that the configuration illustrated in FIG. 13 is a functional configuration, and a hardware configuration may be different from the functional configuration. Furthermore, the functions of the intermediate device 50 may be implemented in a distributed manner in a plurality of physically separated configurations.

The radio communication unit 51 is a radio communication interface that performs radio communication with other communication devices (for example, the base station 40, the terminal device 30, the communication control device 60, and the intermediate device 50). The radio communication unit 51 operates under the control of the control unit 54. The radio communication unit 51 is compatible with one or a plurality of radio access methods. For example, the radio communication unit 51 is compatible with both NR and LTE. The radio communication unit 51 may be compatible with other radio access methods such as W-CDMA and cdma2000. The configuration of the radio communication unit 51 is similar to that of the radio communication unit 41 of the base station 40.

The storage unit 52 is a storage device capable of reading and writing data, such as a DRAM, an SRAM, a flash memory, or a hard disk. The storage unit 52 functions as a storage means of the intermediate device 50. The storage unit 52 may store specific information, communication parameters, and the like of each of the subordinate base stations 40 (alternatively, the terminal device 30 further subordinate to the subordinate base station 40).

The network communication unit 53 is a communication interface for performing communication with other devices (for example, the base station 40, the communication control device 60, and another intermediate device 50). For example, the network communication unit 53 is a LAN interface such as an NIC. The network communication unit 53 may be a USB interface including a USB host controller, a USB port, and the like. Furthermore, the network communication unit 53 may be a wired interface or a radio interface. The network communication unit 53 functions as a network communication means of the intermediate device 50. The network communication unit 53 communicates with other devices under the control of the control unit 54.

The control unit 54 is a controller that controls each unit of the intermediate device 50. The control unit 54 is implemented by, for example, a processor such as a CPU or an MPU. For example, the control unit 54 is implemented by allowing a processor to execute various programs stored in a storage device in the intermediate device 50 using a RAM or the like as a work area. It is noted that the control unit 54 may be implemented by an integrated circuit such as an ASIC or an FPGA. Any of the CPU, the MPU, the ASIC, and the FPGA can be regarded as a controller.

As illustrated in FIG. 13, the control unit 54 includes a transmission unit 541 and a reception unit 542. Each block (the transmission unit 541 and the reception unit 542) constituting the control unit 54 is a functional block indicating a function of the control unit 54. These functional blocks may be software blocks or hardware blocks. For example, each of the functional blocks described above may be one software module realized by software (including a microprogram), or may be one circuit block on a semiconductor chip (a die). Of course, each functional block may be one processor or one integrated circuit. A configuration method of the functional block is freely selected. It is noted that the control unit 54 may be configured by a functional unit different from the above-described functional block. The operation of each block constituting the control unit 54 will be described later.

The operation of each block (the transmission unit 541 and the reception unit 542) constituting the control unit 54 may be the same as the operation of each block (the transmission unit 441 and the reception unit 442) constituting the control unit 44 of the base station 40. In this case, the description of the "intermediate device 50" appearing in the following description can be appropriately replaced with the "base station 40". Similarly, the description of the "control unit 54", the "transmission unit 541", and the "reception unit 542" appearing in the following description can be appropriately replaced with the "control unit 44", the "transmission unit 441", and the "reception unit 442".

2-7. Configuration of Communication Control Device

Next, a configuration of the communication control device 60 will be described.

The communication control device 60 is a device that manages a communication device (for example, the base station 40). For example, the communication control device 60 is a device that controls radio communication of the base station 40. For example, the communication control device 60 is a device that determines a communication parameter (also referred to as an operation parameter) to be used by the base station 40 and gives permission or an instruction to the base station 40. It is noted that the communication control device 60 may control radio communication of the terminal device 30 via the base station 40 or directly. The communication control device 60 is a type of information processing device.

The communication control device 60 is, for example, a server/system called a TV white space database (TVWSDB), a geolocation database (GLDB), a spectrum access system (SAS), or an automated frequency coordination (AFC). Furthermore, the communication control device 60 may be a network manager that integrally controls radio devices in a network. In addition, taking the ETSI EN 303 387 or IEEE 802.19.1-2018 as an example, the communication control device 60 may be a control device such as a spectrum manager/coexistence manager that performs radio wave interference control between radio devices. Furthermore, for example, a registered location secure server (RLSS) defined in IEEE 802.11-2016 can also serve as the communication control device 60. In addition, under the spectrum sharing environment, a database (a database server, a device, and a system) such as a geo-location database (GLDB) or a spectrum access system (SAS) can also serve as the communication control device 60. An automated frequency coordination (AFC) system defined in Non Patent Literature 12 (AFC System to AFC Device Interface Specification Version) can also serve as the communication control device 60.

Of course, the communication control device 60 is not limited to these examples. An entity that performs instruction and/or management related to spectrum sharing may be referred to as a communication control device. In addition, an entity that determines and/or permits a communication parameter of a communication device may be referred to as a communication control device. Basically, a control target of the communication control device 60 is the base station 40, but the terminal device 30 that is subordinate to the base station 40 may be controlled.

It is noted that when the communication system 2 is a cellular communication system, the communication control device 60 may be a device constituting a core network. The core network CN is, for example, an evolved packet core (EPC) or a 5G core network (5GC). When the core network is the EPC, the communication control device 60 may be, for example, a device having a function as a mobility management entity (MME). Furthermore, in a case where the core network is 5GC, the communication control device 60 may be, for example, a device having a function as an access and mobility management function (AMTF) or a session management function (SMF). It is noted that even when the communication system 2 is a cellular communication system, the communication control device 60 is not necessarily a device constituting a core network. For example, the communication control device 60 may be a device having a function as a radio network controller (RNC).

It is noted that the communication control device 60 may have a function of a gateway. For example, when the core network is the EPC, the communication control device 60 may be a device having a function as a serving gateway (S-GW) or a packet data network gateway (P-GW). Further, when the core network is 5GC, the communication control device 60 may be a device having a function as a user plane function (UPF). Furthermore, the communication control device 60 may be an SMF, a PCF, a UDM, or the like. The core network CN may include the SMF, the PCF, the UDM, and the like.

It is noted that the communication control device 60 is not necessarily a device constituting a core network. For example, it is assumed that the core network is a core network of wideband code division multiple access (W-CDMA) or code division multiple access 2000 (cdma2000). At this time, the communication control device 60 may be a device that functions as a radio network controller (RNC).

The communication control device 60 may be connected to each of the plurality of base stations 40. For example, in the case of 5GC, an N2 reference point exists between an AMF and an NG-RAN, and the AMF and the NG-RAN are logically connected to each other via an NG interface.

The communication control device 60 manages communication of the base station 40. For example, the communication control device 60 may manage the position of the terminal device 30 for each terminal device 30 in units of areas (for example, tracking area and RAN notification area) including a plurality of cells. It is noted that the communication control device 60 may grasp and manage, for each terminal device 30, which base station 40 (or which cell) the terminal device 30 is connected to, which base station 40 (or which cell) the terminal device 30 exists in the communication area, and the like.

Basically, the control target of the communication control device 60 is the base station 40, but the communication control device 60 may control the terminal device 30 that is subordinate to the base station 40. Furthermore, the communication control device 60 may control a plurality of secondary systems. In this case, the communication system 2 can be regarded as a system including a plurality of secondary systems.

It is noted that the communication control device 60 can also acquire necessary information from entities other than the base station 40, the terminal device 30, and the intermediate device 50 for its role. Specifically, the communication control device 60 can acquire, for example, information necessary for protection, such as position information of the primary system, from a database (a regulatory database) managed and operated by a radio wave administration agency (national regulatory authority (NRA)) of a country or a region. An example of the regulatory database includes the universal licensing system (ULS) operated by the federal communications commissions (FCC). Examples of information necessary for protection may include, for example, primary system position information, primary system communication parameters, out-of-band emission (OOBE) limit, adjacent channel leakage ratio (ACLR), adjacent channel selectivity, fading margin, protection ratio (PR), and/or the like. For these examples, in a case where a fixed numerical value and an acquisition/derivation method is defined by a law or the like, it is desirable to use the value and the method.

Furthermore, as another example, it is also conceivable that the communication control device 60 acquires radio wave sensing information from a radio wave sensing system installed and operated for the purpose of radio wave detection in the primary system. As a specific example, the communication control device 60 acquires radio wave detection information of a ship-based radar serving as the primary system from a radio wave sensing system called an environmental sensing capability (ESC) in the CBRS of the United States. Furthermore, in a case where a communication device or a terminal has a sensing function, the communication control device 60 may acquire the radio wave detection information of the primary system from the communication device or the terminal.

Figure 14:
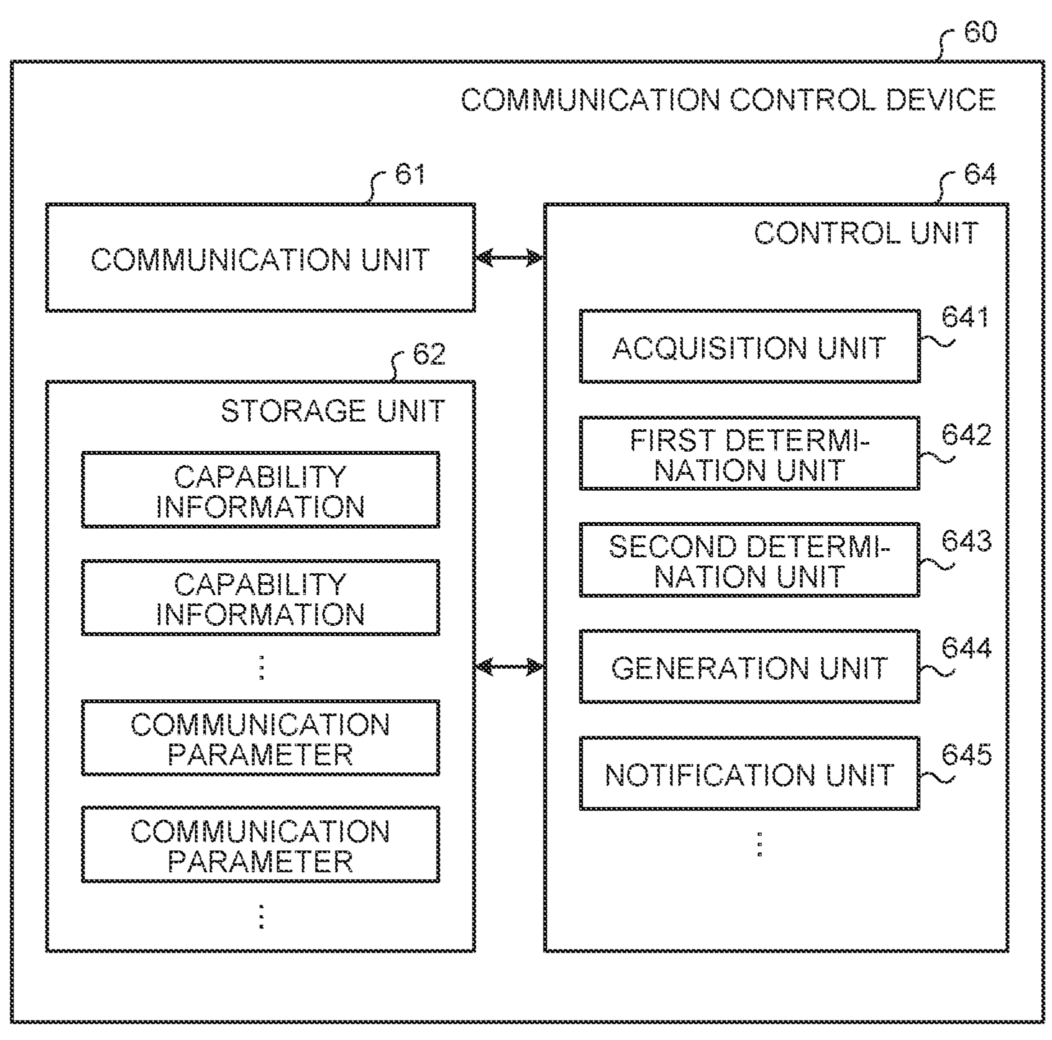
FIG. 14 is a diagram illustrating a configuration example of the communication control device according to the embodiment of the present disclosure.

FIG. 14 is a diagram illustrating a configuration example of the communication control device 60 according to the embodiment of the present disclosure. The communication control device 60 includes a communication unit 61, a storage unit 62, and a control unit 64. It is noted that the configuration illustrated in FIG. 14 is a functional configuration, and a hardware configuration may be different from the functional configuration. Furthermore, the functions of the communication control device 60 may be implemented in a distributed manner in a plurality of physically separated configurations. For example, the communication control device 60 may include a plurality of server devices.

The communication unit 61 is a communication interface that communicates with other communication devices (for example, the base station 40, the terminal device 30, the intermediate device 50, and another communication control device 60). The communication unit 61 may be a radio interface or a wired interface. For example, it is assumed that the communication unit 61 is a radio communication interface. At this time, the communication unit 61 may be compatible with one or a plurality of radio access methods. For example, the communication unit 61 may be compatible with both NR and LTE. Furthermore, the communication unit 61 may be compatible with other radio access methods such as W-CDMA and cdma2000.

Furthermore, the communication unit 61 may be a communication interface other than the radio communication interface. At this time, the communication unit 61 may be a network interface or a device connection interface. For example, the communication unit 61 may be a local area network (LAN) interface such as a network interface card (NIC), or may be a USB interface including a universal serial bus (USB) host controller, a USB port, and the like. In addition, the configuration of the communication unit 61 may be similar to that of the radio communication unit 41 or the network communication unit 43 of the base station 40.

The storage unit 62 is a storage device capable of reading and writing data, such as a DRAM, an SRAM, a flash memory, or a hard disk. The storage unit 62 functions as a storage means of the base station 40. The storage unit 62 stores an operation parameter of each of the plurality of base stations 40 constituting the communication system 2. It is noted that the storage unit 62 may store stored resource information of each of the plurality of base stations 40 constituting the communication system 2. As described above, the stored resource information is information on storage of the radio resource of the base station 40.

The control unit 64 is a controller that controls each unit of the communication control device 60. The control unit 64 is implemented by, for example, a processor such as a CPU or an MPU. For example, the control unit 64 is implemented by allowing a processor to execute various programs stored in a storage device in the communication control device 60 using a RAM or the like as a work area. It is noted that the control unit 64 may be implemented by an integrated circuit such as an ASIC or an FPGA. Any of the CPU, the MPU, the ASIC, and the FPGA can be regarded as a controller.

As illustrated in FIG. 14, the control unit 64 includes an acquisition unit 641, a first determination unit 642, a second determination unit 643, a generation unit 644, and a notification unit 645. Each block (the acquisition unit 641 to the notification unit 645) constituting the control unit 64 is a functional block indicating a function of the control unit 64. These functional blocks may be software blocks or hardware blocks. For example, each of the functional blocks described above may be one software module realized by software (including a microprogram), or may be one circuit block on a semiconductor chip (a die). Of course, each functional block may be one processor or one integrated circuit. A configuration method of the functional block is freely selected. It is noted that the control unit 64 may be configured by a functional unit different from the above-described functional block. The operation of each block constituting the control unit 64 will be described later.

It is noted that the control unit 44 of the base station 40 may include each functional block (the acquisition unit 641 to the notification unit 645) included in the control unit 64 of the communication control device 60. In this case, the description of the "communication control device 60" appearing in the following description can be appropriately replaced with the "base station 40" or the "intermediate device 50". In addition, description of the "control unit 64", the "acquisition unit 641", the "first determination unit 642", the "second determination unit 643", the "generation unit 644", and the "notification unit 645" appearing in the following description can also be appropriately replaced with the "control unit 44" or the "control unit 54".

3. Interference Model

Figure 15:
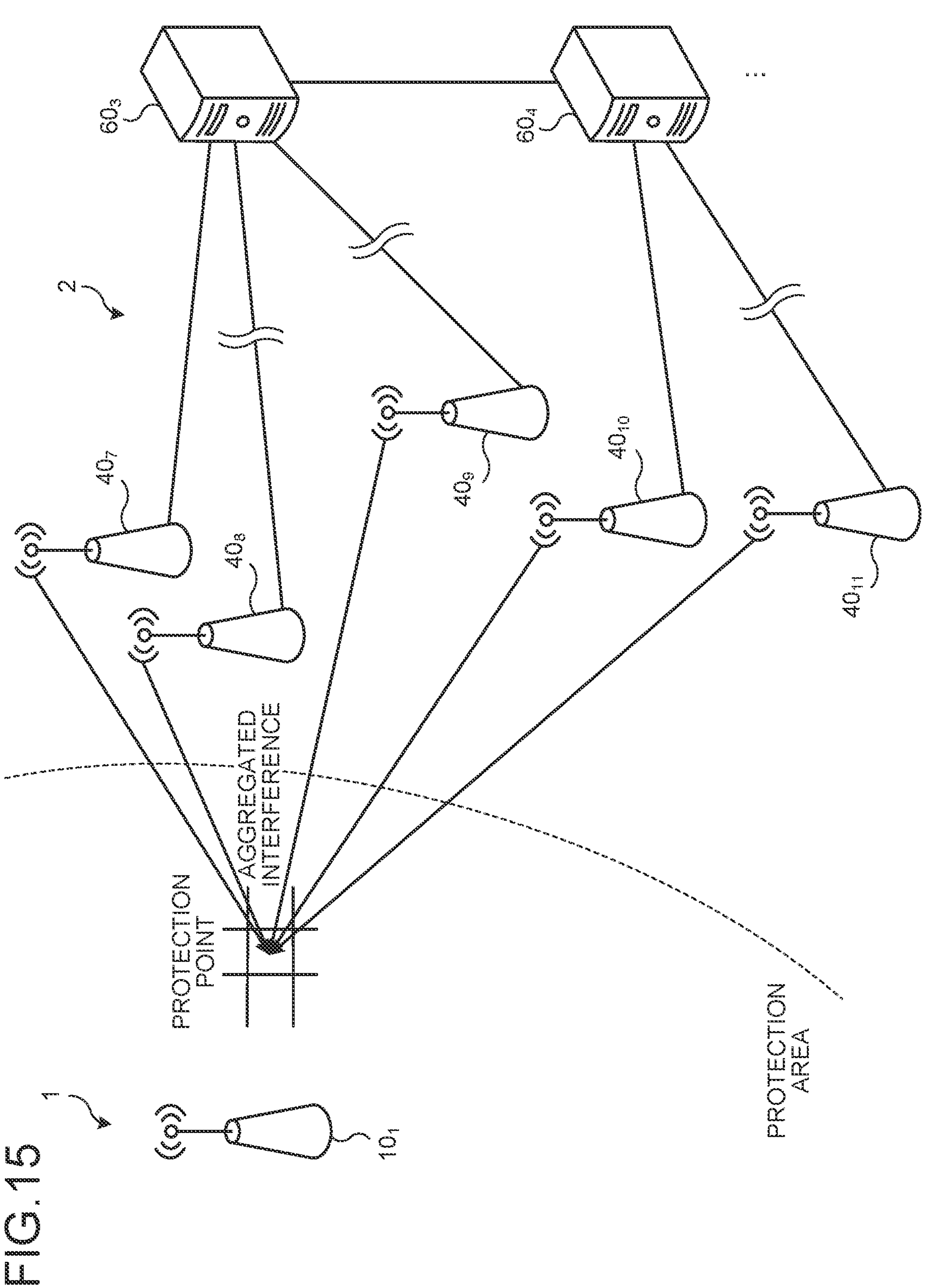
FIG. 15 is an explanatory diagram illustrating an example of an interference model assumed in the embodiment of the present disclosure.

Next, an interference model assumed in the present embodiment will be described. FIG. 15 is an explanatory diagram illustrating an example of an interference model assumed in the embodiment of the present disclosure. It is noted that the description of the base station 40 appearing in the following description can be replaced with a word indicating another communication device having a radio communication function.

The interference model illustrated in FIG. 15 is applied, for example, in a case where the primary system has a service area. In the example of FIG. 15, the communication system 1 (the primary system) is a radio communication system having a service area. This service area is, for example, a protection area of the communication system 1. A plurality of interference calculation reference points (hereinafter, each of which is referred to as an interference calculation points or a protection point) is set in the protection area. The protection point is set by, for example, an operator of the communication system 1 or a public organization that manages radio waves (hereinafter, referred to as an administrator). For example, the administrator may divide the protection area into a lattice shape and set the center of a predetermined lattice as the protection point. A method of determining the protection point is freely and selectively performed.

It is noted that the protection point may be set not only in the horizontal direction but also in the vertical direction. That is, the protection points may be arranged three-dimensionally. In the following description, a protection point (that is, a protection point that is not a protection point under the assumption of a horizontal plane but a protection point under the assumption of a three-dimensional space) three-dimensionally arranged may be referred to as a spatial protection point.

An interference margin of each protection point is set by an administrator or the like. FIG. 15 illustrates interference given to protection points by a plurality of base stations 40 constituting the communication system 2 (the secondary system). The communication control device 60 of the communication system 2 controls the transmission power of the plurality of base stations 40 so that the aggregated interference at each protection point does not exceed the set interference margin.

Figure 16:
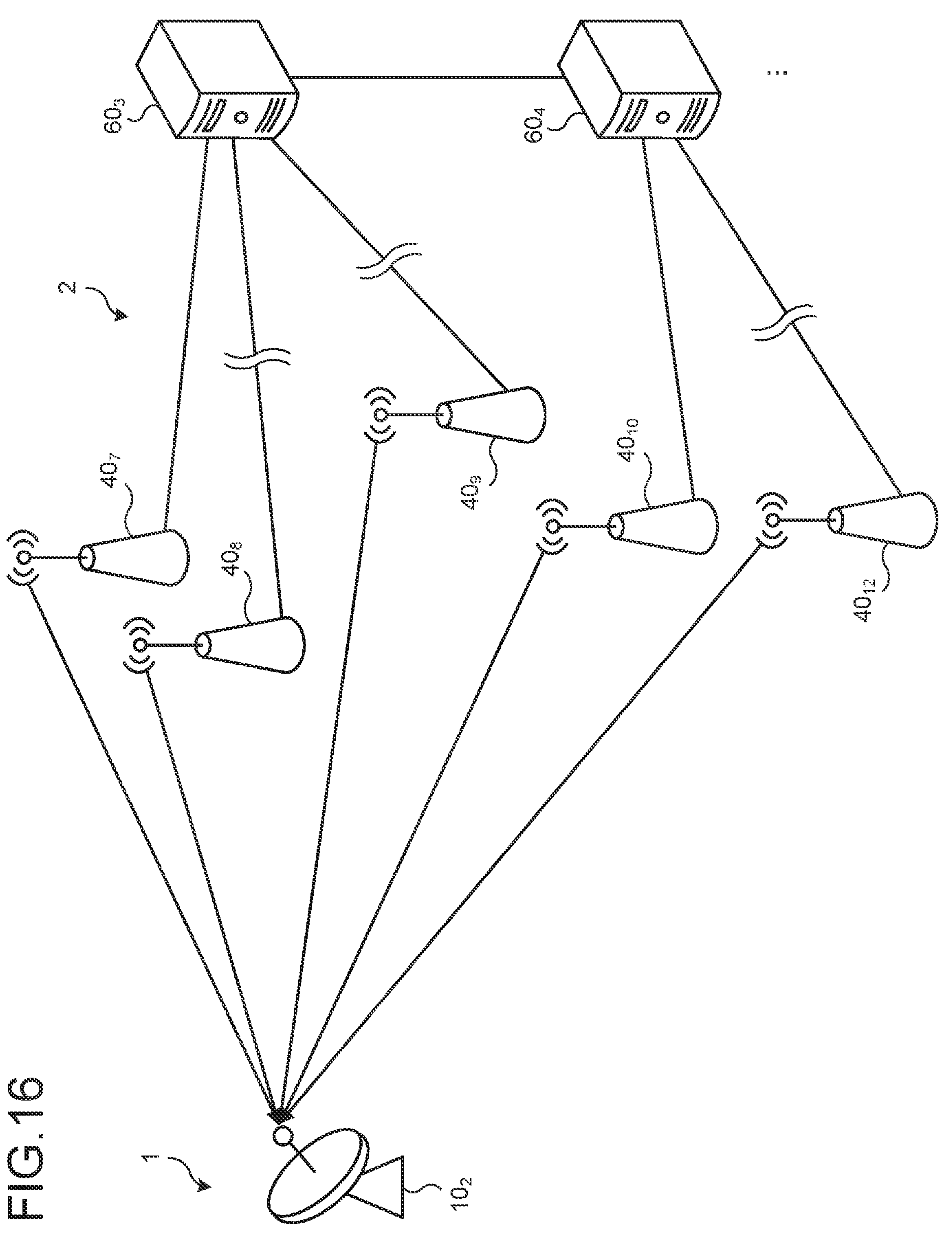
FIG. 16 is an explanatory diagram illustrating another example of the interference model assumed in the embodiment of the present disclosure.

FIG. 16 is an explanatory diagram illustrating another example of the interference model assumed in the embodiment of the present disclosure. The interference model illustrated in FIG. 16 is applied, for example, in a case where the primary system performs only reception. In the example of FIG. 16, the communication system 1 (the primary system) includes a reception antenna serving as the radio wave use device $\mathbf{10}_2$. The radio wave use device $\mathbf{10}_2$ is, for example, a reception antenna of a satellite ground station. The communication control device 60 of the communication system 2 sets the position of the reception antenna as a protection point, and controls the transmission power of the plurality of base stations 40 so that the aggregated interference at the point does not exceed the interference margin.

4. Primary System Protection Method

Next, a primary system protection method will be described. As described above, the primary system protection method can be classified into, for example, the following two types.

(1) Interference margin simultaneous allocation type (2) Interference margin sequential allocation type It is noted that, as an example of the primary system protection method of the interference margin simultaneous allocation type, for example, there is a method disclosed in Non Patent Literature 3 (ECC Report 186) (for example, a calculation method of the maximum allowable EIRP). Further, an example of the primary system protection method of the interference margin sequential allocation type includes an iterative allocation process (IAP) disclosed in Non Patent Literature 6 (WINNF-TS-0112).

Hereinafter, the primary system protection method of the "interference margin simultaneous allocation type" and the primary system protection method of the "interference margin sequential allocation type" will be described. It is noted that the description of the base station 40 appearing in the following description can be replaced with a word indicating another communication device having a radio communication function.

4-1. Interference Margin Simultaneous Allocation Type

Figure 17:
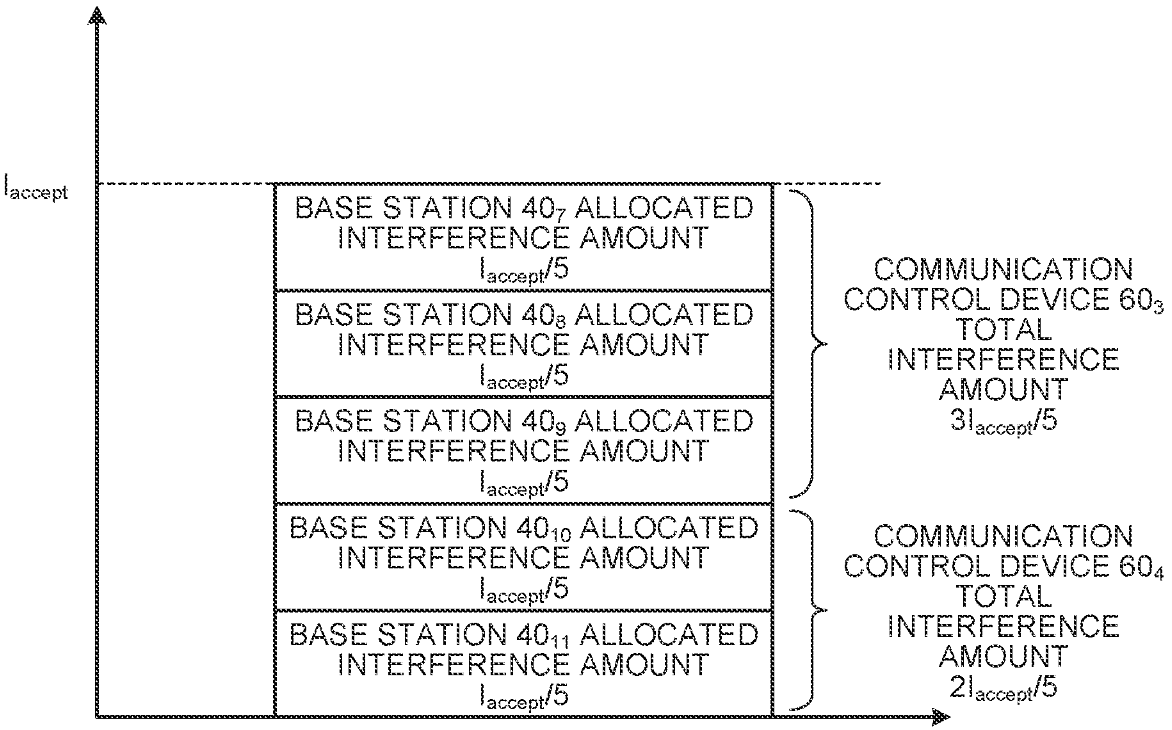
FIG. 17 is an explanatory diagram illustrating a primary system protection method of an interference margin simultaneous allocation type.

First, the primary system protection method of the interference margin simultaneous allocation type will be described. FIG. 17 is an explanatory diagram illustrating the primary system protection method of the interference margin simultaneous allocation type. As described above, in the interference margin simultaneous allocation type, the communication control device 60 calculates the maximum allowable transmission power of the secondary system using "a value uniquely obtained by a positional relationship between a protection reference point of the primary system and the secondary system" as a reference value. In the example of FIG. 17, an allowable interference threshold value of the primary system is $I_{accept}$. This threshold value may be an actual threshold value, or may be a value set in consideration of a certain margin (for example, a protection ratio) from the actual threshold value in consideration of a calculation error and an interference variation.

In the primary system protection method of the interference margin simultaneous allocation type, interference control means determining transmission power (EIRP, conducted power+antenna gain, and the like) of a radio device so as not to exceed the allowable interference threshold value. At this time, if there are a large number of base stations 40 and each of the base stations 40 does not exceed the allowable interference threshold value, interference power received in the communication system 1 (the primary system) may exceed the allowable interference threshold value. Therefore, an interference margin (an allowable interference amount) is "allocated" based on the number of base stations 40 registered in the communication control device 60.

For example, in the example of FIG. 17, the total number of base stations 40 is five. Therefore, an allowable interference amount of $I_{accept}/5$ is allocated individually. Since the base station 40 cannot recognize an allocation amount by itself, the base station 40 recognizes the allocation amount through the communication control device or acquires the transmission power determined based on the allocation amount. Since the communication control device cannot recognize the number of radio devices managed by other communication control devices, the communication control device can recognize the total number by exchanging information with each other, and can allocate the allowable interference amount. For example, the allowable interference amount of $3I_{accept}/5$ is allocated in the communication control device $\mathbf{60}_1$.

Figure 18:
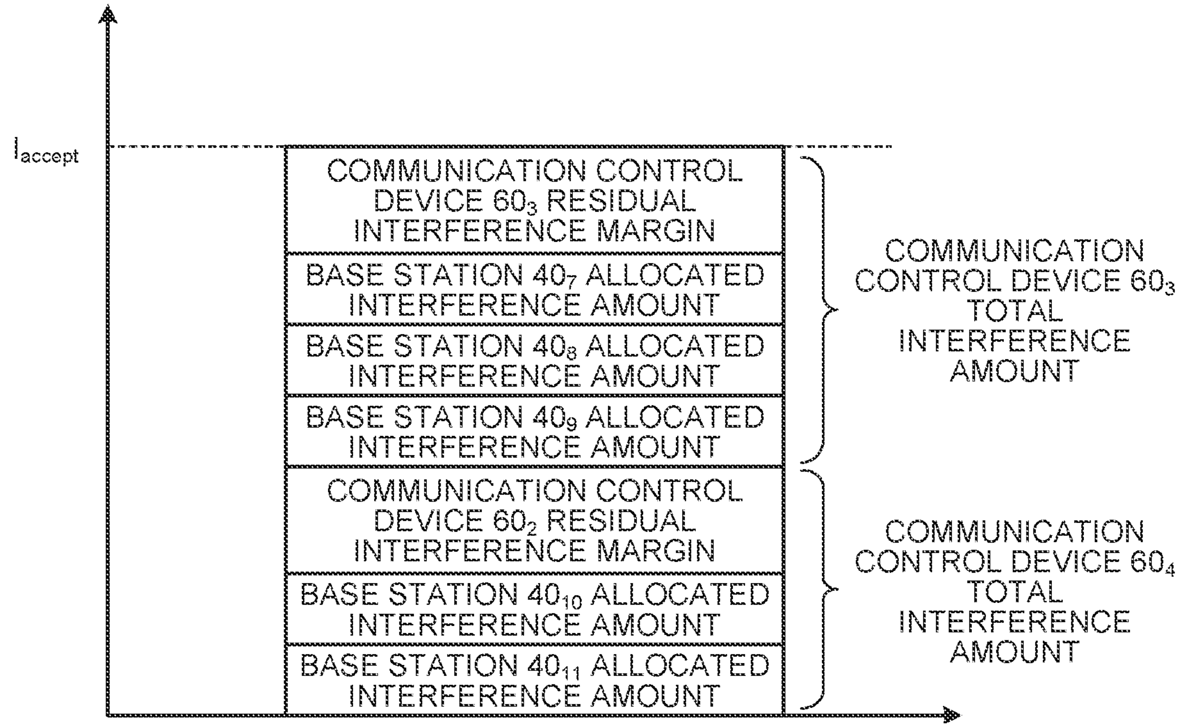
FIG. 18 is a diagram illustrating a state in which a residual interference margin occurs.

It is noted that, in this method, the interference margin not used by the base station 40 can be a residual interference margin. FIG. 18 is a diagram illustrating a state in which the residual interference margin occurs. FIG. 18 illustrates a total interference amount set in each of the two communication control devices 60 (the communication control devices $\mathbf{60}_3$ and $\mathbf{60}_4$). In addition, FIG. 18 illustrates an interference amount (allocated interference amount) allocated to a predetermined protection point of the communication system 1 by a plurality of base stations 40 (base stations $\mathbf{40}_7$ to $\mathbf{40}_{11}$) under the management of the two communication control devices 60. An interference amount obtained by subtracting the interference amount of the base station 40 from the total interference amount of each of the two communication control devices 60 is a residual interference margin. In the following description, an excessive interference amount is referred to as a residual interference margin. The residual interference margin can be rephrased as a residual interference amount.

4-2. Interference Margin Sequential Allocation Type

Figure 19:
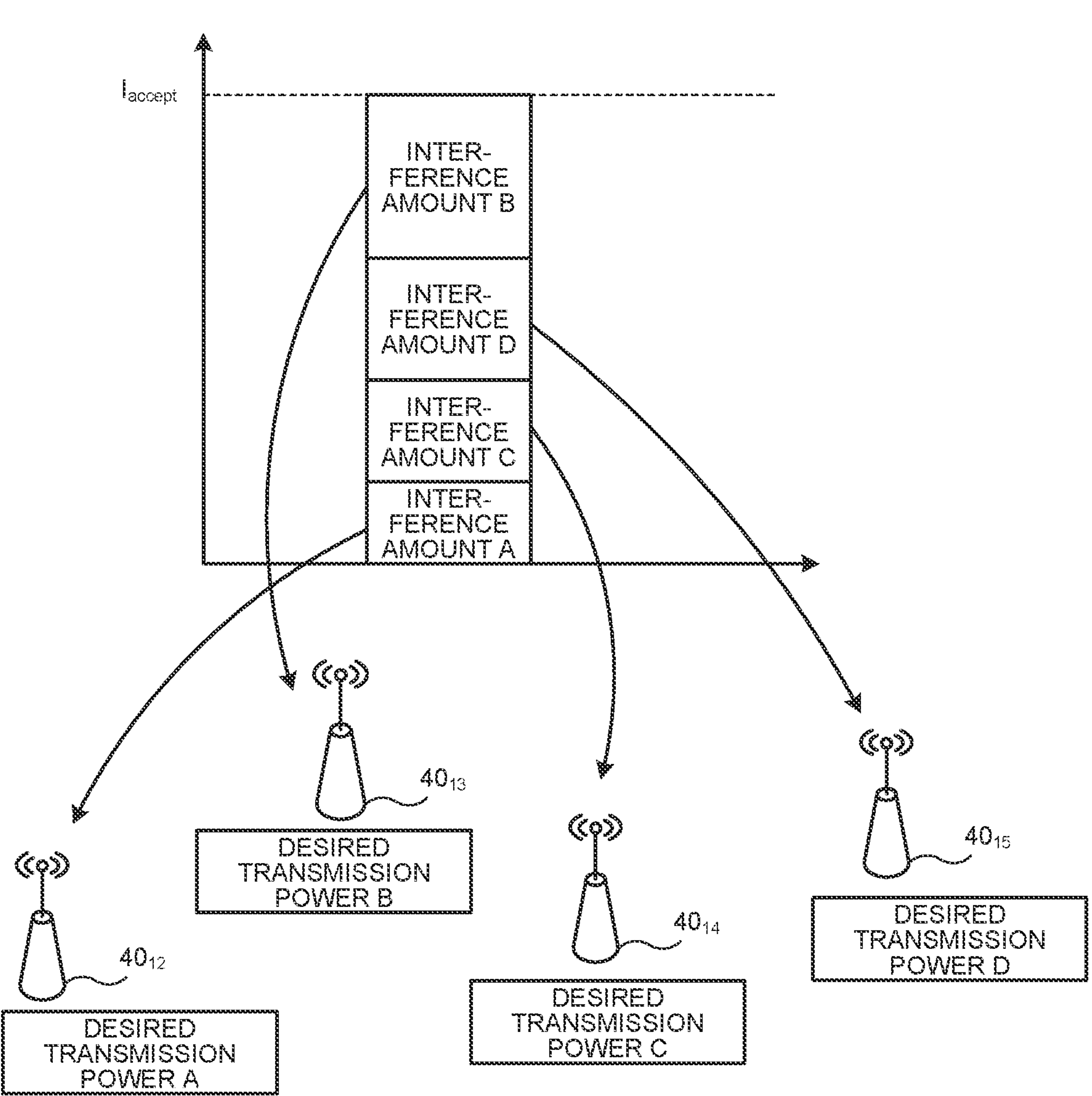
FIG. 19 is an explanatory diagram illustrating a primary system protection method of an interference margin sequential allocation type.

Next, the primary system protection method of the interference margin sequential allocation type will be described. As described above, in the interference margin sequential allocation type, the communication control device 60 calculates the maximum allowable transmission power of the secondary system using the "desired transmission power of the secondary system" as a reference value. FIG. 19 is an explanatory diagram illustrating the primary system protection method of the interference margin sequential allocation type. In the interference margin sequential allocation type, for example, each of the plurality of base stations 40 stores the desired transmission power information in the storage unit 42. The desired transmission power information is information on transmission power required by the base station 40 for transmission of radio waves to the communication control device 60. In the example of FIG. 19, the base stations $\mathbf{40}_{12}$ to $\mathbf{40}_{15}$ store the pieces of desired transmission power information A to D, respectively. The communication control device 60 allocates the interference amounts A to D to the base stations $\mathbf{40}_{12}$ to $\mathbf{40}_{15}$ based on the pieces of desired transmission power information A to D, respectively.

5. Description of Various Procedures

Next, a description will be given as to a basic procedure that can be used when the system (for example, the communication system 2) of the present embodiment is implemented.

A part or all of the following procedures may be procedures related to the basic operation of the communication device (for example, the base station 40) constituting the secondary system. It is noted that, for example, in the case of the CBRS of WINNF, all the following procedures (<5-1. Registration procedure> to <5-4. Spectrum use notification>) can be procedures related to the basic operation of the communication device. In the AFC system of the Wi-Fi Alliance, the procedure illustrated in <5-2. Available spectrum inquiry procedure> can be a procedure related to the basic operation of the communication device. Of course, other procedures may be regarded as procedures related to the basic operation of the communication device.

It is noted that the description of the base station 40 appearing in the following description can be replaced with a word indicating another communication device having a radio communication function.

5-1. Registration Procedure

The registration procedure is a procedure of registering a device parameter related to the base station 40 in the communication control device 60. Typically, the registration procedure is started when one or more communication systems including the base station 40 or the plurality of base stations 40 notify the communication control device 60 of a registration request including a device parameter. The registration request may be transmitted by a communication system (for example, a proxy system such as the intermediate device 50) that represents (serves as a representative of) one or more base stations 40.

In the following description, it is assumed that the communication system that represents (serves as a representative of) the plurality of base stations 40 is the intermediate device 50, but a word of the intermediate device 50 appearing in the following description can be replaced with a word indicating a communication system that represents (serves as a representative of) another communication device such as a proxy system. Of course, the description of the base station 40 can also be replaced with a word indicating another communication device having a radio communication function.

(Details of Required Parameter)

The device parameter refers to, for example, the following information.

- Communication device user information
- Information specific to communication device
- Information related to position
- Antenna information
- Radio interface information
- Legal information
- Installer information
- Communication device group information At the time of implementation, information other than the above-described pieces of information may be treated as a device parameter.

The communication device user information is information related to a user of a communication device. For example, a user ID, an account name, a user name, a user contact, a call sign, and the like can be assumed. The user ID and the account name may be independently generated by a communication device user or may be issued in advance by a communication control device. As the call sign, it is desirable to use a call sign issued by an NRA.

The communication device user information can be used for, for example, interference resolution. As a specific example, in a spectrum use notification procedure described in <5-4> to be described later, even if the communication control device makes a determination to issue an instruction of stopping the use of a spectrum that is being used by a communication device, in a case where a spectrum use notification request of the spectrum is continuously notified, it is possible to suspect a failure of the communication device and make a contact with the user contact included in the communication device user information for a behavior confirmation request of the communication device. Here, the present invention is not limited to this example, and when it is determined that the communication device is performing an operation against the communication control performed by the communication control device, the communication device user information can be used to make a contact.

The information specific to the communication device includes information that can identify the communication device, communication device product information, information on hardware of the communication device, information on software of the communication device, and the like. For example, a serial number, a product model number, and the like may be included. Here, the communication device is, for example, the base station 40.

The information that can identify the communication device indicates the communication device user information, a communication device manufacturing number (serial number), a communication device ID, and the like. For example, a user ID, a call sign, and the like can be assumed as the communication device user information. The user ID may be independently generated by the communication device user or may be issued in advance by the communication control device 60. For example, the communication device ID may be uniquely assigned by the communication device user.

The communication device product information may include, for example, an authentication ID, a product model number, manufacturer information, and the like. The authentication ID is, for example, an ID given from an authentication organization in each country or region, such as an FCC ID, a CE number, and a technical standard conformity certification (technical standards compliance). An ID issued by an industry association or the like based on a unique authentication program may be included.

The information specific to the communication device represented by the authentication ID, the product model number, the manufacturer information can be used, for example, for whitelist/blacklist applications. For example, in a case where any piece of information corresponding to the communication device in operation is included in a blacklist, the communication control device is capable of issuing an instruction to stop using a spectrum in the spectrum use notification procedure described in <5-4> to be described later, and taking action so as not to cancel a use suspension measure until the blacklist is canceled. Furthermore, for example, in a case where the communication device included in the blacklist performs the registration procedure, the communication control device can reject registration. Furthermore, for example, it is also possible to perform an operation of not considering a communication device corresponding to information included in the blacklist in interference calculation described in the present specification, or considering only a communication device corresponding to information included in a whitelist in the interference calculation.

The information on the hardware of the communication device may include, for example, transmission power class information, manufacturer information, and the like. For example, in FCC C.F.R Part 96, two types of classes including a category A and a category B are defined as the transmission power class information, and any one of the types of information can be included. Further, in 3GPP TS 36.104 and TS 38.104, some classes of eNodeB and gNodeB are defined, and these classes may also be used.

The transmission power class information may be used, for example, in an application of the interference calculation. The interference calculation can be performed using the maximum transmission power defined for each class as the transmission power of the communication device.

The information on the software of the communication device can include, for example, version information, a build number, and the like regarding an execution program in which processing necessary for interaction with the communication control device 60 is described. In addition, version information, a build number, and the like of software for operating as the base station 40 may also be included.

The information on the position is typically information that can identify the geographical position of the communication device (for example, the base station 40). For example, the information is coordinate information acquired by a positioning function represented by a global positioning system (GPS), Beidou, a quasi-zenith satellite system (QZSS), Galileo, or an assisted global positioning system (A-GPS). Typically, information on latitude, longitude, altitude, and positioning error may be included. Alternatively, for example, the information may be position information registered in an information management device managed by a national regulatory authority (NRA) or its agency. Alternatively, for example, coordinates of an X-axis, a Y-axis, and a z-axis with a specific geographical position as an origin may be used. In addition, an identifier indicating outdoor/indoor can be provided together with such coordinate information.

Furthermore, the information on the position may be information indicating a zone in which the communication device (for example, the base station 40) is located. For example, information defined by administration, such as a postal code and an address, may be used. Furthermore, for example, the zone may be indicated by a set of three or more geographic coordinates. The information indicating these zones may be provided together with the coordinate information.

Furthermore, in a case where the communication device (for example, the base station 40) is located indoors, information indicating a floor of a building may be assigned to the information on the position. For example, a floor number, an identifier indicating ground/underground, or the like may be assigned. Furthermore, for example, information indicating a further closed space inside the building, such as a room number and a room name in the building, may be assigned.

Typically, the above-described positioning function is desirably provided by the communication device (for example, the base station 40). However, it is not always possible to acquire the position information satisfying the required accuracy depending on the performance of the positioning function or the installation position. Therefore, the positioning function may be used by an installer. In such a case, it is desirable that the position information measured by the installer is written to the base station 40.

The antenna information is typically information indicating performance, a configuration, and the like of an antenna included in the communication device (for example, the base station 40). Typically, information such as an antenna installation height, a tilt angle (Downtilt), a horizontal orientation (Azimuth), a boresight, an antenna peak gain, and an antenna model may be included.

The antenna information may also include information on a formable beam. For example, information such as a beam width, a beam pattern, and an analog/digital beamforming capability may be included.

The antenna information may also include information on performance and configuration of multiple input multiple output (MIMO) communication. For example, information such as the number of antenna elements and the maximum number of spatial streams may be included. In addition, codebook information to be used, weight matrix information (a unitary matrix obtained by singular value decomposition (SVD), eigen value decomposition (EVD), block diagonalization (BD), or the like, a zero-forcing (ZF) matrix, or a minimum mean square error (MMSE) matrix), and the like can be included. In addition, in the case of including maximum likelihood detection (MLD) or the like that requires nonlinear calculation, information indicating the MLD or the like may be included.

The antenna information may include zenith of direction/departure (ZoD). The ZoD is a type of radio wave arrival angle. The ZoD may be estimated by another communication device (for example, another base station 40) from a radio wave radiated from an antenna of a communication device (for example, a base station 40). In this case, the communication device may be a terminal device that operates as a base station or an access point, a device that performs D2D communication, a moving relay base station, or the like. The ZoD can be estimated by a radio wave arrival direction estimation technology such as multiple signal classification (MUSIC) or estimation of signal propagation via rotation invariance techniques (ESPRIT). Measurement information can be used by the communication control device 60.

The radio interface information is typically information indicating a radio interface technology included in the communication device (for example, the base station 40). For example, identifier information indicating a standard technology such as a technology used in GSM (registered trademark), CDMA2000, UMTS, E-UTRA, E-UTRA NB-IoT, 5G NR or a further next generation cellular system, an LTE-compliant derivative technology such as MulteFire or LTE-Unlicensed (LTE-U), a metropolitan area network (MAN) such as WiMAX or WiMAX2+, or an IEEE 802.11 wireless LAN is included. The radio interface information may be identifier information indicating a proprietary radio technology. In addition, a version number or a release number of the technical specification that defines them may also be assigned.

Further, the radio interface information may also include frequency band information supported by the communication device (for example, the base station 40). For example, the information may be expressed by one or more combinations of an upper limit frequency and a lower limit frequency, one or more combinations of a center frequency and a bandwidth, or one or more 3GPP operating band numbers.

The frequency band information supported by the communication device may further include capability information of a band extension technology such as carrier aggregation (CA) or channel bonding. For example, combinable band information or the like may be included. Furthermore, the carrier aggregation may also include information on a band to be used as a primary component carrier (PCC) or a secondary component carrier (SCC). Further, the number of CCs that can be aggregated at the same time can be included.

The frequency band information supported by the communication device may further include combination information of frequency bands supported by dual connectivity and the multi connectivity. In addition, information of other communication devices that cooperatively provide the dual connectivity and the multi connectivity may be provided together.

As the frequency band information supported by the communication device, information indicating radio wave use priority such as PAL and GAA may be included.

The radio interface information may also include modulation method information supported by the communication device (for example, the base station 40). For example, as a representative example, information indicating a primary modulation method such as frequency shift keying (FSK), n-value phase shift keying (PSK) (n is 2, 4, 8, or the like), or n-value quadrature amplitude modulation (QAMV) (n is 4, 16, 64, 256, or the like), or information indicating a secondary modulation method such as orthogonal frequency division multiplexing (OFDM), scalable OFDM, DFT spread OFDM (DFT-s-OFDM), generalized frequency division multiplexing (GFDM), or filter bank multi carrier (FBMC) may be included.

The radio interface information may also include information on an error correction code. For example, capabilities such as a turbo code, a low density parity check (LDPC) code, a polar code, and an erasure correction code, and coding rate information to be applied can be included.

The modulation method information and the information on the error correction code can also be expressed by a modulation and coding scheme (MCS) index as another aspect.

The radio interface information may also include information indicating a function specific to each radio technical specification supported by the communication device (for example, the base station 40). For example, as a representative example, there is transmission mode (TM) information defined in LTE. In addition, those having two or more modes with respect to a specific function can be included in the radio interface information as in the TM described above. In addition, in the technical specification, in a case where the base station 40 supports a function that is not indispensable in the specification even if there are not two or more modes, information indicating this may also be included.

The radio interface information may also include radio access technology (RAT) information supported by the communication device (for example, the base station 40). For example, information indicating an orthogonal multiple access (OMA) method such as time division multiple access (TDMA), frequency division multiple access (FDMA), or orthogonal frequency division multiple access (OFDMA), a non-orthogonal multiple access (NOMA) method such as power division multiple access (PDMA, representative example thereof is a technique implemented by a combination of superposition coding (SPC) and successive interference canceller (SIC)), code division multiple access (CDMA), sparse code multiple access (SCMA), interleaver division multiple access (IDMA), or spatial division multiple access (SDMA), or an opportunistic access method such as carrier sense multiple access/collision avoidance (CSMA/CA) or carrier sense multiple access/collision detection (CSMA/CD) may be included.

When the radio interface information includes information indicating the opportunistic access method, information indicating details of an access method may be further included. As a specific example, information indicating which one of frame based equipment (FBE) and load based equipment (LBE) defined in ETSI EN 301 598 is selected is included.

When the radio interface information described above indicates the LBE, information specific to the LBE, such as a priority class defined in ETSI EN 301 598, may be further included.

The radio interface information may also include information on a duplex mode supported by the communication device (for example, the base station 40). For example, frequency division duplex (FDD), time division duplex (TDD), and full duplex (FD) can be included as a representative example.

In a case where the TDD is included as the radio interface information, TDD frame configuration information used/supported by the base station 40 may be added. Furthermore, information on the duplex mode may be included for each frequency band indicated by the frequency band information.

When the FD is included as the radio interface information, information on an interference power detection level may be included.

The radio interface information may also include information on a transmission diversity method supported by the communication device (for example, the base station 40). For example, space time coding (STC) or the like may be included.

The radio interface information may also include guard band information. For example, information on a standard guard band size may be included. Alternatively, for example, information on a guard band size desired by the base station 40 may be included.

The radio interface information may be provided for each frequency band regardless of the above-described aspect.

The legal information is typically information on regulations that the communication device (for example, the base station 40) must comply with, which are defined by a radio administration agency or an equivalent organization in each country or region, authentication information acquired by the communication device (for example, the base station 40), or the like. Typically, the information on the regulations may include, for example, upper limit value information of out-of-band radiation, information on a blocking characteristic of a receiver, and the like. Typically, the authentication information can include, for example, type approval information (FCC ID, technical standard conformance certificate, and the like), legal/regulatory information (for example, FCC regulation number, ETSI Harmonized Standard number, and the like) serving as a standard for authentication acquisition, and the like.

Among the pieces of legal information, those related to numerical values may be substituted with those defined in the specification of the radio interface technology. For example, the upper limit value of the out-of-band radiation may be derived and used by using an adjacent channel leakage ratio (ACLR) instead of the upper limit value information of the out-of-band radiation. In addition, the ACLR itself may be used as necessary. Further, adjacent channel selectivity (ACS) may be used instead of the blocking characteristic. In addition, these may be used in combination, or an adjacent channel interference ratio (ACIR) may be used. It is noted that, in general, the ACIR has a relationship with the ACLR and the ACS represented by the following mathematical formula (1).

$$ACIR=(1/ACS+1/ACLR)^{-1} \quad (1)$$

It is noted that, although a true value expression is used in the mathematical formula (1), the mathematical formula (1) may be appropriately converted into a logarithmic expression.

The installer information may include information capable of specifying a person (an installer) who installs the communication device (for example, the base station 40), specific information associated with the installer, and the like. Typically, information on a person who is responsible for the position information of the communication device, in which the person is called a certified professional installer (CPI) defined in Non Patent Literature 2 (WINNF-TS-0016), can be included. As the information, a certified professional installer registration ID (CPIR-ID) and a CPI name are disclosed. In addition, as specific information associated with the CPI, for example, a contact address (Mailing/Contact address), an e-mail address, a telephone number, a public key identifier (PKI), and the like are disclosed. The information is not limited thereto, and other information on the installer may be included as necessary.

The communication device group information may include information on a communication device group to which a communication device belongs. Specifically, for example, information on the same or equivalent type of group as disclosed in WINNF-SSC-0010 may be included. Furthermore, for example, in a case where a communication carrier manages communication devices in units of groups according to its own operation policy, the group information can be included.

Figures 20, 21:
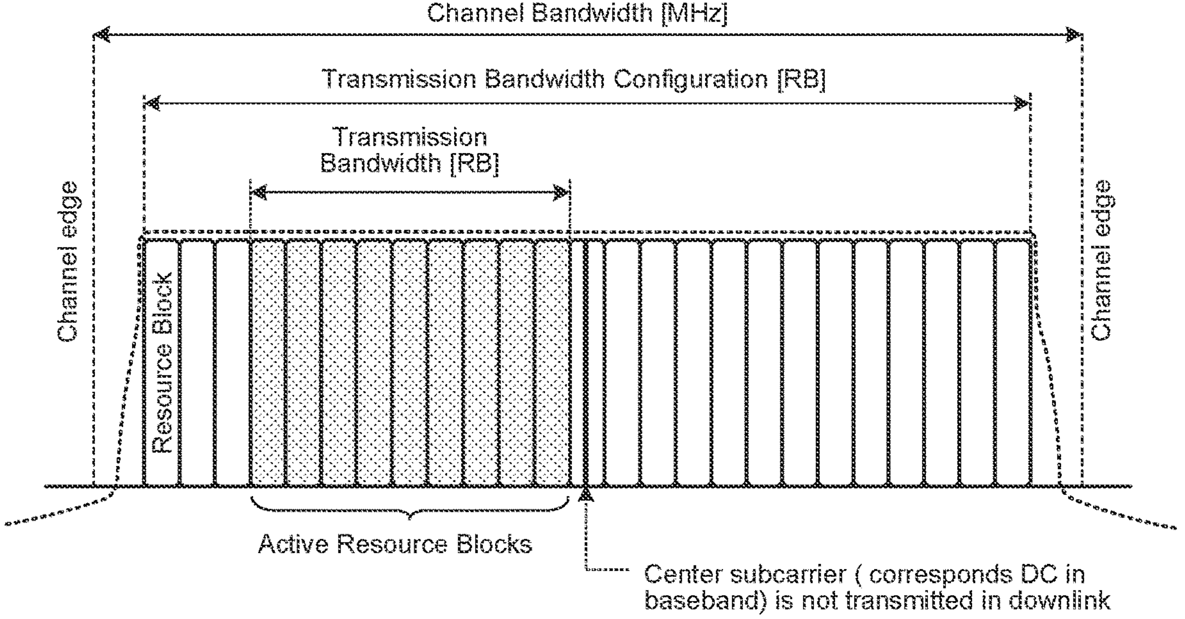
FIG. 20 is a diagram illustrating a specification of a transmission bandwidth in E-UTRA.
FIG. 21 is a diagram illustrating the specification of the transmission bandwidth in E-UTRA.
Figures 22, 23:
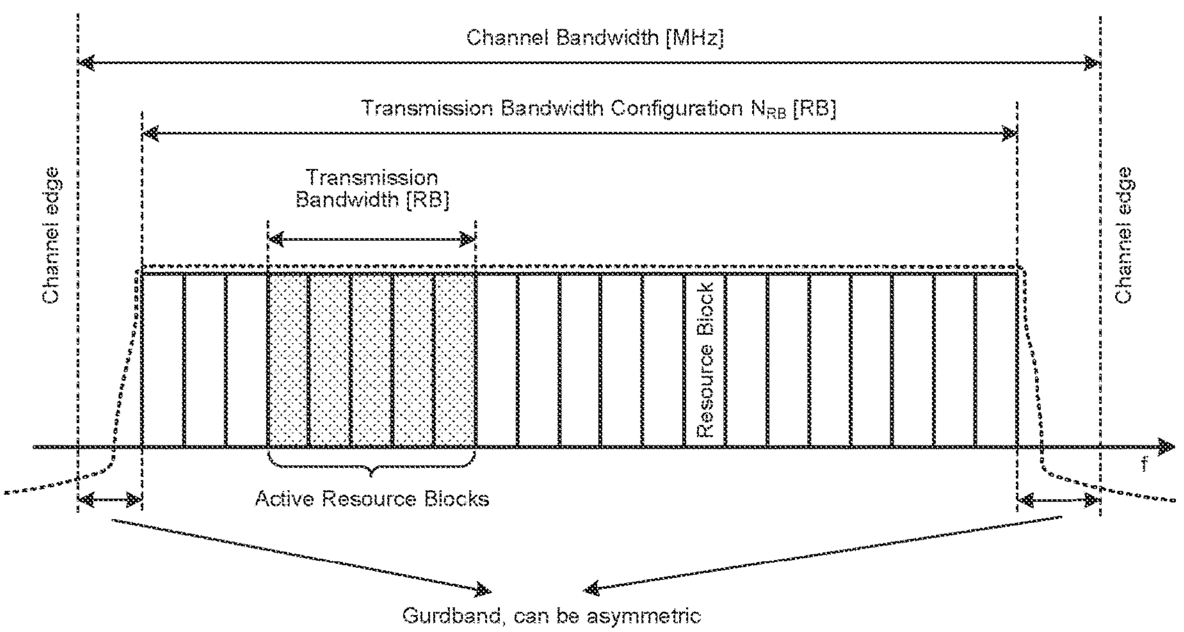
FIG. 22 is a diagram illustrating a specification of a transmission bandwidth in NR.
FIG. 23 is a diagram illustrating the specification of the transmission bandwidth in NR.

The information listed so far may be estimated by the communication control device from other information provided from the communication device without causing the communication device to provide the information to the communication control device. Specifically, for example, the guard band information can be estimated from the radio interface specification information. If the radio interface used by the communication device is E-UTRA or 5G NR, estimation can be performed based on the transmission bandwidth specification described in TS 36.104 or the table described in TS 38.104. FIGS. 20 to 25 are diagrams illustrating transmission bandwidth specifications. Specifically, FIGS. 20 and 21 are diagrams illustrating transmission bandwidth specifications in E-UTRA, and FIGS. 22, 23, 24, and 25 are diagrams illustrating transmission bandwidth specifications in NR.

In other words, the communication device or an intermediate device (for example, a network manager) that acts on behalf of the plurality of communication devices does not necessarily need to provide the information listed so far to the communication control device. Providing information to the communication control device by the communication device or the intermediate device that acts on behalf of the plurality of communication devices is merely one means of information provision. The information listed so far means information that can be necessary for the communication control device to normally complete this procedure, and means for providing the information does not matter.

It is noted that the transmission bandwidth of the present embodiment is not limited to the examples illustrated in FIGS. 20 to 25.

(Supplement of Required Parameter)

In the registration procedure, depending on the embodiment, it is assumed that the device parameter related to not only the base station 40 but also the terminal device 30 is required to be registered in the communication control device 60. In such a case, the term "communication device" in the above description (details of a required parameter) may be replaced with a term "terminal device" or a term equivalent thereto. In addition, a parameter specific to the "terminal device" that is not described above in (details of the required parameter) may also be treated as the required parameter in the registration procedure. For example, a user equipment (UE) category defined in 3GPP can be cited.

(Details of Registration Processing)

Figure 26:
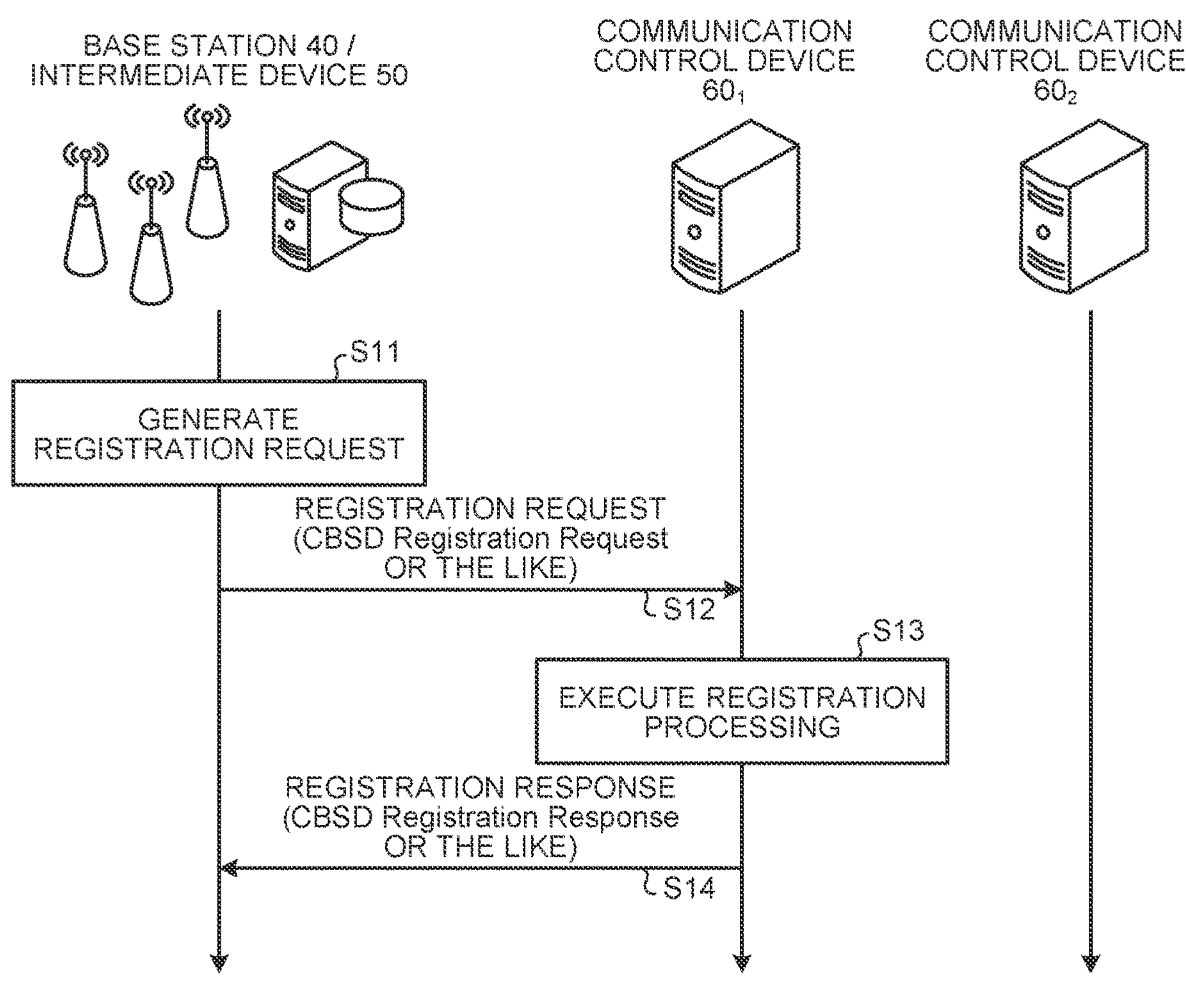
FIG. 26 is a sequence diagram illustrating a registration procedure.

FIG. 26 is a sequence diagram illustrating a registration procedure. One or more communication systems including the base station 40 or the plurality of base stations 40 generate a registration request message using the device parameter (step S11), and notifies the communication control device 60 of the registration request message (step S12). The generation and/or notification of the message may be performed by the intermediate device 50.

Here, in a case where the device parameter includes the installer information, falsification prevention processing or the like may be performed on the registration request by using this information. In addition, a part or all of the information included in the registration request may be subjected to encryption processing. Specifically, for example, processing can be performed in such a manner that a public key specific to the installer is shared in advance between the installer and the communication control device 60, and then the installer encrypts information using the secret key. An example of an encryption target includes security sensitive information such as position information.

Further, as disclosed in Non Patent Literature 2 (WINNF-TS-0016), for example, the installer may directly write the position information into the communication control device 60.

After receiving the registration request, the communication control device 60 performs registration processing of the base station 40 (step S13), and returns a registration response according to a processing result (step S14). If there is no shortage or abnormality of information necessary for registration, the communication control device 60 records the information in the storage unit 42 and notifies normal completion. Otherwise, the communication control device 60 notifies a registration failure. In a case where the registration is normally completed, the communication control device 60 may allocate an ID to each communication device and notify the communication device of the ID information by enclosing the ID information at the time of response. In a case where the registration fails, typically, one or more communication systems including the base station 40 or the plurality of base stations 40, or an operator (for example, a mobile network operator or an individual) and an installer thereof performs correction and the like of the registration request, and tries to perform the registration procedure until the registration is normally completed.

It is noted that the registration procedure may be executed a plurality of times. Specifically, for example, the registration procedure can be re-executed in a case where the position information is changed beyond a predetermined standard due to movement/accuracy improvement or the like. The predetermined standard is typically defined by a legal system. For example, in 47 C.F.R Part 15, a mode II personal/portable white space device is required to access a database again when the position information changes by 100 meters or more.

5-2. Available Spectrum Inquiry Procedure

The available spectrum inquiry procedure is a procedure in which the base station 40 or the intermediate device 50 inquires the communication control device 60 about information on an available spectrum. Typically, the procedure is started when the base station 40 or the intermediate device 50 notifies the communication control device 60 of an inquiry request including information that can identify the base station 40 (or the base station 40 that is subordinate to the intermediate device 50).

As described above, the description of the "base station 40" can be replaced with a word indicating another communication device having a radio communication function. Furthermore, the description of the "intermediate device 50" can also be replaced with a word indicating a communication system that represents (serves as a representative of) another communication device such as a proxy system.

Here, typically, the available spectrum information is information indicating a spectrum at which the base station 40 (or the base station 40 that is subordinate to the intermediate device 50) does not give fatal interference to the primary system and secondary use can be safely performed.

(1) Example 1

The available spectrum information is determined, for example, based on a secondary use prohibited area called an exclusion zone. Specifically, for example, when the base station 40 is installed in the secondary use prohibited area provided for the purpose of protecting the primary system using a frequency channel F1, the frequency channel F1 is not notified as an available channel to the base station 40.

(2) Example 2

The available spectrum information may also be determined, for example, by a degree of allocated interference with respect to the primary system. Specifically, for example, when it is determined that fatal interference is given to the primary system even outside the secondary use prohibited area, the frequency channel may not be notified as an available channel. An area in which such determination may be necessary is also referred to as a neighborhood area. An example of a specific calculation method related to determination in the neighborhood area is described in "details of available spectrum evaluation processing" to be described later.

(3) Example 3

In addition, there may be a frequency channel on which the available spectrum information is not notified as available under conditions other than the primary system protection requirements described in examples 1 and 2. Specifically, for example, in order to avoid interference that may occur between the base stations 40 in advance, a frequency channel being used by another base station 40 existing in the vicinity of the base station 40 (or the base station 40 subordinate to the intermediate device 50) may not be notified as an available channel. In this manner, the available spectrum information set in consideration of interference with another communication device may be set as, for example, "recommended use spectrum information" and provided together with the available spectrum information. That is, the "recommended use spectrum information" is desirably a subset of the available spectrum information.

It is noted that the communication control device 60 may transmit, as recommended spectrum information, information on a spectrum at which interference does not occur between the base stations 40, separately from the available spectrum described in examples 1 and 2. Here, the available spectrum information referred to in examples 1 and 2 may be, for example, information of an available channel described in Non Patent Literature 9 (WINNF-TR-2004). In addition, recommended spectrum information may be information of a recommended channel described in Non Patent Literature 9 (WINNF-TR-2004). It is noted that the recommended spectrum information can be regarded as a type of available spectrum.

(4) Example 4

Even in a case corresponding to the situation described in examples 2 and 3, it is possible to notify the same frequency as that of the primary system or the neighboring base station 40 as the available channel. In such a case, typically, maximum allowable transmission power information is included in the available spectrum information. The maximum allowable transmission power is typically expressed by equivalent isotropic radiated power (EIRP). The present invention is not necessarily limited thereto, and may be provided by, for example, a combination of conducted power and an antenna gain. Furthermore, the antenna gain may be set to an allowable peak gain for each spatial direction.

(Details of Required Parameter)

As the information that can identify the base station 40, for example, information specific to the communication device registered at the time of the registration procedure, the ID information described above in (details of the registration processing), and the like can be assumed.

Further, the inquiry request may also include inquiry requirement information. The inquiry requirement information may include, for example, information indicating a frequency band, the availability of which is desired to be known. Additionally, for example, transmission power information may be included. The base station 40 or the intermediate device 50 may include the transmission power information, for example, when it is desired to know only frequency information in which the desired transmission power can be used. The inquiry requirement information does not necessarily need to be included.

The inquiry request may also include a measurement report. The measurement report includes a result of measurement performed by the base station 40 and/or the terminal device 30. For example, not only raw data but also processed information may be included. For example, standardized metrics represented by reference signal received power (RSRP), reference signal strength indicator (RSSI), and reference signal received quality (RSRQ) may be used.

(Details of Available Spectrum Evaluation Processing)

Figure 27:
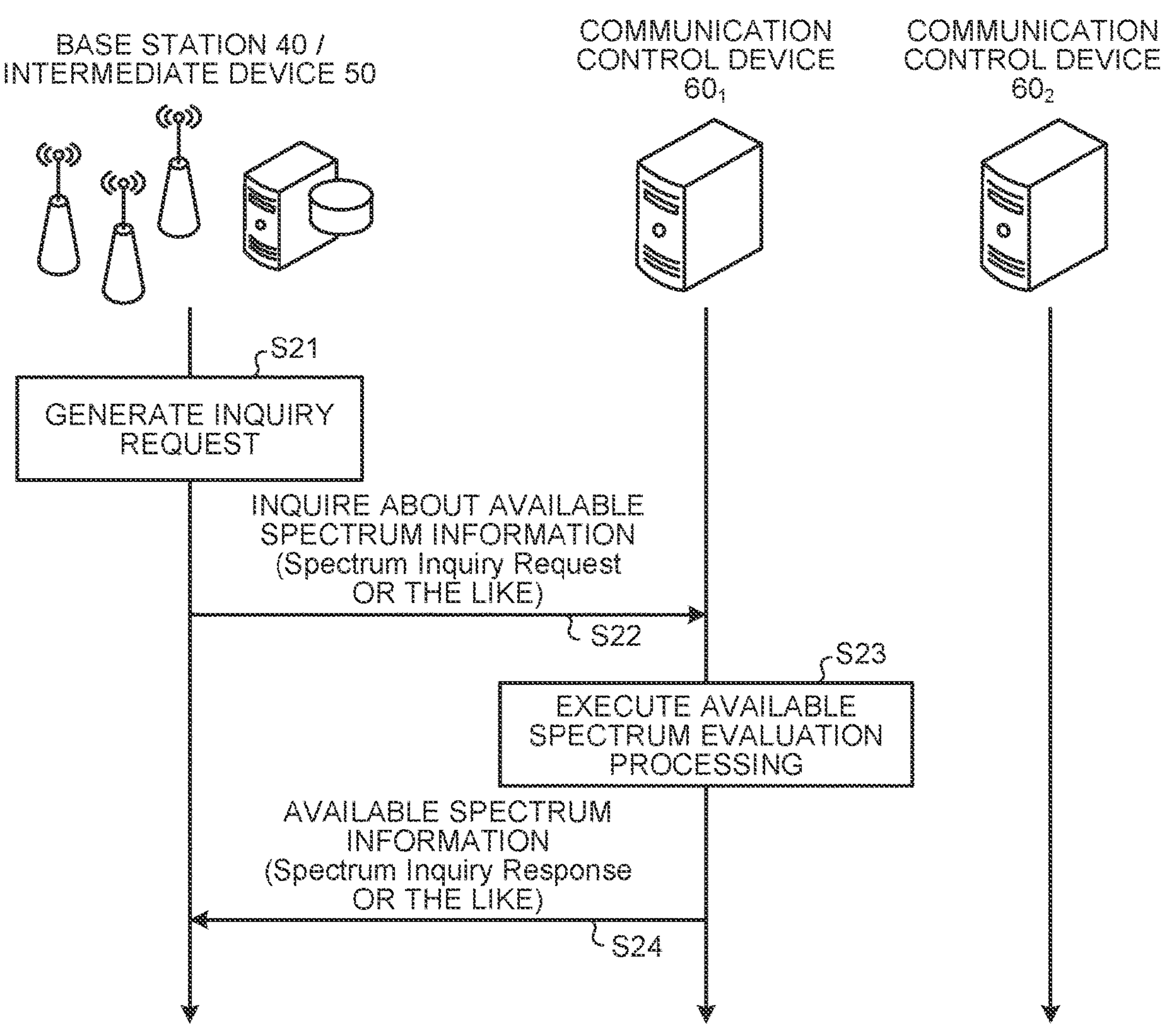
FIG. 27 is a sequence diagram illustrating an available spectrum inquiry procedure.

FIG. 27 is a sequence diagram illustrating the available spectrum inquiry procedure. The base station 40 or the intermediate device 50 generates an inquiry request including information that can identify the base station 40 (or the base station 40 that is subordinate to the intermediate device 50) (step S21), and notifies the communication control device 60 of the inquiry request (step S22).

After receiving the inquiry request, the communication control device 60 evaluates an available spectrum based on the inquiry requirement information (step S23). For example, as described in the examples 1 to 3, it is possible to evaluate the available spectrum in consideration of the existence of the primary system, the secondary use prohibited area thereof, and the base station 40 in the vicinity thereof.

As described in the example 4 above, the communication control device 60 may derive the maximum allowable transmission power information. Typically, calculation is performed by using allowable interference power information in the primary system or a protection zone thereof, calculation reference point information of an interference power level experienced by the primary system, registration information of the base station 40, and a propagation loss estimation model. Specifically, as an example, calculation is performed by the following mathematical formula (2).

$$P_{MaxTx(dBm)} = I_{Th(dBm)} + PL(d)_{(dB)} \tag{2}$$

Here, $P_{MaxTx(dBm)}$ is maximum allowable transmission power, $I_{Th(dBm)}$ is allowable interference power, d is a distance between the reference point and the base station 40, and $PL(d)_{(dB)}$ is a propagation loss at the distance d. Although an antenna gain in a transceiver is not explicitly indicated in the mathematical formula, the antenna gain may be included according to a method of expressing the maximum allowable transmission power (EIRP, conducted power or the like) or a reference point of the reception power (an antenna input point, an antenna output point, or the like). Further, a safety margin or the like for compensating for variations due to fading may be included. In addition, a feeder loss and the like may be considered as necessary.

In addition, the above mathematical formula is described based on the assumption that the single base station 40 is an interference source. For example, in a case where it is necessary to consider aggregated interference from a plurality of base stations 40 at the same time, a correction value may be added. Specifically, for example, the correction value can be determined based on three (fixed/predetermined, flexible, flexible minimized) types of interference margin methods disclosed in Non Patent Literature 3 (ECC report 186).

It is noted that, although the above mathematical formula is expressed using logarithms, it is a matter of course that the mathematical formula may be converted into antilogarithms and used at the time of implementation. In addition, all parameters in logarithmic notation described in the present embodiment may be appropriately converted into antilogarithmic numbers and used.

(1) Method 1

Furthermore, as described in the section "details of required parameter", in a case where the transmission power information is included in the inquiry requirement information, the available spectrum can be evaluated by a method different from the above-described method. Specifically, for example, in a case where it is assumed that desired transmission power indicated by transmission power information is used, when an estimated allocated interference amount is less than allowable interference power in the primary system or a protection zone thereof, it is determined that the frequency channel is available, and the base station 40 (or the intermediate device 50) is notified of the frequency channel.

(2) Method 2

Although the example in which the band use condition is calculated based on the other system related information has been described, the present disclosure is not limited to such an example. For example, similarly to an area of a radio environment map (REM), when an area/space in which the base station 40 can use a shared band is determined in advance, available spectrum information may be derived based on only the position-related information and the height-related information. Furthermore, for example, in a case where a lookup table for associating the position and the height with the available spectrum information is prepared, the available spectrum information may be derived based on the position-related information and the height-related information.

The evaluation of the available spectrum does not necessarily need to be performed after the inquiry request is received. For example, after the normal completion of the above-described registration procedure, the communication control device 60 may independently perform the evaluation processing without the inquiry request. In such a case, the communication control device 60 may generate the REM or the lookup table exemplified in the method 2 or an information table similar thereto.

In any method, the radio wave use priority such as PAL or GAA may also be evaluated. For example, in a case where the registered device parameter or the inquiry requirement includes information on the radio wave use priority, it may be determined whether the spectrum use is available based on the priority, and then the notification may be performed. Furthermore, for example, as disclosed in Non Patent Literature 2 (WINNF-TS-0016), in a case where information (in Non Patent Literature 2 (WINNF-TS-0016), referred to as a cluster list) on the base station 40 that performs high priority use (for example, PAL) from a user is registered in the communication control device 60 in advance, evaluation may be performed based on the information.

After the evaluation of the available spectrum is completed, the communication control device 60 notifies the base station 40 (or the intermediate device 50) of an evaluation result (step S24). The base station 40 may select a desired communication parameter by using the evaluation result received from the communication control device 60.

5-3. Spectrum Grant Procedure

The spectrum grant procedure is a procedure for the base station 40 to receive secondary use permission of a spectrum from the communication control device 60. Typically, after the registration procedure is normally completed, one or more communication systems including the base station 40 or the plurality of base stations 40 start the procedure by notifying the communication control device 60 of a spectrum grant request including information that can identify the base station 40. This notification may be performed by the intermediate device 50. It is noted that "after normal completion of the registration procedure" also means that the available spectrum inquiry procedure does not necessarily need to be performed.

As described above, the description of the "base station 40" can be replaced with a word indicating another communication device having a radio communication function. Furthermore, the description of the "intermediate device 50" can also be replaced with a word indicating a communication system that represents (serves as a representative of) another communication device such as a proxy system.

In the present invention, it is assumed that at least the following two types of spectrum grant request methods can be used.

Designation Method

Flexible Method

The designation method is a request method in which the base station 40 designates at least a frequency band channel desired to be used and maximum transmission power as desired communication parameters and requests the communication control device 60 to permit an operation based on the desired communication parameters. The parameters are not necessarily limited to these parameters, and parameters specific to the radio interface technology (such as a modulation method and a duplex mode) may be designated. In addition, information indicating the radio wave use priority such as PAL and GAA may be included.

The flexible method is a request method in which the base station 40 designates only a requirement regarding a communication parameter and requests the communication control device 60 to designate a communication parameter that can be permitted to be secondarily used while satisfying the requirement. The requirement regarding the communication parameter may include a bandwidth or desired maximum transmission power or desired minimum transmission power. The parameters are not necessarily limited to these parameters, and parameters specific to the radio interface technology (such as a modulation method and a duplex mode) may be designated. Specifically, for example, one or more TDD frame configurations may be selected in advance and notified.

In any one of the methods, the measurement report may be included. The measurement report includes a result of measurement performed by the base station 40 and/or the terminal device 30. For example, not only raw data but also processed information may be included. For example, standardized metrics represented by reference signal received power (RSRP), reference signal strength indicator (RSSI), and reference signal received quality (RSRQ) may be used.

It is noted that method information used by the base station 40 may be registered in the communication control device 60 at the time of the registration procedure described in <5-1>.

(Details of Spectrum Grant Processing)

Figure 28:
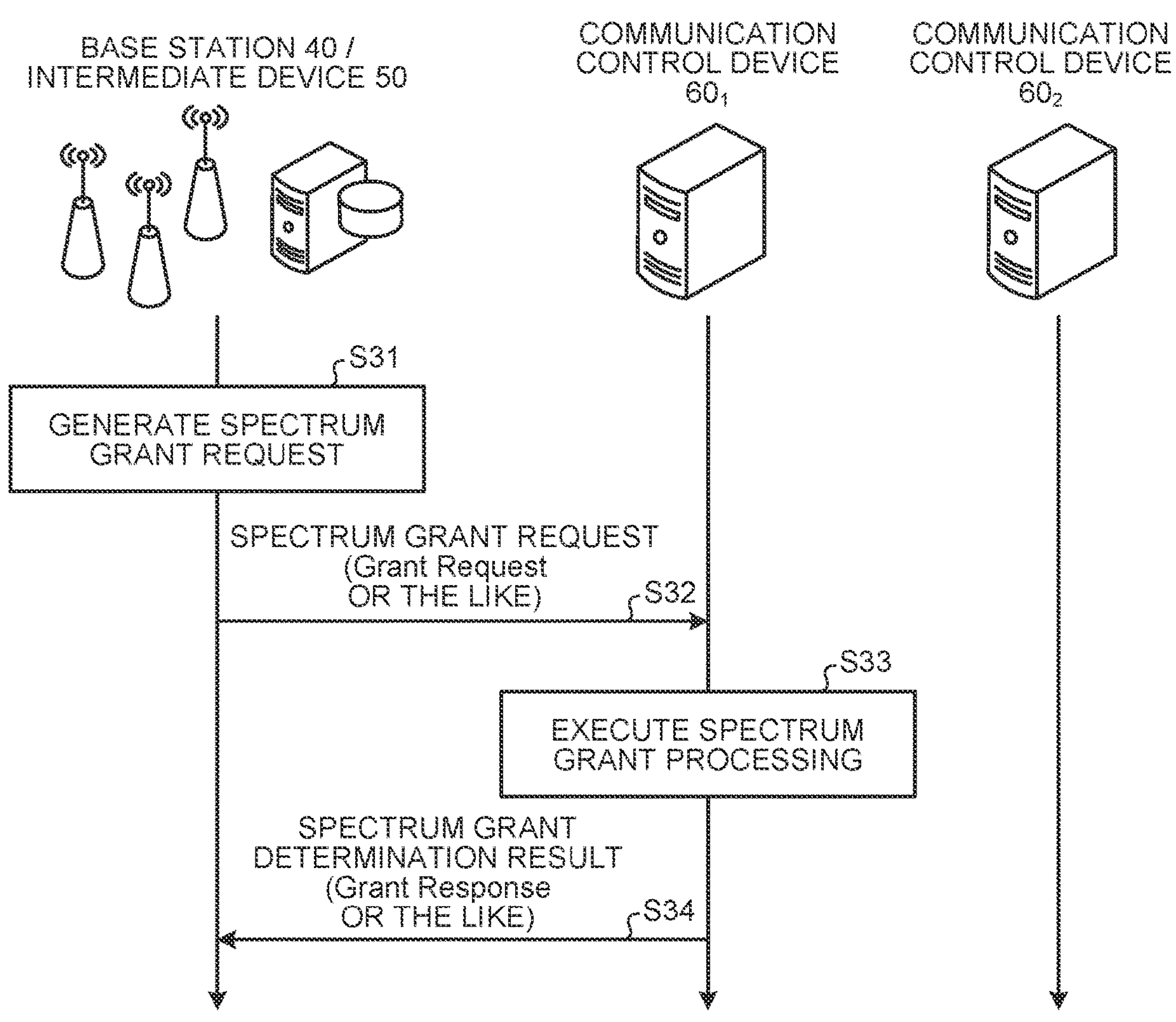
FIG. 28 is a sequence diagram illustrating a spectrum grant procedure.

FIG. 28 is a sequence diagram illustrating the spectrum grant procedure. One or more communication systems including the base station 40 or the plurality of base stations 40 generate a spectrum grant request including information that can identify the base station 40 (step S31), and notify the communication control device 60 of the spectrum grant request (step S32). The generation and/or notification of the request may be performed by the intermediate device 50.

After acquiring the spectrum grant request, the communication control device 60 performs the spectrum grant processing based on a spectrum grant request method (step S33). For example, the communication control device 60 can perform the spectrum grant processing in consideration of the existence of the primary system, the secondary use prohibited area thereof, and the base station 40 in the vicinity thereof by using the method described in <5-2. Available spectrum inquiry procedure>.

In a case where the flexible method is used, the communication control device 60 may derive the maximum allowable transmission power information using the method described in "details of available spectrum evaluation processing" of <5-2. Available spectrum inquiry procedure>. Typically, the communication control device 60 calculates the maximum allowable transmission power by using the allowable interference power information in the primary system or the protection zone thereof, the calculation reference point information of the interference power level experienced by the primary system, the registration information of the base station 40, and the propagation loss estimation model. For example, the communication control device 60 calculates the maximum allowable transmission power by the following mathematical formula (3).

$$P_{MaxTx\,(dBm)} = I_{Th(dBm)} + PL\,(d)_{(dB)} \tag{3}$$

Here, $P_{MaxTx(dBm)}$ is maximum allowable transmission power, $I_{Th(dBm)}$ is allowable interference power, d is a distance between the reference point and the base station 40, and $PL(d)_{(dB)}$ is a propagation loss at the distance d. Although an antenna gain in a transceiver is not explicitly indicated in the mathematical formula, the expression may be modified and used according to a method of expressing the maximum allowable transmission power (EIRP, conducted power or the like) or a reference point of the reception power (an antenna input point, an antenna output point, or the like). Further, a safety margin or the like for compensating for variations due to fading may be included. In addition, a feeder loss and the like may be considered as necessary.

In addition, the above mathematical formula is described based on the assumption that the single base station 40 is an interference source. For example, in a case where it is necessary to consider aggregated interference from a plurality of base stations 40 at the same time, a correction value may be added. Specifically, for example, the correction value can be determined based on three types of methods (fixed/predetermined, flexible, flexible minimized) disclosed in Non Patent Literature 3 (ECC report 186).

Various models may be used as the propagation loss estimation model. When a model is designated for each application, it is desirable to use the designated model. For example, in Non Patent Literature 6 (WINNF-TS-0112), a propagation loss model such as extended hata (eHATA) or an irregular terrain model (ITM) is adopted for each application. Certainly, during implementation of the present invention, the propagation loss model does not need to be limited thereto.

The propagation loss estimation model requires information on a radio wave propagation path depending on the model. This information may include, for example, information indicating inside and outside of line of sight (LOS/NLOS), terrain information (undulation, sea level, and the like), environmental information (urban, suburban, rural, open sky, and the like), and the like. In using the propagation loss estimation model, these pieces of information may be estimated from the registration information of the communication device or the information of the primary system. Alternatively, if there is a pre-designated parameter, it is desirable to use the pre-designated parameter therefor.

In a predetermined application, when a model is not designated, the model may be selectively used as necessary. As a specific example, for example, it is possible to selectively use a model in which a loss is calculated to be small like a free space loss model at the time of estimating interference power to the other base station 40, and a model in which a loss is calculated to be large at the time of estimating coverage of the base station 40.

In addition, in a case where the designation method is used, as an example, the spectrum grant processing can be performed by evaluating an interference risk. Specifically, for example, in a case where it is assumed that desired transmission power indicated by transmission power information is used, when an estimated allocated interference amount is less than allowable interference power in the primary system or a protection zone thereof, it is determined that the use of the frequency channel can be permitted, and the base station 40 (or the intermediate device 50) is notified of the frequency channel.

In any method, the radio wave use priority such as PAL or GAA may also be evaluated. For example, in a case where the registered device parameter or the inquiry requirement includes information on the radio wave use priority, it may be determined whether the spectrum use is available based on the priority, and then the notification may be performed. Furthermore, for example, as disclosed in Non Patent Literature 2 (WINNF-TS-0016), in a case where information (in Non Patent Literature 2 (WINNF-TS-0016), referred to as a cluster list) on the base station 40 that performs high priority use (for example, PAL) from a user is registered in the communication control device 60 in advance, evaluation may be performed based on the information.

The spectrum grant processing is not necessarily performed when the request is received. For example, after the normal completion of the above-described registration procedure, the communication control device 60 may independently perform the processing without the spectrum grant request. Furthermore, for example, spectrum grant determination processing may be performed at regular intervals. In such a case, an information table similar to the REM and the lookup table exemplified in the method 2 of <5-2. Available spectrum inquiry procedure> may be generated. That is, the communication control device 60 can quickly return a response after receiving the spectrum grant request.

After completion of the spectrum grant processing, the communication control device 60 notifies the base station 40 of a determination result (step S34).

5-4. Spectrum Use Notification/Heartbeat

The spectrum use notification is a procedure in which the base station 40 or the intermediate device 50 notifies the communication control device 60 of the spectrum use based on the communication parameter allowed to be used in the spectrum grant procedure. This notification is also called heartbeat. Typically, the procedure is started when the base station 40 or the intermediate device 50 notifies the communication control device 60 of a notification message including information that can identify the base station 40.

As described above, the description of the "base station 40" can be replaced with a word indicating another communication device having a radio communication function. Furthermore, the description of the "intermediate device 50" can also be replaced with a word indicating a communication system that represents (serves as a representative of) another communication device such as a proxy system.

This procedure is desirably performed periodically until the use of the frequency is rejected from the communication control device 60. When this procedure is normally completed, the base station 40 may start or continue the radio wave transmission. For example, if the state of the grant is granted, the state of the grant transitions to authorized due to the success of this procedure. In addition, if the state of the grant is authorized, the state of the grant transitions to granted or idle due to the failure of this procedure.

Here, the grant is authorization for radio wave transmission given by the communication control device 60 (for example, the SAS) to the base station 40 (for example, the CBSD). The grant is described, for example, in Non Patent Literature 2 (WINNF-TS-0016). In Non Patent Literature 2 (WINNF-TS-0016), a signaling protocol between a database (SAS) and a base station (the CBSD) for the spectrum sharing of 3550 to 3700 MHz in the United States is standardized. In this standard, the authorization of radio wave transmission that the SAS gives to the CBSD is referred to as "grant". The operation parameter allowed by the grant is defined by two parameters: maximum allowable equivalent isotropic radiated power (EIRP) and a frequency channel. That is, in order to perform radio wave transmission using a plurality of frequency channels, the CBSD needs to acquire a plurality of grants from the SAS.

Figure 29:
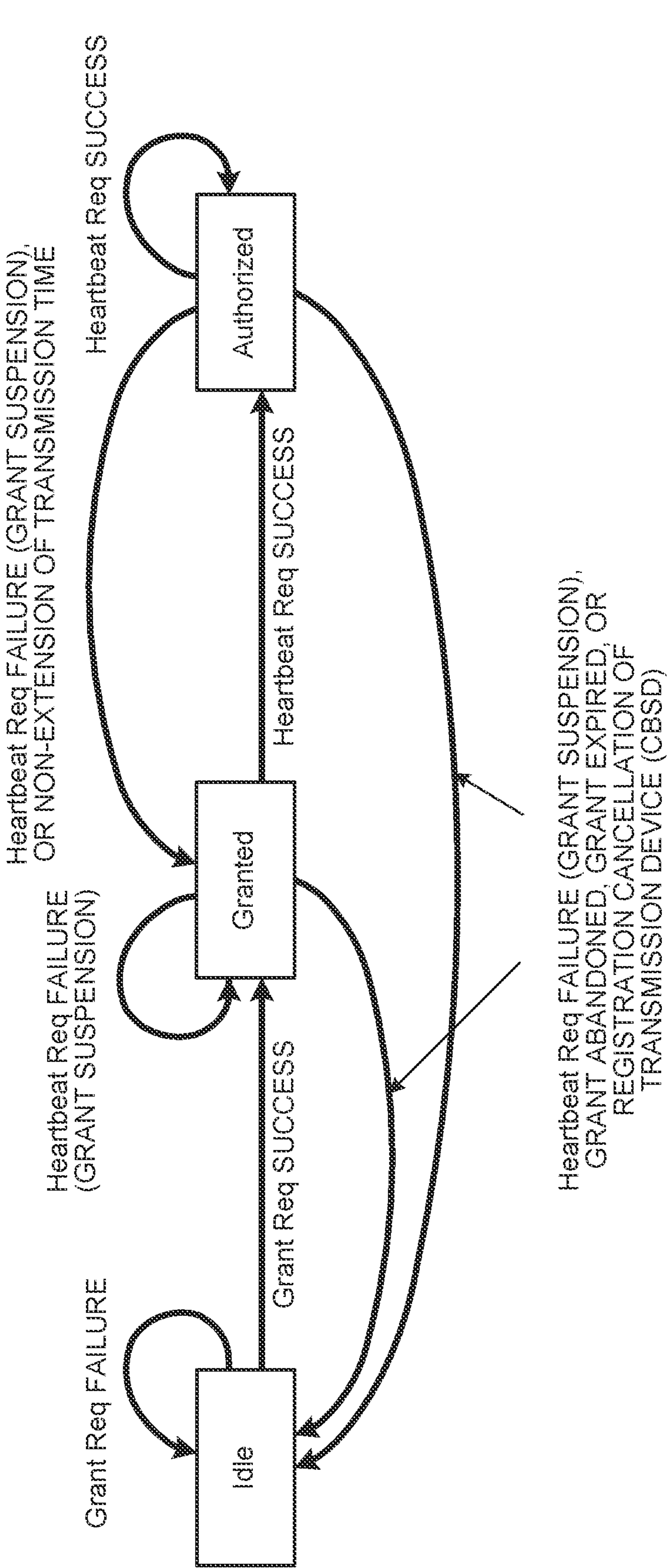
FIG. 29 is a state transition diagram illustrating a permission state of radio wave transmission.

In the grant, a state indicating a permission state of radio wave transmission is defined. An example of the state indicating the permission state of the radio wave transmission includes a granted state and an authorized state. FIG. 29 is a state transition diagram illustrating the permission state of the radio wave transmission. In FIG. 29, the granted state indicates a state in which the grant is held but radio wave transmission is prohibited, and the authorized state indicates a state in which radio wave transmission is permitted based on an operation parameter value defined in the grant. These two states transition according to a result of a heartbeat procedure defined in the same standard.

In the following description, the spectrum use notification may be referred to as a heartbeat request or simply referred to as a heartbeat. In addition, a transmission interval of the heartbeat request may be referred to as a heartbeat interval. It is noted that the description of the heartbeat request or the heartbeat appearing in the following description can be appropriately replaced with another description indicating "a request for starting or continuing radio wave transmission". Similarly, the heartbeat interval can be replaced with another description (for example, a transmission interval) indicating a transmission interval of the spectrum use notification.

Figure 30:
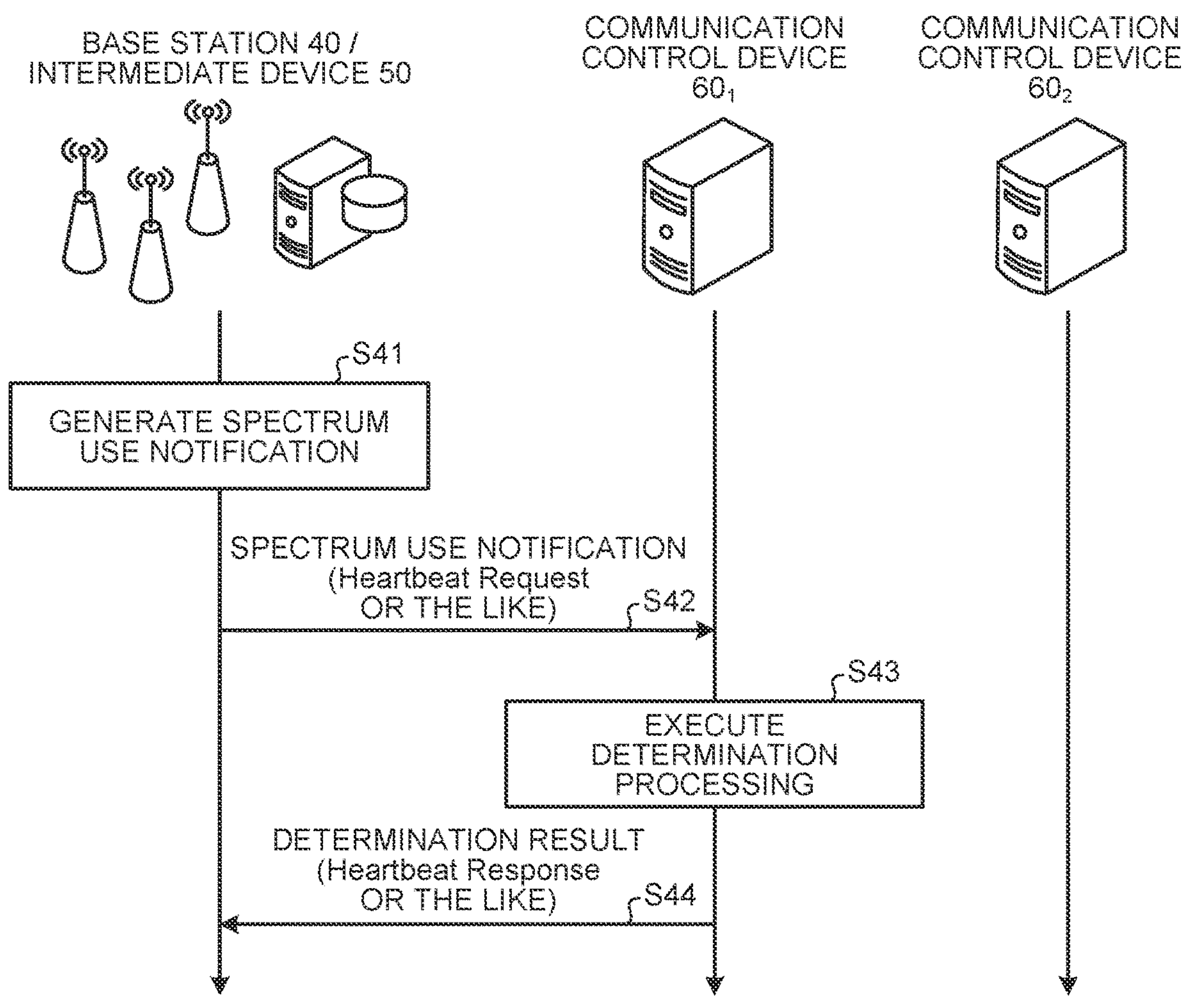
FIG. 30 is a sequence diagram illustrating a spectrum use notification procedure.

FIG. 30 is a sequence diagram illustrating a spectrum use notification procedure. One or more communication systems including the base station 40 or the plurality of base stations 40 generate a notification message including information that can identify the base station 40 (step S41), and notifies the communication control device 60 of the notification message (step S42). The generation and/or notification of the message may be performed by the intermediate device 50.

After receiving the spectrum use notification, the communication control device 60 may determine whether the start/continuation of the radio wave transmission is allowed (step S43). An example of a determination method includes confirmation of frequency use information of the primary system. Specifically, the start/continuation permission or rejection of the radio wave transmission can be determined based on a change in use frequency of the primary system, a change in frequency use status of the primary system in which radio wave use is not steady (for example, a ship-based radar), or the like.

When determination processing is completed, the communication control device 60 notifies the base station 40 (or the intermediate device 50) of a determination result (step S44).

In this procedure, a reconfiguration command of a communication parameter may be performed from the communication control device 60 to the base station 40 (or the intermediate device 50). Typically, the reconfiguration command may be performed in response to the spectrum use notification. For example, recommended communication parameter information may be provided. It is desirable that the base station 40 (or the intermediate device 50) provided with the recommended communication parameter information performs the spectrum grant procedure described in <5-4> again using the recommended communication parameter information.

5-5. Supplement of Various Procedures

Here, the various procedures do not necessarily need to be individually implemented as described below. For example, the two different procedures may be implemented by substituting a third procedure having the roles of two different procedures. Specifically, for example, the registration request and the available spectrum inquiry request may be integrally notified. Furthermore, for example, the spectrum grant procedure and the spectrum use notification may be integrally performed. Of course, the number of combinations is not limited to these combinations, and may be three or more. Further, the above procedure may be separately performed.

In addition, in a case where the present embodiment is applied for the purpose of spectrum sharing with an existing system, it is desirable that an appropriate procedure or an equivalent procedure is selected and used based on the radio law related to the frequency band in the country or region in which the technology of the present embodiment is implemented. For example, in a case where registration of the communication device is required for the use of a specific frequency band in a specific country or region, it is desirable to perform a registration procedure.

In addition, an expression of "acquiring information" or an expression equivalent thereto in the present embodiment does not necessarily mean that the information is acquired according to the procedure described above. For example, although it is described that the position information of the base station 40 is used in the available spectrum evaluation processing, it means that it is not always necessary to use the information acquired in the registration procedure, and in a case where the position information is included in the available spectrum inquiry procedure request, the position information may be used. In other words, it means that the described parameter may be included in other procedures within the scope described in the present embodiment and within the scope of technical feasibility.

Furthermore, information that can be included in the response from the communication control device 60 to the base station 40 (or the intermediate device 50) described in the above procedure may be notified by using push notification. As a specific example, the push notification may be performed to notify available spectrum information, recommended communication parameter information, radio wave transmission continuation rejection notification, and the like.

5-6. Various Procedures for Terminal Device

The description has been made assuming mainly the communication device (Type A). However, in the embodiments, a scenario is assumed in which not only the communication device (Type A) but also the terminal device 30 and the communication device (Type B) including the terminal device 30 are under the management of the communication control device 60, that is, the communication parameter is determined by the communication control device 60. Even in such a case, basically, each procedure described in <5-1> to <5-4> can be used. However, unlike the communication device (Type A), the terminal device 30 and the communication device (Type B) need to use the frequency managed by the communication control device 60 for the backhaul link, and cannot transmit a radio wave without permission. Therefore, it is desirable to start backhaul communication for the purpose of accessing the communication control device 60 only after a radio wave or an authorization signal transmitted by a serving communication device or a master communication device is detected.

On the other hand, under the management of the communication control device 60, it is desirable that the terminal device 30 and the communication device (Type B) also have allowable communication parameters set for the purpose of primary system protection. However, the communication control device 60 cannot know the position information and the like of these devices in advance. These devices are also likely to have mobility. That is, the position information is dynamically updated. Depending on the legal system, when the position information changes by a certain amount or more, re-registration to the communication control device 60 may be required in some cases.

In consideration of such various use forms of terminals and communication devices, in an operation form of the TVWS (refer to Non Patent Literature 4 (WSDB contract)) defined by the office of communication (Ofcom), the following two types of communication parameters are defined.

Generic Operational Parameters

Specific Operational Parameters

The generic operational parameters are communication parameters defined as "operational parameters in which any slave WSD located within a coverage area of a predetermined master WSD (corresponding to the base station 40) can also be used" in Non Patent Literature 4 (WSDB contract). One of the features is that calculation is performed by the WSDB without using the position information of the slave WSD.

The generic operational parameters may be provided by unicast/broadcast from the communication device (for example, the base station 40) that is already permitted to transmit a radio wave from the communication control device 60. For example, a broadcast signal represented by a contact verification signal (CVS) defined in FCC rule part 15 subpart H may be used. Alternatively, the generic operational parameters may be provided by a broadcast signal specific to a radio interface. As a result, the terminal or the communication device (Type B) can handle it as a communication parameter used for radio wave transmission for the purpose of accessing the communication control device 60.

The specific operational parameters are communication parameters defined as "parameters usable by a specific slave white space device (WSD)" in Non Patent Literature 4 (WSDB contract). In other words, the specific operational parameters are communication parameters calculated using the device parameter of the slave WSD corresponding to the terminal. As a feature, the specific operational parameters are calculated by a white space database (WSDB) using the position information of the slave WSD.

5-7. Procedure Occurring Between Communication Control Devices (Information Exchange)

Figure 31:
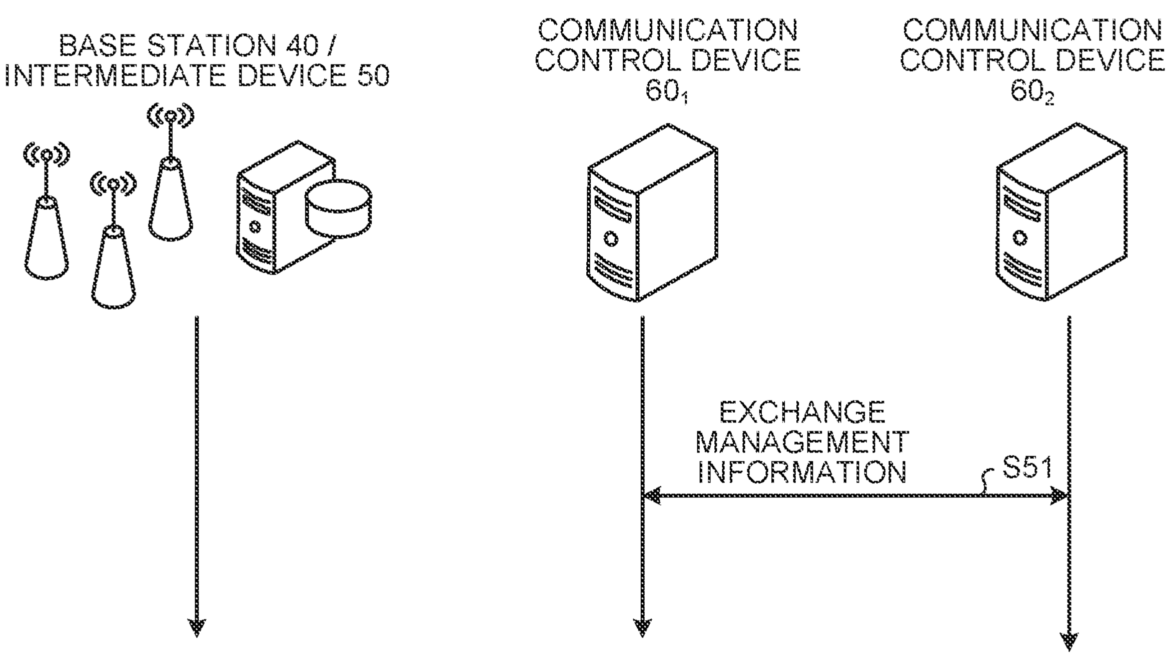
FIG. 31 is a sequence diagram illustrating a management information exchange procedure.

The communication control device 60 can exchange management information with another communication control device 60. FIG. 31 is a sequence diagram illustrating a management information exchange procedure. In the example of FIG. 31, a communication control device $60_1$ and a communication control device $60_2$ exchange information. Of course, the communication control device that exchanges information is not limited to two of the communication control device $60_1$ and the communication control device $60_2$.

In the management information exchange procedure, at least the following information is desirably exchanged.

Information related to communication device

Area information

Protection target system information

The information related to the communication device includes at least registration information and communication parameter information of the communication device (for example, the base station 40) operating under permission of the communication control device 60. Registration information of the communication device that does not have a permitted communication parameter may be included.

Communication device registration information is typically a device parameter of the base station 40 registered in the communication control device 60 in the registration procedure. Not all the registered information is necessarily exchanged. For example, information that may correspond to personal information does not need to be exchanged. Furthermore, when the communication device registration information is exchanged, encrypted and ambiguous information may be exchanged. For example, information converted into a binary value or information signed using an electronic signature mechanism may be exchanged.

Typically, communication device communication parameter information is information on a communication parameter currently used by the base station 40. At least information indicating the use frequency and the transmission power is desirably included. Other communication parameters may be included.

The area information is typically information indicating a predetermined geographical zone. The area information may include zone information of various attributes in various manners.

For example, protection zone information of the base station 40 serving as a high priority secondary system such as PAL protection area (PPA) disclosed in Non Patent Literature 5 (WINNF-TS-0096) may be included. The area information in this case can be expressed by, for example, a set of three or more geolocation coordinates. Furthermore, for example, in a case where a plurality of communication control devices 60 can refer to a common external database, the area information can be expressed by an ID indicating the information.

Furthermore, for example, information indicating the coverage of the base station 40 may be included. The area information in this case can also be expressed by, for example, a set of three or more geolocation coordinates. Furthermore, for example, assuming a circle with the geographical position of the base station 40 as the origin, the area information can also be expressed by information indicating the radius size. Furthermore, for example, in a case where a plurality of communication control devices 60 can refer to a common external database that records the area information, the area information can be expressed by an ID indicating the information.

Furthermore, as another aspect, information on an area section determined in advance by an administration or the like can be included. Specifically, for example, it is possible to indicate a certain zone by indicating an address. Furthermore, for example, a license area or the like can be similarly expressed.

Furthermore, as still another aspect, the area information does not necessarily express a planar area, and may express a three-dimensional space. For example, the area information may be expressed using a spatial coordinate system. In addition, for example, the area information may use information indicating a predetermined closed space such as a floor number, a floor, or a room number of a building.

The protection target system information is, for example, information of a radio system treated as an incumbent. An example of a situation in which the protection target system information needs to be exchanged includes cross-border coordination. It is sufficiently conceivable that there are different incumbents in the same band between adjacent countries and regions. In addition, it is not always possible to acquire incumbent information of an adjacent country or region even if the incumbent operates the same radio system. In such a case, the protection target system information can be exchanged between communication control devices belonging to different countries and regions as necessary.

As another aspect, the protection target system information may include information on a secondary licensee and a radio system operated under the secondary license. The secondary licensee is specifically a lessee of the license, and for example, it is assumed that the secondary licensee borrows the PAL from an owner and operates the radio system owned by the secondary licensee. In a case where the communication control device independently performs rental management, the communication control device can exchange information on the secondary licensee and the radio system operated under the secondary license with another communication control device 60 for the purpose of protection.

These pieces of information can be exchanged between the communication control devices 60 regardless of a decision-making topology applied to the communication control device 60.

Further, these pieces of information may be exchanged in various methods. Examples thereof will be described below.

ID designation method

Period designation method

Zone designation method

Dump method

The ID designation method is a method of acquiring information corresponding to an ID by using the ID given in advance to specify information managed by the communication control device 60. For example, it is assumed that the communication control device $60_1$ manages the base station 40 with ID: AAA. At this time, the communication control device $60_2$ designates the ID: AAA and makes an information acquisition request to the communication control device $60_1$. After receiving the request, the communication control device $60_1$ searches for information on the ID: AAA, and notifies registration information and communication parameter information of the corresponding base station 40 by a response.

In the period designation method, a specific period is designated, and information satisfying a predetermined condition can be exchanged during the period.

An example of the predetermined condition includes the presence or absence of information update. For example, in a case where acquisition of communication device information in a specific period is designated by a request, registration information of the base station 40 newly registered in the period or registration information of the base station 40 whose communication parameter has been changed and information of the communication parameter may be notified by a response.

An example of the predetermined condition includes whether the communication control device 60 performs recording. For example, in a case where acquisition of the communication device information in a specific period is designated by a request, the registration information of the base station 40 and the information of the communication parameter recorded by the communication control device 60 in the specific period can be notified by a response. Furthermore, the latest information in the period can be notified. Alternatively, the update history may be notified for each piece of information.

In the zone designation method, a specific zone is designated, and information belonging to the zone is exchanged. For example, in a case where acquisition of communication device information in a specific zone is designated by a request, registration information of the base station 40 installed in the zone and information of a communication parameter may be notified by a response.

The dump method is a method of providing all information recorded by the communication control device 60. At least information and area information regarding the base station 40 are desirably provided by the dump method.

The above description of the information exchange between the communication control devices 60 is based on a pull method. That is, information corresponding to a parameter designated in a request is responded, and as an example, the pull method can be implemented by an HTTP GET method. However, the present invention is not limited to the pull method, and information may be actively provided to another communication control device 60 by a push method. As an example, the push method may be implemented by an HTTP POST method.

(Command/Request Procedure)

The communication control device 60 may execute a command and/or a request with each other. Specifically, as an example, reconfiguration of communication parameters of the base station 40 is exemplified. For example, when it is determined that a base station $\mathbf{40}_1$ managed by a communication control device $\mathbf{60}_1$ receives a large amount of interference from a base station $\mathbf{40}_4$ managed by a communication control device $\mathbf{60}_2$, the communication control device $\mathbf{60}_1$ may request the communication control device $\mathbf{60}_2$ to change the communication parameter of the base station $\mathbf{40}_4$.

Another example is reconfiguration of area information. For example, in a case where incompletion is found in calculation of coverage information and protection zone information regarding the base station $\mathbf{40}_4$ managed by the communication control device $\mathbf{60}_2$, the communication control device $\mathbf{60}_1$ may request the communication control device $\mathbf{60}_2$ to reconfigure the area information. In addition thereto, an area information reconfiguration request may be made for various reasons.

5-8. Information Transmission Means

Signaling between the entities described above may be implemented via various media. E-UTRA or 5G NR will be described as an example. As a matter of course, the embodiment is not limited thereto.

(Communication Control Device-to-Communication Device Signaling)

A notification from the communication device (for example, the base station 40 and the intermediate device 50) to the communication control device 60 may be performed, for example, in an application tier. For example, the notification may be performed using a hyper text transfer protocol (HTTP). Signaling may be performed by describing the required parameters in a message body of the HTTP according to a predetermined manner. Furthermore, in the case of using the HTTP, a notification from the communication control device 60 to the communication device is also performed according to an HTTP response mechanism.

(Communication Device-to-Terminal Signaling)

A notification from the communication device (for example, the base station 40 and the intermediate device 50) to the terminal device 30 may be performed by using, for example, at least some of radio resource control (RRC) signaling, system information (SI), or downlink control information (DCI). Further, the notification may be performed by using at least some of downlink physical channels (PDCCH: physical downlink control channel, PDSCH: physical downlink shared channel, and PBCH: physical broadcast channel).

A notification from the terminal device 30 to the communication device may be performed, for example, by using a part of radio resource control (RRC) signaling or uplink control information (UCI). In addition, the notification may be performed by using uplink physical channels (PUCCH: physical uplink control channel, PUSCH: physical uplink shared channel, and PRACH: physical random access channel).

The signaling is not limited to the physical tier signaling described above, and the signaling may be performed in a higher tier. For example, at the time of implementation at the application tier, signaling may be implemented by describing a required parameter in a message body of the HTTP according to a predetermined manner.

(Inter-Terminal Signaling)

As communication between the terminal device 30 and another terminal device 30, terminal-to-terminal communication, device-to-device (D2D), and vehicle-to-everything (V2X) are assumed. The terminal-to-terminal communication, D2D, and V2X may be performed using physical sidelink channels (PSCCH: physical sidelink control channel, PSSCH: physical sidelink shared channel, and PSBCH: physical sidelink broadcast channel).

When a target frequency channel for spectrum sharing is used in the sidelink, the communication parameter may be notified, acquired, and set in association with a resource pool for the sidelink in the target frequency channel. The resource pool is a radio resource for a sidelink set by a specific frequency resource (for example, a resource block, a component carrier, or the like) and a time resource (for example, a radio frame, a subframe, a slot, a mini-slot, or the like). In a case where the resource pool is set in the frequency channel to be subjected to spectrum sharing, the resource pool is set by at least one of RRC signaling from the communication device to the terminal device, system information, or downlink control information. Then, the communication parameters to be applied in the resource pool and the sidelink are also set by at least one of the RRC signaling, the system information, or the downlink control information from the communication device to the terminal device. The notification of the setting of the resource pool and the notification of the communication parameter to be used in the sidelink may be performed simultaneously or individually.

(Example of Signaling Procedure)

Figure 32:
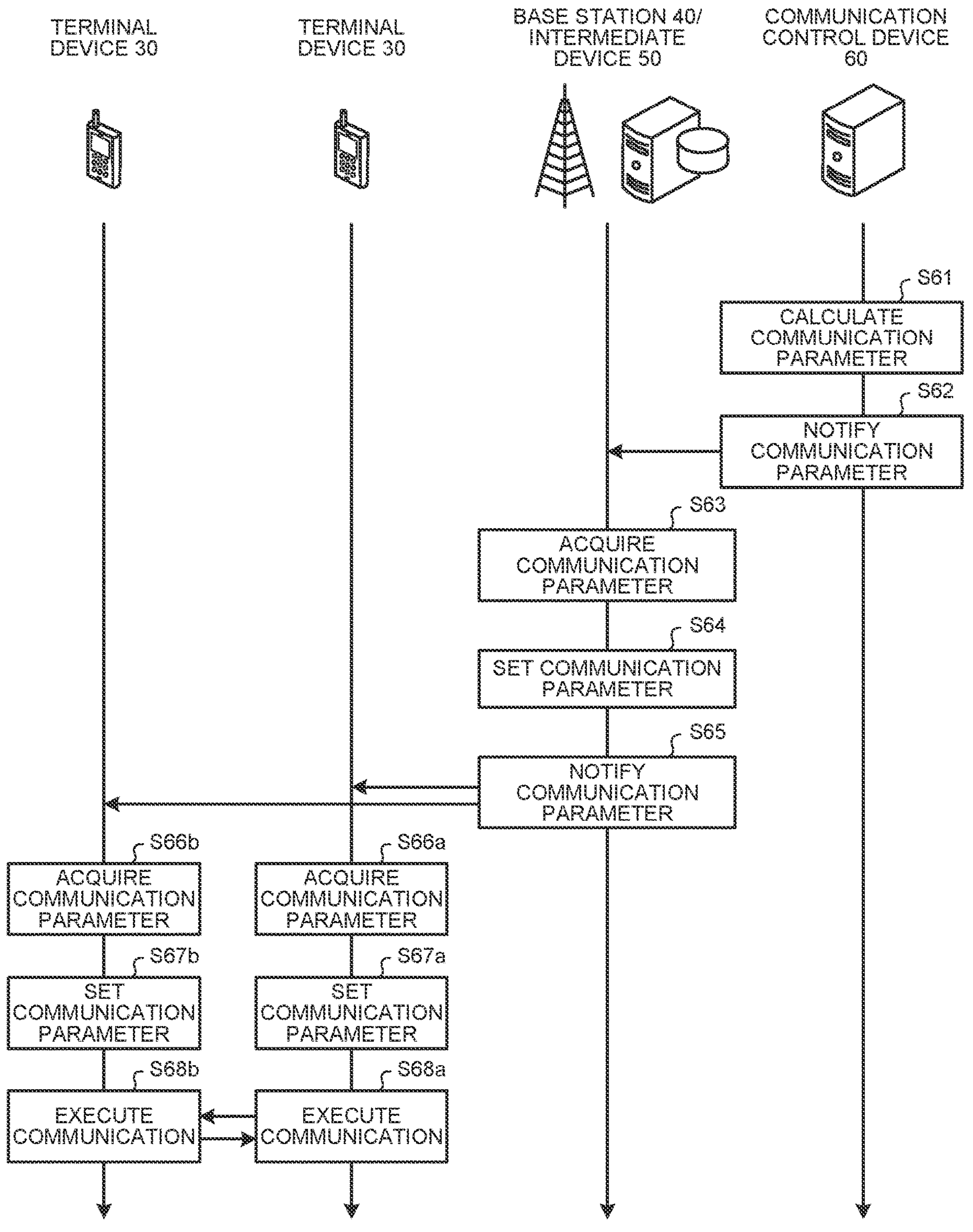
FIG. 32 is a diagram illustrating an example of a signaling procedure in a case where communication between the terminal devices is assumed as communication of the secondary system.

FIG. 32 is a diagram illustrating an example of a signaling procedure in a case where communication between the terminal devices 30 is assumed as communication of the secondary system. Hereinafter, the signaling procedure will be described with reference to FIG. 32.

The communication control device 60 calculates a communication parameter to be used by the communication device (the base station 40 or the intermediate device 50) of the secondary system (step S61). Then, the communication control device 60 notifies a communication device of the secondary system of the communication parameter (step S62). At this time, the communication device to which the communication parameter is notified from the communication control device 60 may be the base station 40 or the intermediate device 50. Furthermore, the communication device to which the communication parameter is notified from the communication control device 60 may be the terminal device 30. In the following description, it is assumed that the communication device to which the communication parameter is notified from the communication control device 60 is the base station 40.

The base station 40 acquires the communication parameter to be used by the communication device (the terminal device 30, the base station 40, or the intermediate device 50) of the secondary system from the communication control device 60 (step S63). Then, the base station 40 sets the communication parameter to be used by itself (step S64). Then, the base station 40 notifies its own subordinate communication device of the communication parameter to be used by the subordinate communication device (step S65). The subordinate communication device may be the terminal device 30 or another base station 40. In the following description, the subordinate communication device is assumed to be the terminal device 30.

The terminal device 30 acquires the communication parameter to be used by itself from the base station 40 (steps S66*a* and S66*b*). Then, the terminal device 30 sets the communication parameter to be used by itself (steps S67*a* and S67*b*). Then, the terminal device 30 communicates with another communication device (for example, another terminal device 30) of the secondary system (steps S68*a* and S68*b*).

<5-9. Representative Operation Flow>

Next, a representative operation flow related to interference control calculation will be described.

Figure 33:
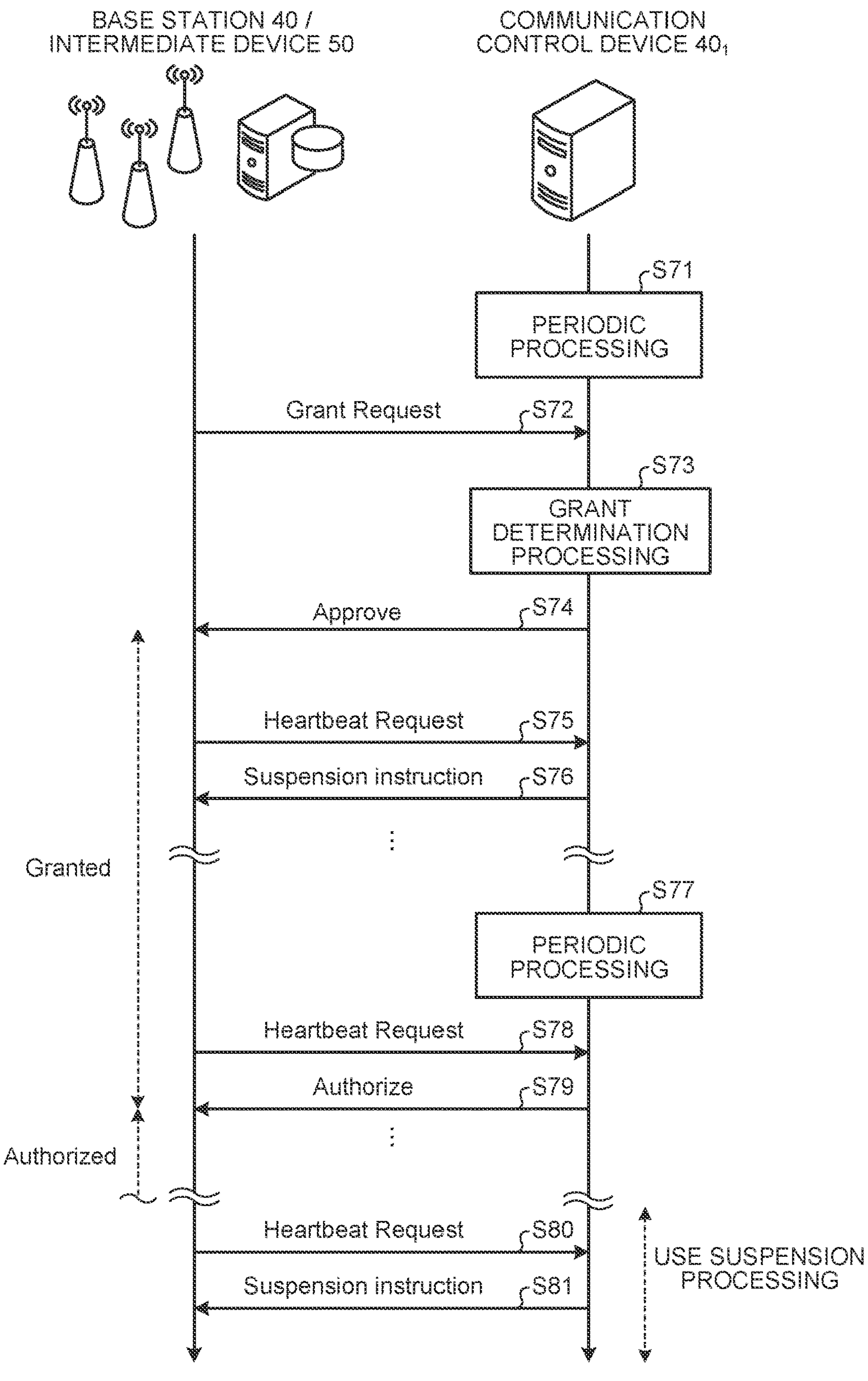
FIG. 33 is a sequence diagram illustrating an example of an operation related to a grant.

FIG. 33 is a sequence diagram illustrating an example of an operation related to grant. Specifically, FIG. 33 is a sequence diagram illustrating an operation of the communication system 2 corresponding to procedures of <5-3. Spectrum grant procedure> and <5-4. Spectrum use notification>. It is noted that the operation flow illustrated in FIG. 33 is merely an example, and changes variously depending on a state in which the base station 40, the communication control device 60, and the intermediate device 50 are placed.

First, the communication control device $60_1$ executes periodic processing at the execution timing of periodic processing (step S71). The periodic processing is processing of executing information synchronization between the communication control devices 60 and calculation related to primary system protection. The periodic processing is, for example, coordinated periodic activities among the SASs (CPAS) disclosed in Non Patent Literature 7 (WINNF-TS-0061) and Non Patent Literature 8 (WINNF-SSC-0008). In the following description, the periodic processing may be referred to as periodic protection calculation. An execution timing of the periodic processing is, for example, 24 hours after the previous execution of the periodic processing. Of course, the execution interval of the periodic processing is not limited to 24 hours.

Figure 34:
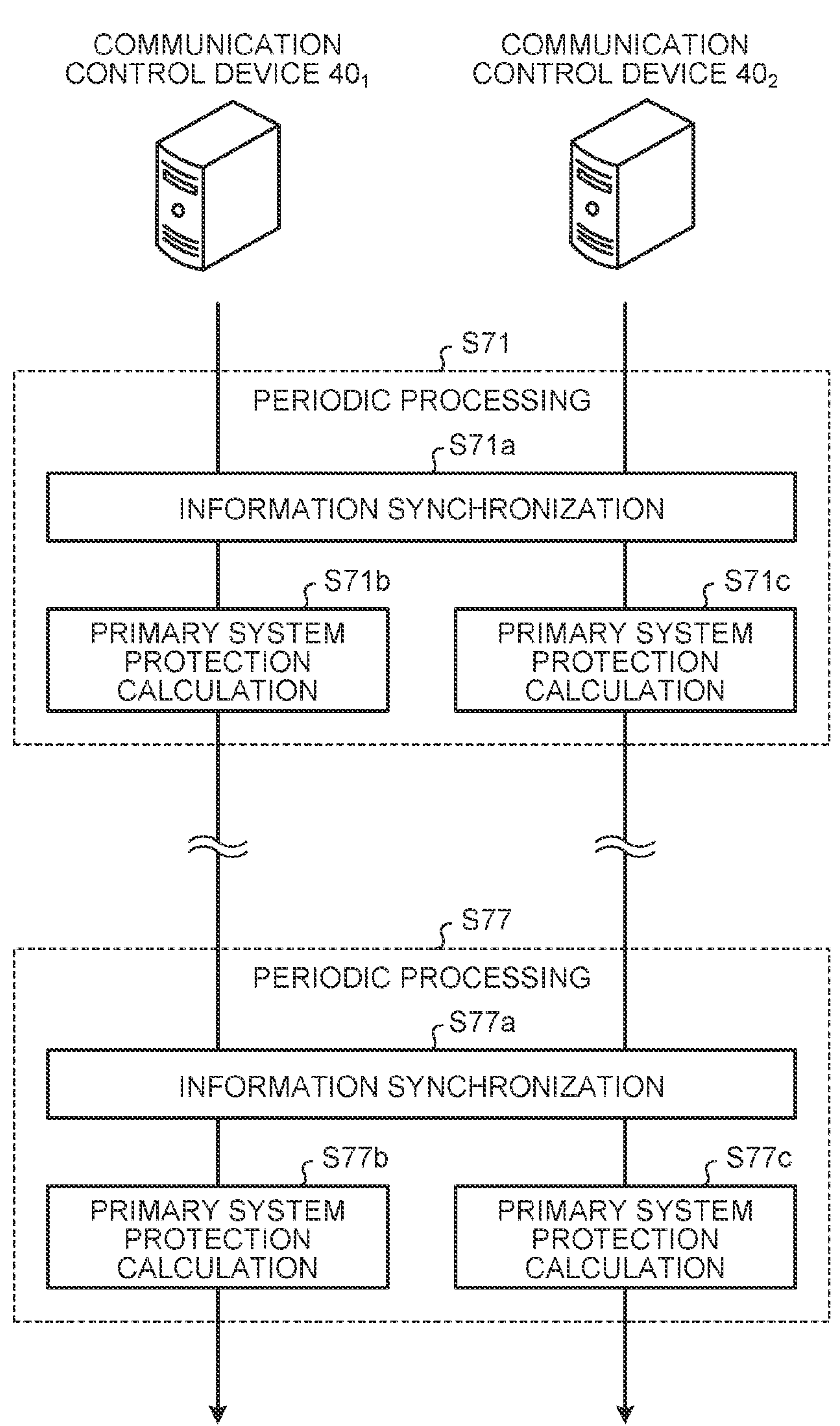
FIG. 34 is a diagram illustrating a specific processing content of periodic processing.

FIG. 34 is a diagram illustrating specific processing contents of the periodic processing. In the example of FIG. 34, the communication control device $60_1$ and the communication control device $60_2$ perform information synchronization and primary system protection calculation. Of course, the number of communication control devices 60 that perform the periodic processing (the information synchronization or the like) may be more than two.

As illustrated in FIG. 34, each of the plurality of communication control devices 60 executes the periodic processing (step S71). First, each of the plurality of communication control devices 60 synchronizes information with another communication control device 60 (step S71*a*). Then, each of the plurality of communication control devices 60 performs the primary system protection calculation (step S71*b* and step S71*c*). At this time, the communication control device 60 may calculate an estimated value of an interference amount, a residual interference margin, and the like that can be individually given to the primary system by each communication node (for example, the base station 40).

Referring back to FIG. 33, the base station 40 or the intermediate device 50 transmits a grant request to the communication control device $60_1$ (step S72). In the present embodiment, the base station 40 or the intermediate device 50 assigns, to the grant request, information on a use mode of a frequency resources (radio wave resources) allocated as a result of the grant request. For example, the base station 40 or the intermediate device 50 adds information indicating application and details of a grant to the grant request.

The communication control device $60_1$ acquires the grant request to which use mode information is added. The communication control device $60_1$ performs processing related to the frequency resources (that is, processing related to the grant) based on the use mode information (step S73). For example, the communication control device $60_1$ performs grant determination processing for allocating an available spectrum to the base station 40 based on the use mode information.

After allocating the spectrum, the communication control device $60_1$ transmits a grant response to the base station 40 or the intermediate device 50. In the example of FIG. 33, the communication control device 60, notifies the success of the grant request (approve illustrated in FIG. 33) as a grant response (step S74). The reception unit 442 of the base station 40 or the reception unit 542 of the intermediate device 50 receives the grant response from the communication control device $60_1$. Due to the success of the grant request, the grant state of the base station 40 transitions from idle to granted as illustrated in FIG. 29. The base station 40 performs setting of each unit based on the allocated grant.

Subsequently, the base station 40 or the intermediate device 50 transmits a heartbeat request to the communication control device $60_1$ (step S75). Then, the communication control device $60_1$ acquires the transmitted heartbeat request. Then, the communication control device $60_1$ transmits a heartbeat response.

It is noted that, in the example of FIG. 33, the grant allocated to the base station 40 has not passed through the periodic processing (for example, CPAS) yet. Therefore, in the example of FIG. 33, the communication control device $60_1$ cannot approve the start of the radio wave transmission. Therefore, the communication control device $60_1$ transmits a suspension instruction of radio wave transmission as the heartbeat response (step S75).

Thereafter, the base station 40 or the intermediate device 50 continues to transmit the heartbeat request at a heartbeat interval notified from the communication control device $60_1$. In response to the heartbeat request, the communication control device $60_1$ continues to transmit a suspension instruction of the radio wave transmission as the heartbeat response until the next periodic processing is completed.

When an execution timing of the periodic processing arrives, each of the plurality of communication control devices 60 including the communication control device $60_1$ executes the periodic processing (step S77). For example, as illustrated in FIG. 34, each of the plurality of communication control devices 60 synchronizes information with another communication control device 60 (step S77*a*). Then, each of the plurality of communication control devices 60 performs the primary system protection calculation (step S77*b* and step S77*c*). This protection calculation is an example of interference calculation in the present embodiment.

Subsequently, the base station 40 or the intermediate device 50 transmits the heartbeat request to the communication control device $60_1$ (step S78). Then, the communication control device $60_1$ acquires the transmitted heartbeat request. Then, the communication control device $60_1$ transmits the heartbeat response. At this time, since the grant allocated to the base station 40 has passed the periodic processing, the communication control device $60_1$ can approve the start of the radio wave transmission with respect to the base station 40 that has transmitted the heartbeat request. Therefore, the communication control device $60_1$ transmits success (authorize illustrated in FIG. 33) of the heartbeat response as the heartbeat response (step S78). Due to the success of the heartbeat request, the grant state of the base station 40 transitions from granted to authorized as illustrated in FIG. 29. The base station 40 performs radio communication by controlling the radio communication unit 41 based on the allocated grant.

As described above, the state of the grant (the state indicating the permission state of the radio wave transmission) transitions according to the result of the heartbeat procedure. Various purposes are defined in the heartbeat procedure, and one of the purposes is a radio wave suspension instruction of the base station 40 when a radio wave of an existing system (for example, a ship-based radar) in the same band is used. For example, when determining that an existing system such as the communication system 1 is using a radio wave, the communication control device 60 is required to stop radio waves of all the base stations 40 that can cause interference within a predetermined time (for example, within 300 seconds). At this time, since it is assumed that a push notification of a suspension instruction becomes complicated in implementation, the communication control device 60 may issue the radio wave suspension instruction using the heartbeat response. In the following description, processing, configured to cause the base station 40 to stop using the frequency resources and executed by the communication control device 60, is referred to as "frequency resource use suspension processing" or "grant suspension processing".

For example, the base station 40 or the intermediate device 50 transmits the heartbeat request to the communication control device $60_1$ (step S70). Then, the communication control device $60_1$ acquires the transmitted heartbeat request. Then, the communication control device $60_1$ determines whether a primary system such as the communication system 1 is using a radio wave. When determining that the primary system is using a radio wave related to a predetermined frequency resource, the communication control device $60_1$ transmits a suspension instruction of radio wave transmission as the heartbeat response (step S71). The base station 40 stops the transmission of the radio wave related to the predetermined frequency resource. As a result, the grant state of the base station 40 transitions from authorized to idle (or granted), as illustrated in FIG. 29. Alternatively, the grant state of the base station 40 transitions from granted to idle, as illustrated in FIG. 29.

6. Operation of Proposed System

Next, the operation of the communication system proposed in the present embodiment will be described using the operation of the communication control device 60 as an example.

In the present embodiment, when there are a plurality of different determination units in one communication control device 60, the communication control device 60 includes a plurality of response codes indicating processing results of the plurality of determination units in one response message returned to one communication device constituting the secondary system. Here, the communication device may be the base station 40 or the intermediate device 50.

Hereinafter, before describing the operation of the communication system of the present embodiment, a function of the communication control device 60 will be described.

6-1. Functional Configuration Example of Communication Control Device

Figure 35:
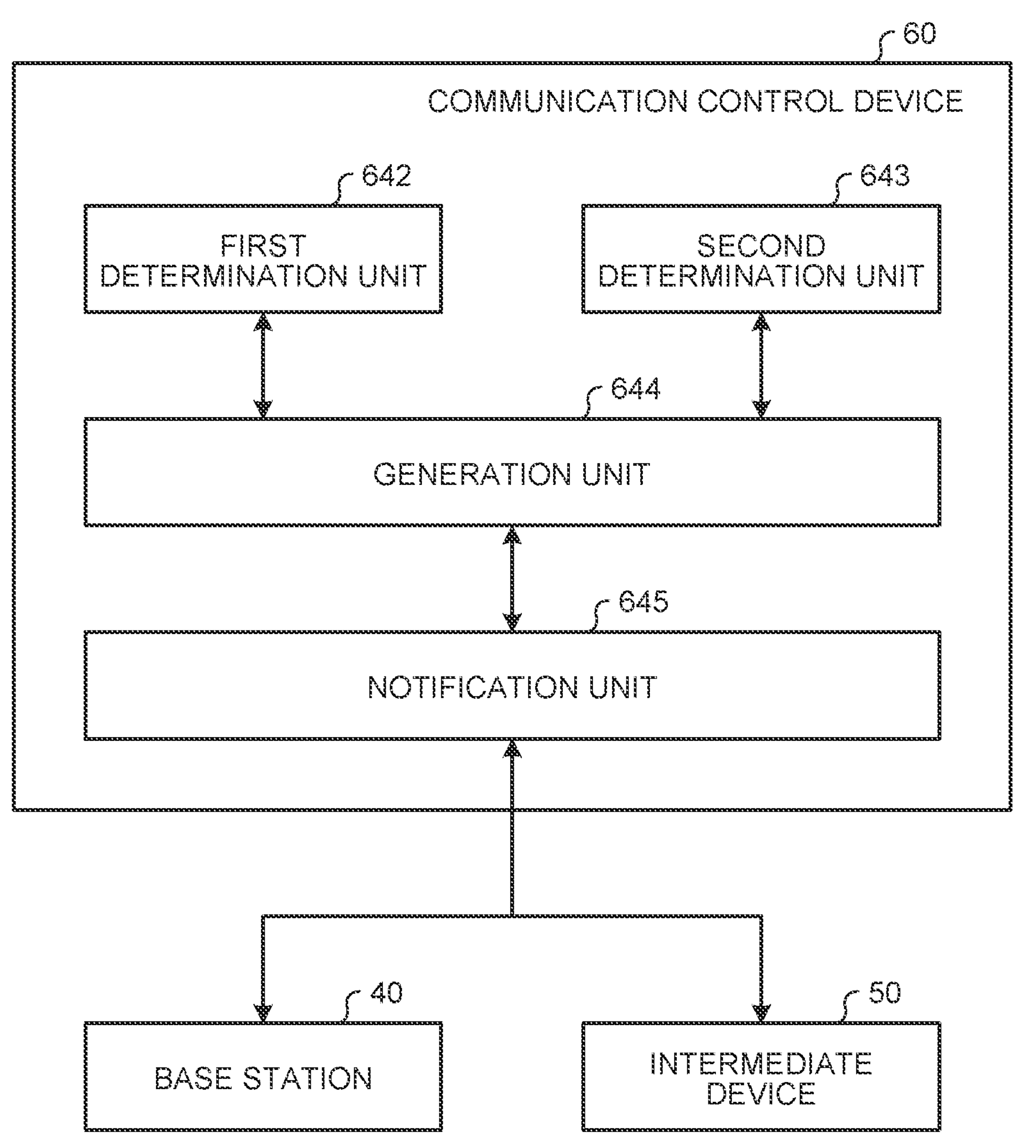
FIG. 35 is a diagram illustrating a function of the communication control device according to the present embodiment.

FIG. 35 is a diagram illustrating the function of the communication control device 60 according to the present embodiment. FIG. 35 illustrates a functional configuration example of the communication control device 60 according to the present embodiment. The communication control device 60 includes a plurality of different determination units. In the example of FIG. 35, the communication control device 60 includes the first determination unit 642, the second determination unit 643, the generation unit 644, and the notification unit 645.

The first determination unit 642 makes a determination related to a basic operation of the communication device (for example, the base station 40) included in the secondary system. For example, the first determination unit 642 processes information included in a basic zone in a request transmitted from the communication device to the communication control device 60. Here, the basic zone is, for example, a zone in which request information defined in advance with a standard such as the WINNF or the Wi-Fi Alliance is stored. In an example of the AFC system of the Wi-Fi Alliance, the basic zone is, for example, a zone in which information of an available spectrum inquiry request is stored.

The second determination unit 643 makes a determination related to an operation other than the basic operation extended by a vendor or the like. For example, the second determination unit 643 processes information on an extension zone in a request message transmitted from the communication device to the communication control device 60. The extension zone is, for example, a zone in which information other than the request information defined in advance in the standard such as the WINNF or the Wi-Fi Alliance is stored. In the example of the AFC system of the Wi-Fi Alliance, the extension zone is, for example, a zone in which a parameter uniquely defined by a vendor is stored.

It is noted that, although only one second determination unit 643 is illustrated in the example of FIG. 35, a plurality of configurations corresponding to the second determination unit 643 may be provided. For example, it is assumed that a plurality of pieces of information requiring different types of processing can be included in the extension zone. In this case, the communication control device 60 may include a plurality of the second determination units 643 for processing these pieces of information. In this case, the plurality of second determination units 643 can be rephrased as a second determination unit, a third determination unit, a fourth determination unit, . . . .

The generation unit 644 generates a response message to the communication device. Specifically, the generation unit 644 generates a response message according to determination of the first determination unit and determination of the second determination unit. In the example of FIG. 35, the generation unit 644 acquires a determination content (for example, a calculation result) and a response code indicating an outline of the determination content from each of the first determination unit 642 and the second determination unit 643. Alternatively, the generation unit 644 may acquire the determination content from each of the first determination unit 642 and the second determination unit 643, and generate a corresponding response code according to each determination content.

In the following description, a response code corresponding to the determination of the first determination unit 642 may be referred to as a first response code, and a response code corresponding to the determination of the second determination unit 643 may be referred to as a second response code. It is noted that, in a case where the communication control device 60 includes a plurality of second determination units 643, the generation unit 644 may store a plurality of second response codes in the response message. For example, in a case where the communication control device 60 includes a second determination unit, a third determination unit, and a fourth determination unit, the generation unit 644 may store, in the response message, a second response code, a third response code, and a fourth response code respectively corresponding to the second determination unit, the third determination unit, and the fourth determination unit. It is noted that a plurality of values can be used for each determination unit as the response code. The same value may be used between the determination units, or different values may be used therebetween.

The notification unit 645 transmits the response message generated by the generation unit 644 to the communication device. As described above, the response message includes the first response code corresponding to the determination of the first determination unit 642 and the second response code corresponding to the determination of the second determination unit 643. Therefore, in the present embodiment, the first response code is not overwritten with the second response code.

6-2. Configuration Example of Message

Next, a configuration example of a message (a request message and a response message) exchanged between the communication control device 60 and the communication device will be described. In the following description, the configuration example of the message will be described using the AFC system of the Wi-Fi Alliance as an example. As described above, the AFC system is an example of the communication control device 60.

FIG. 36 is a diagram illustrating a procedure included in the AFC system. It is noted that FIG. 36 is defined in Non Patent Literature 12 (AFC System to AFC Device Interface Specification).

In the AFC system, as illustrated in FIG. 36, two procedures of available spectrum inquiry (availableSpectrumInquiry) and vendor extension (vendorExtensions) are prepared. The available spectrum inquiry procedure is a procedure for the communication device to inquire of the communication control device 60 about the available spectrum. The vendor extension procedure is a procedure uniquely defined by a vendor. In the vendor extension procedure, a vendor can independently define a standalone message. Description of the vendor extension procedure will be omitted.

Hereinafter, a configuration example of the message will be described using the available spectrum inquiry procedure as an example. In the available spectrum inquiry procedure, an available spectrum inquiry request message is defined as the request message. Furthermore, in the available spectrum inquiry procedure, an available spectrum inquiry response message is defined as the response message.

6-2-1. Configuration Example of Request Message

First, the request message will be described.

(Configuration Example of Request Message)

FIG. 37 is a diagram illustrating a configuration example of the request message. FIG. 37 illustrates a configuration example of the available spectrum inquiry request message as a configuration example of the request message of the present embodiment. It is noted that FIG. 37 is defined in Non Patent Literature 12 (AFC System to AFC Device Interface Specification). In FIG. 37, "R" indicates required, and "O" indicates optional. Further, the request is a request related to secondary use of at least a part of the frequency band used by the primary system by the communication device constituting the secondary system. For example, the request may be a request for secondary use by the communication device constituting the secondary system.

As illustrated in FIG. 37, the available spectrum inquiry request message can store version information of a string type, available spectrum inquiry request (availableSpectrumInquiryRequests) information of an AvailableSpectrumInquiryRequest object array type, and vendor extension (vendorExtensions) information of a VendorExtension array type. In the following description, the vendor extension information may be simply referred to as extension information. It is noted that the extension information is not limited to the vendor extension information, and includes, for example, information independently extended by an organization different from the standard organization that defines the information on the basic zone.

(Configuration Example of Request Information)

FIG. 38 is a diagram illustrating a configuration example of the available spectrum inquiry request information. It is noted that FIG. 38 is defined in Non Patent Literature 12 (AFC System to AFC Device Interface Specification). In FIG. 38, "R" indicates required, "CR" indicates conditionally-optional, and "0" indicates optional.

As illustrated in FIG. 38, the available spectrum inquiry request information can store a request ID (requestId) of a string type, device descriptor (deviceDescriptor) information of a DeviceDescriptor object type, location information of a Location object type, inquiry frequency range (inquiredFrequencyRange) information of a FrequencyRange object array type, inquiry channel (inquiredChannels) information of a Channels object array type, minimum required power (minDesiredPower) information of a numerical type, and vendor extension (vendorExtensions) information of a VendorExtension array type. In the following description, the vendor extension information may be simply referred to as extension information. It is noted that the extension information is not limited to the vendor extension information, and includes, for example, information independently extended by an organization different from the standard organization that defines the information on the basic zone.

(Configuration Example of Vendor Extension Information)

FIG. 39 is a diagram illustrating a configuration example of vendor extension information. It is noted that FIG. 39 is defined in Non Patent Literature 12 (AFC System to AFC Device Interface Specification). In FIG. 39, "R" indicates required.

As illustrated in FIG. 39, the vendor extension information can store an extension ID (extensionId) of a string type, device descriptor (deviceDescriptor) information of a DeviceDescriptor object type, and a parameter (parameters) of any type. In the following description, a parameter included in the vendor extension information may be referred to as an extension parameter.

(Information on Extension Zone)

As described above, in the present embodiment, the communication device can include the information on the extension zone in addition to the information on the basic zone in the request message to the communication control device. In the above-described example, the information on the basic zone is the available spectrum inquiry request information, and the information on the extension zone is the vendor extension information. Hereinafter, the information on the extension zone will be described with reference to a description example of the request message.

FIG. 40 is a diagram illustrating a description example of the available spectrum inquiry request message. Specifically, FIG. 40 illustrates an available spectrum inquiry request message in a JSON format. In the example of FIG. 40, a zone B1 is a basic zone, and a zone E1 is an extension zone. In the example of FIG. 40, the available spectrum inquiry request information of the AvailableSpectrumInquiryRequest object array type is described in the basic zone, and the vendor extension information of the VendorExtension object array type is described in the extension zone.

FIG. 41 is a diagram illustrating another description example of the available spectrum inquiry request message. Similarly to the example of FIG. 40, FIG. 41 is a representation of the available spectrum inquiry request message in the JSON format. In the example of FIG. 41, a zone excluding a zone E2 in a zone B2 is a basic zone. In the example of FIG. 41, the zone E2 is an extension zone. It is noted that, in the example of FIG. 40, the available spectrum inquiry request information and the vendor extension information exist separately in the request message. However, in the example of FIG. 41, the vendor extension information exists as option information of the available spectrum inquiry request information.

In a case where the request message illustrated in FIG. 40 or FIG. 41 is received, in the communication control device 60, information on the basic zone is processed by the first determination unit 642, and information on the extension zone is processed by the second determination unit 643. It is noted that, since the VendorExtension object is of an array type, a plurality of pieces of extension information can be described in the extension zone. In the example of FIG. 40, extension information is described in each of a zone E11 and a zone E12 in the extension zone. In the example of FIG. 41, extension information is described in each of a zone E21 and a zone E22 in the extension zone.

In the case of the examples of FIGS. 40 and 41, the second determination unit 643 of the communication control device 60 processes each of the two pieces of extension information. At this time, a plurality of second determination units 643 may be prepared in the communication control device 60, and the plurality of second determination units 643 may be caused to process different extension information. In this case, the plurality of second determination units 643 can be rephrased as a second determination unit, a third determination unit, . . . .

(Specific Example of Information on Extension Zone)

An example of the information on the extension zone processed by the second determination unit 643 includes the request/notification described in <5. Description of various procedures>. Currently, in the specification of the AFC system formulated by the Wi-Fi Alliance (Non Patent Literature 12: AFC System to AFC Device Interface Specification), only the available spectrum inquiry procedure is defined as a procedure related to the basic operation of the communication device (AFC device), as illustrated in FIG. 36. This corresponds to <5-2. Available spectrum inquiry procedure> among the procedures described in <5. Description of various procedures>. Therefore, when the communication control device 60 is the AFC system, the information on the extension zone may be the request/notification described in the description of the procedure other than <5-2. Available spectrum inquiry procedure> among the procedures described in <5. Description of various procedures>. For example, the information on the extension zone may be the registration request described in <5-1. Registration procedure> or the spectrum grant request described in <5-3. Spectrum grant procedure>. In addition, the information on the extension zone may be the spectrum use notification (the heartbeat request) described in <5-4. Spectrum use notification>. Of course, the information on the extension zone may be a request/notification other than the above descriptions.

6-2-2. Configuration Example of Response Message

First, the response message will be described.

(Configuration Example of Response Message)

FIG. 42 is a diagram illustrating a configuration example of the response message. FIG. 42 illustrates a configuration example of the available spectrum inquiry response message as the configuration example of the response message of the present embodiment. It is noted that FIG. 42 is defined in Non Patent Literature 12 (AFC System to AFC Device Interface Specification). In FIG. 42, "R" indicates required, and "O" indicates optional.

As illustrated in FIG. 42, the available spectrum inquiry response message can store version information of a string type, available spectrum inquiry response (availableSpectrumInquiryResponses) information of an AvailableSpectrumInquiryResponses object array type, and vendor extension (vendorExtensions) information of a VendorExtension array type.

(Configuration Example of Response Information)

FIG. 43 is a diagram illustrating a configuration example of the available spectrum inquiry response information. It is noted that FIG. 43 is defined in Non Patent Literature 12 (AFC System to AFC Device Interface Specification). In FIG. 43, "R" indicates required, "CR" indicates conditionally-optional, and "0" indicates optional.

As illustrated in FIG. 43, the available spectrum inquiry response information can store a request ID (requestId) of a string type, available spectrum information (availableFrequencyInfo) of an AvailableFrequencyInfo object array type, available channel information (availableChannelInfo) of an AvailableChannelInfo object array type, available expire time (availabilityExpireTime) information of a string type, response information of a Response object type, and vendor extension (vendorExtensions) information of a VendorExtension array type.

(Configuration Example of Vendor Extension Information)

It is noted that the configuration of the vendor extension information is similar to the configuration illustrated in FIG. 39. As illustrated in FIG. 39, the vendor extension information can store an extension ID (extensionId) of a string type, device descriptor (deviceDescriptor) information of a DeviceDescriptor object type, and a parameter (parameters) of any type. In a case where the extension information is included in the request message from the communication device, the communication control device 60 stores the vendor extension information in the response message as a response thereof. In the following description, the vendor extension information may be simply referred to as extension information. It is noted that the extension information is not limited to the vendor extension information, and includes, for example, information independently extended by an organization different from the standard organization that defines the information on the basic zone.

(Specific Example of Response Code)

The communication control device 60 that has received the request from the communication device transmits a response code indicating an outline of a determination content together with the determination content (for example, a calculation result) for the request to the communication device. Hereinafter, a specific example of the response code will be described.

It is noted that, in a case where the request message includes the information on the extension zone in addition to the information on the basic zone, the communication control device 60 can cause the response message to include a response code (hereinafter, referred to as a second response code) for the information on the extension zone in addition to the response code (hereinafter, referred to as a first response code) for the information on the basic zone. In this case, the definition of a code group serving as a selection candidate of the first response code and the definition of a code group serving as a selection candidate of the second response code may be common or different from each other. For example, the definition of the code group serving as the selection candidate of the first response code and the definition of the code group serving as the selection candidate of the second response code may be the same as or different from the definition of a code group of a response code to be described below.

FIG. 44 is a diagram illustrating a specific example of the code group of the response code. It is noted that FIG. 44 is defined in Non Patent Literature 12 (AFC System to AFC Device Interface Specification). In the example of FIG. 44, a value indicated in an item of a response code value is a response code, and a character string indicated in an item of a name is a name attached to the response code.

The response code "GENERAL FAILURE" represents an unspecified failure. The response code value is −1. The response code "SUCCESS" indicates that the request has been processed normally. The response code value is 0. The response code "VERSION_NOT_SUPPORTED" indicates that the version described in the message is not supported. The response code value is 100. The response code "DEVICE_DISALLOWED" indicates that the communication device is not permitted to operate under the communication control device 60. The response code value is 101. The response code "MISSING_PARAM" indicates that a required field is not included in the request. The response code value is 102. The response code "INVALID VALUE" indicates that an invalid value is included in the field. The response code value is 103. The response code "UNEXPECTED_PARAM" indicates that an unknown parameter is found or a conditional parameter does not meet a condition. The response code value is 106. The response code "UNSUPPORTED_SPECTRUM" indicates that a spectrum range designated in the available spectrum inquiry request is out of support. The response code value is 300.

It is noted that the definition of the response code described above is merely an example, and the definition of the response code actually used may be different from the definition of the response code described above.

(Regarding Response)

In the present embodiment, the communication control device 60 can cause the response message to the communication device to include a response (hereinafter, referred to as a first response) to the determination of the first determination unit 642 and a response (hereinafter, referred to as a second response) to the determination of the second determination unit 643. Here, the first response is, for example, the available spectrum inquiry response information, and the second response is the vendor extension information. The first response includes, for example, the first response code indicating determination contents of the first determination unit 642 and an outline thereof. The second response includes, for example, the second response code indicating determination contents of the second determination unit 643 and an outline thereof. Hereinafter, the first response and the second response will be described with reference to a description example of the response message.

FIG. 45 is a diagram illustrating the description example of the available spectrum inquiry response message. Specifically, FIG. 45 is a representation of the available spectrum inquiry response message in the JSON format. In the example of FIG. 45, a zone R11 is a zone in which the response (the first response) to the information on the basic zone is described, and a zone R21 is a zone in which the response (the second response) to the information on the extension zone is described. In the example of FIG. 45, the available spectrum inquiry response information of the AvailableSpectrumInquiryResponses object array type is described in the zone R11, and the vendor extension information of the VendorExtension object array type is described in the zone R21.

FIG. 46 is a diagram illustrating another description example of the available spectrum inquiry response message. Similarly to the example of FIG. 45, FIG. 46 is a representation of the available spectrum inquiry response message in the JSON format. In the example of FIG. 46, a zone excluding a zone R22 in a zone R12 is a zone in which the first response is described. Furthermore, in the example of FIG. 46, a zone excluding the zone R22 is a zone in which the second response is described. It is noted that, in the example of FIG. 45, the available spectrum inquiry response information and the vendor extension information exist separately in the response message. However, in the example of FIG. 46, the vendor extension information exists as option information of the available spectrum inquiry response information.

It is noted that, since the VendorExtension object is an array type, a plurality of pieces of extension information can be described in the zone R21 or the zone R22). In the example of FIG. 45, the vendor extension information is described in each of a zone R211 and a zone R212 in the zone R21. In the example of FIG. 46, the vendor extension information is described in each of a zone R221 and a zone R222 in the zone R22. As described above, the communication control device 60 can include a plurality of the second determination units 643. The zone R211 and the zone R212 illustrated in FIG. 45 store the determination (the determination content and the response code indicating the outline thereof) of the different second determination units 643. Similarly, the zone R221 and the zone R222 illustrated in FIG. 46 store the determination (the determination content and the response code indicating the outline thereof) of the different second determination units 643.

6-3. First Embodiment

Based on the above-described contents, a first embodiment will be described below. In the first embodiment, the communication control device 60 is, for example, the AFC system, and the communication device is, for example, the AFC device. For example, the communication device is the base station 40 having one or a plurality of subordinate terminal devices 30 or an intermediate device 50.

The operation of the communication control device 60 is divided into a case in which the information on the extension zone in the request message affects processing related to the information on the basic zone and a case in which the information on the extension zone does not affect the processing related to the information on the basic zone. Here, the case in which the information on the extension zone affects the processing related to the information on the basic zone is a case in which only the basic zone cannot be satisfied as a request if the extension zone does not exist. The case in which the information on the extension zone does not affect the processing related to the information on the basic zone is a case in which only the basic zone is satisfied as a request even if the extension zone does not exist.

6-3-1. Operation in Case of being Affected

First, a description will be given as to operations of the communication control device 60 and the communication device in a case where the information on the extension zone affects the processing related to the information on the basic zone.

(Operation of Communication Control Device)

As an example of a case in which the information on the extension zone affects the processing related to the information on the basic zone, there is a case in which the information on the extension zone is an extension parameter for the processing related to the information on the basic zone. For example, the information on the basic zone is the available spectrum inquiry request, and the information on the extension zone is an extension parameter used to calculate the available spectrum. An example of the extension parameter includes detailed arrangement information of an obstacle (for example, a building) that affect calculation of radio wave interference. In this case, the communication control device 60 may include only the first response in the response message without including the second response in the response message.

It is noted that even in a case where the information on the extension zone affects the processing related to the information on the basic zone, the communication control device 60 may include both the first response and the second response in the response message. In this case, both the first determination by the first determination unit 642 and the second determination by the second determination unit 643 may be determination related to the information on the basic zone.

At this time, the first determination unit 642 of the communication control device 60 performs the first determination based on the information on the basic zone without using the extension parameter. In a case where the request can be satisfied only with the information on the basic zone, the first determination unit 642 may make the first determination only based on the information on the basic zone. However, in a case where the request is not satisfied only with the information on the basic zone, the first determination unit 642 performs the first determination using the information on the basic zone under predetermined assumed information or an assumed condition. At this time, the communication control device may cause the response message to include the assumed information or the assumed condition used for the first determination. On the other hand, the second determination unit 643 of the communication control device 60 performs the second determination based on both the information on the basic zone and the extension parameter.

It is noted that, when the extension zone includes a plurality of pieces of extension information, the second determination unit 643 may determine each of the plurality of pieces of extension information.

Then, the generation unit 644 of the communication control device 60 generates a first response based on the first determination and a second response based on the second determination, and includes both the first response and the second response in the response message. The notification unit 645 of the communication control device 60 notifies the communication device (the base station 40 or the intermediate device 50) of the response message generated by the generation unit 644.

(Operation of Communication Device)

The communication device (the base station 40 or the intermediate device 50) performs communication control related to the secondary use of a radio wave of the communication device itself or the subordinate terminal device 30 based on the response message received from the communication control device 60. For example, as described above, it is assumed that both the first response and the second response are included in the response message, and both the first response and the second response include the determination related to the information on the basic zone. At this time, the communication device selects one of the first determination included in the first response and the second determination included in the second response according to a predetermined condition related to communication control, and performs communication control according to the selected determination. For example, the communication device performs the communication control according to a determination having a better condition between the first determination and the second determination. More specifically, the communication device performs the communication control according to a determination that can output more power or a determination that can use a wider frequency channel.

At this time, it is desirable that the communication device does not operationally use the extension parameter in accordance with the first determination, and operationally uses the extension parameter only in accordance with the second determination. That is, it is desirable that the communication device invalidates the extension parameter when determination is made to follow the first determination, and validates the extension parameter when determination is made to follow the second determination.

It is noted that the communication device may support both a case in which the information on the extension zone affects the processing related to the information on the basic zone and a case in which the information on the extension zone does not affect the processing related to the information on the basic zone. For example, the communication device performs the communication control based on the first response in a case where the information on the extension zone affects the processing related to the information on the basic zone, and performs the communication control based on the first response and the second response in a case where the information on the extension zone does not affect the processing related to the information on the basic zone.

6-3-2. Operation in Case of not being Affected

First, a description will be given as to operations of the communication control device 60 and the communication device in a case where the information on the extension zone does not affect the processing related to the information on the basic zone.

As an example of a case in which the information on the extension zone does not affect the processing related to the information on the basic zone, there is a case in which the information on the extension zone is a parameter that is not directly connected to the processing related to the information on the basic zone. For example, the information on the basic zone is the information of the available spectrum request, and the information on the extension zone is a parameter that is not directly connected to the determination of the available spectrum inquiry request.

In addition, as another example of the case in which the information on the extension zone does not affect the processing related to the information on the basic zone, there is a case in which both the information on the basic zone and the information on the extension zone are requests selected from a plurality of requests related to the basic operation of the communication device.

At this time, the information on the basic zone may be a request selected from one or a plurality of first requests prepared for the communication device to secondarily use a frequency band. Furthermore, the information on the extension zone may be a request selected from one or a plurality of second requests prepared separately from the first request.

At this time, the first request may be a request related to the basic operation of the communication device. More specifically, the first request may be a request defined in advance as a request related to the basic operation of the communication device in a standard of a standard organization such as the Wi-Fi Alliance or the WINNF. For example, when the communication control device 60 is the AFC system defined by the Wi-Fi Alliance, the first request may be the available spectrum inquiry request. Furthermore, when the communication control device 60 is the SAS defined by the WINNF, the first request may be a request described in <5. Description of various procedures>. For example, the first request may be the registration request, the available spectrum inquiry request, the spectrum grant request, and the heartbeat request.

Furthermore, the second request may be a request independently defined by a vendor. For example, when the communication control device 60 is the AFC system defined by the Wi-Fi Alliance, the second request may be the request described in the description of the procedure other than <5-2. Available spectrum inquiry procedure> among the procedures described in <5. Description of various procedures>. For example, the second request may be the registration request, the spectrum grant request, and the heartbeat request. Furthermore, when the communication control device 60 is the SAS defined by the WINNF, the second request may be a request other than the above-described request. For example, the second request may be a request independently defined by a vendor other than the request described in <5. Description of various procedures>.

Of course, the first request and the second request are not limited to the above example. The first request and the second request may be appropriately changed according to a standard with which the communication device is compliant.

(Operation of Communication Control Device)

In a case where the information on the extension zone does not affect the processing related to the information on the basic zone, the first determination unit 642 of the communication control device 60 performs the first determination based on the information on the basic zone without using the information on the extension zone. On the other hand, the second determination unit 643 of the communication control device 60 performs the second determination based on the information on the extension zone without using the information on the basic zone. When a plurality of pieces of extension information is included in the extension zone, the second determination unit 643 may determine each of the plurality of pieces of extension information. It is noted that, when the information on the extension zone is affected by the information on the basic zone, the second determination unit 643 performs the second determination based on the information on the basic zone and the information on the extension zone.

Then, the generation unit 644 of the communication control device 60 generates a first response based on the first determination and a second response based on the second determination, and includes both the first response and the second response in the response message. The notification unit 645 of the communication control device 60 notifies the communication device (the base station 40 or the intermediate device 50) of the response message generated by the generation unit 644.

(Operation of Communication Device)

In a case where the first response includes a response code (hereinafter, referred to as a first response code) indicating that the processing related to the first determination is normally completed, but the second response includes a response code (hereinafter, referred to as a first response code) indicating that the processing related to the second determination is abnormally completed, retransmitting the information on the basic zone leads to an extra burden on the communication control device. Therefore, in a case where the first response includes a response code (for example, the response code "SUCCESS" illustrated in FIG. 44) indicating that the processing related to the first determination is normally completed, and the second response includes a response code (for example, a response code other than "SUCCESS" among the response codes illustrated in FIG. 44) indicating that the processing related to the second determination is abnormally completed, the communication device corrects the information on the extension zone, and then generates a request message including the corrected information on the extension zone. At this time, the communication device does not include the previously transmitted information on the basic zone in the request message. Then, the communication device retransmits a request message not including the information on the basic zone but including the corrected information on the extension zone to the communication control device 60.

At this time, when the extension zone of the request message includes a plurality of pieces of extension information, and only a part of the extension information includes a response code indicating abnormal completion, the communication device may correct only the extension information with abnormality. Then, the communication device may include corrected information on the extension zone in the request message without including the extension information without abnormality in the request message. Then, the communication device may retransmit, to the communication control device 60, the request message including the corrected extension information without including the information without abnormality (the information on the basic zone and the extension information without abnormality).

It is noted that, in a case where the first response code indicates that the processing related to the first determination is normally completed, the communication device may not retransmit the request to the communication control device 60 regardless of the content of the second response. For example, in a case where the second request is a request for which some omissions are allowed, such as the heartbeat request, the heartbeat request may be transmitted at a timing when a new first request is transmitted next. A processing delay can be prevented.

It is noted that the communication device may support both a case in which the information on the extension zone affects the processing related to the information on the basic zone and a case in which the information on the extension zone does not affect the processing related to the information on the basic zone. For example, the communication device performs the communication control based on the first response in a case where the information on the extension zone affects the processing related to the information on the basic zone, and performs the communication control based on the first response and the second response in a case where the information on the extension zone does not affect the processing related to the information on the basic zone.

6-3-3. Regarding Response Code

The first response code is basically selected from a code group defined for the first determination unit 642. Therefore, when a request (hereinafter, referred to as an extension request) used only as the information on the extension zone is defined, it is considered that it is not advisable in the future to increase a code of the code group for the first response code as a response code to be used as a response to the extension request. This is because the function of the first determination unit 642 may be expanded by specification revision or the like and a new response code may be required.

Therefore, when the extension request is defined, the code group of the second response code is set as a code group newly defined for the extension request. For example, it is assumed that a first response includes a first determination content for a first request and a first response code indicating an outline of the first determination content, and a second response includes a second determination content for a second request and a second response code indicating an outline of the second determination content. At this time, the generation unit 644 of the communication control device 60 selects the first response code and the second response code from code groups having different definitions.

As a result, the communication control device 60 can perform the same processing when an extension parameter is provided simply as an extension with respect to a basic zone of a certain request and when an extension parameter is provided through a request including only an extension zone.

6-3-4. Sequence Example

Figure 47:
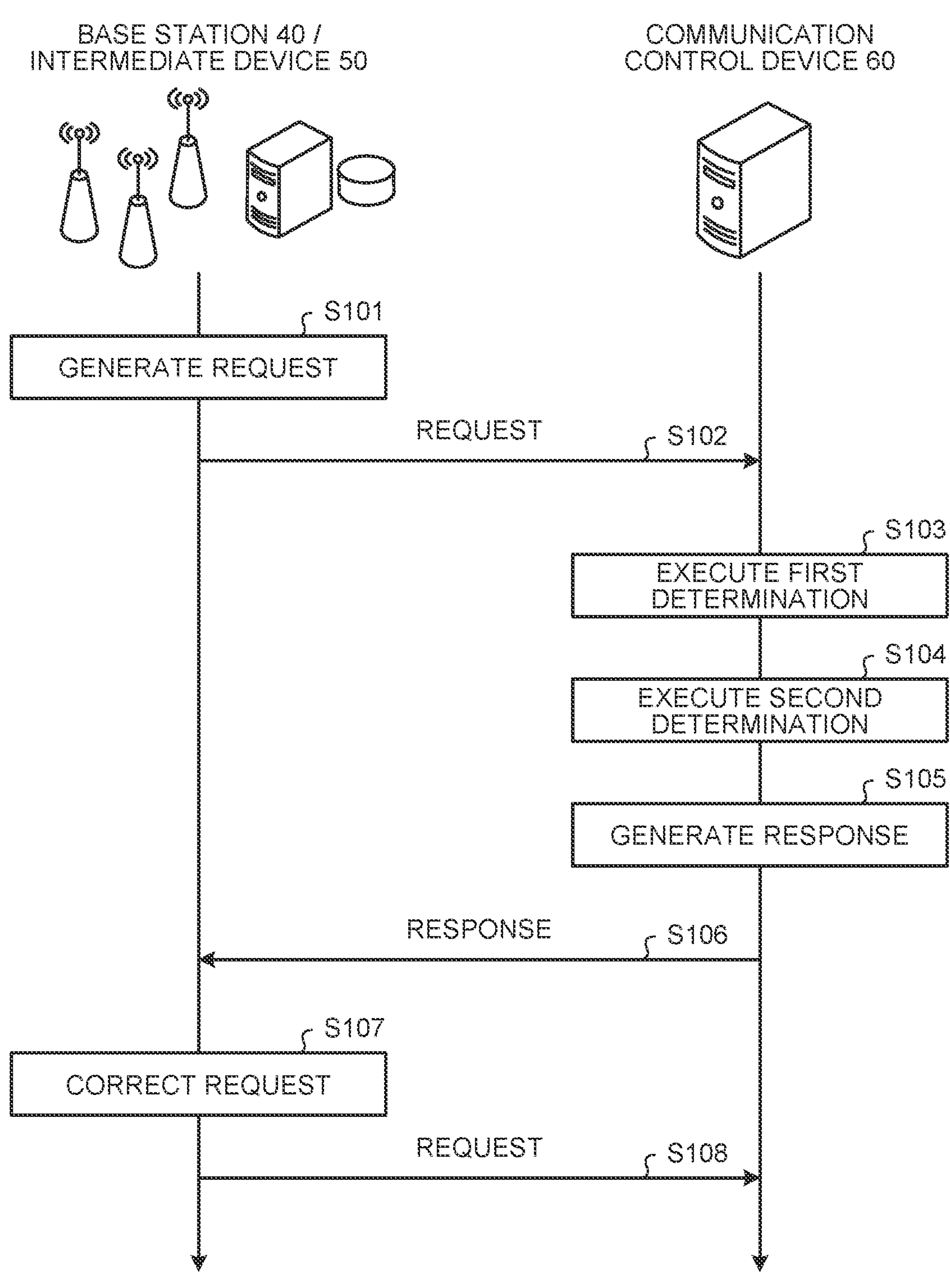
FIG. 47 is a sequence diagram illustrating an operation according to a first embodiment of the present disclosure.

Although the operations of the communication control device 60 and the communication device (the base station 40 and the intermediate device 50) have been described above, a sequence example of the operations of the communication control device 60 and the communication device according to the first embodiment will be described below. FIG. 47 is a sequence diagram illustrating an operation according to the first embodiment of the present disclosure.

First, the communication device (the base station 40 and the intermediate device 50) constituting the secondary system generates a request message to the communication control device 60 (step S101). The request message includes information on a basic zone and information on an extension zone. The information on the basic zone is, for example, available spectrum inquiry request information, and the information on the extension zone is, for example, vendor extension information. Then, the transmission unit (the transmission unit 441 of the base station 40 and the transmission unit 541 of the intermediate device 50) of the communication device transmits the generated request message to the communication control device 60 (step S102).

The communication control device 60 acquires the request message from the communication device. Then, the communication control device 60 executes a first determination related to the information on the basic zone (step S103). Furthermore, the communication control device 60 executes a second determination related to the information on the extension zone (step S104). Then, the communication control device 60 generates a response message to the communication device (step S105). The response message includes a first response corresponding to the first determination and a second response corresponding to the second determination. Then, the communication control device 60 transmits the generated response message to the communication device (step S106).

The reception unit of the communication device (the reception unit 442 of the base station 40 and the reception unit 542 of the intermediate device 50) receives the response message from the communication device. Then, the communication device checks a response code each of the first response and the second response. The communication device corrects the request message generated in step S101 as necessary (step S107). For example, in a case where the first response code included in the first response indicates the normal completion of the processing and the second response code included in the second response indicates the abnormal completion of the processing, the communication device corrects the information on the extension zone based on a content of the second response. At this time, the communication device may not include the information on the basic zone in the request message, and may include only the corrected information on the extension zone. Then, the communication device retransmits the corrected request message to the communication control device 60 (step S108).

As described above, the communication control device 60 according to the first embodiment transmits the response message including the first response corresponding to the first determination and the second response corresponding to the second determination to the communication device. This can prevent the first response code from being overwritten with the second response code. As a result, for example, the communication device can recognize abnormality information in the basic zone and abnormality information in the extension zone separately. As a result, the communication device can effectively perform a procedure of retransmitting only the extension information described in the extension zone without retransmitting the request described in the basic zone.

6-4. Second Embodiment

In the first embodiment, the AFC system defined by the Wi-Fi Alliance has been described as an example, but in a second embodiment, the CBRS defined by the WINNF will be described as an example. In the second embodiment, the communication control device 60 is the SAS, and the communication device is, for example, the CBSD.

In the CBRS, a coexistence manager (CxM: Coexistence Manager) is defined. Allocation of a frequency band is performed so that the CxM reduces interference between a general authorized access tier and the CBSD, and coexistence of the general authorized access tier is determined. The CxM can be implemented as a function of the SAS. Therefore, in the second embodiment, it is assumed that the communication control device 60 is the SAS in which the CxM is mounted. Then, a first determination unit performs conventional SAS processing, and a second determination unit performs CxM processing.

Figure 48:
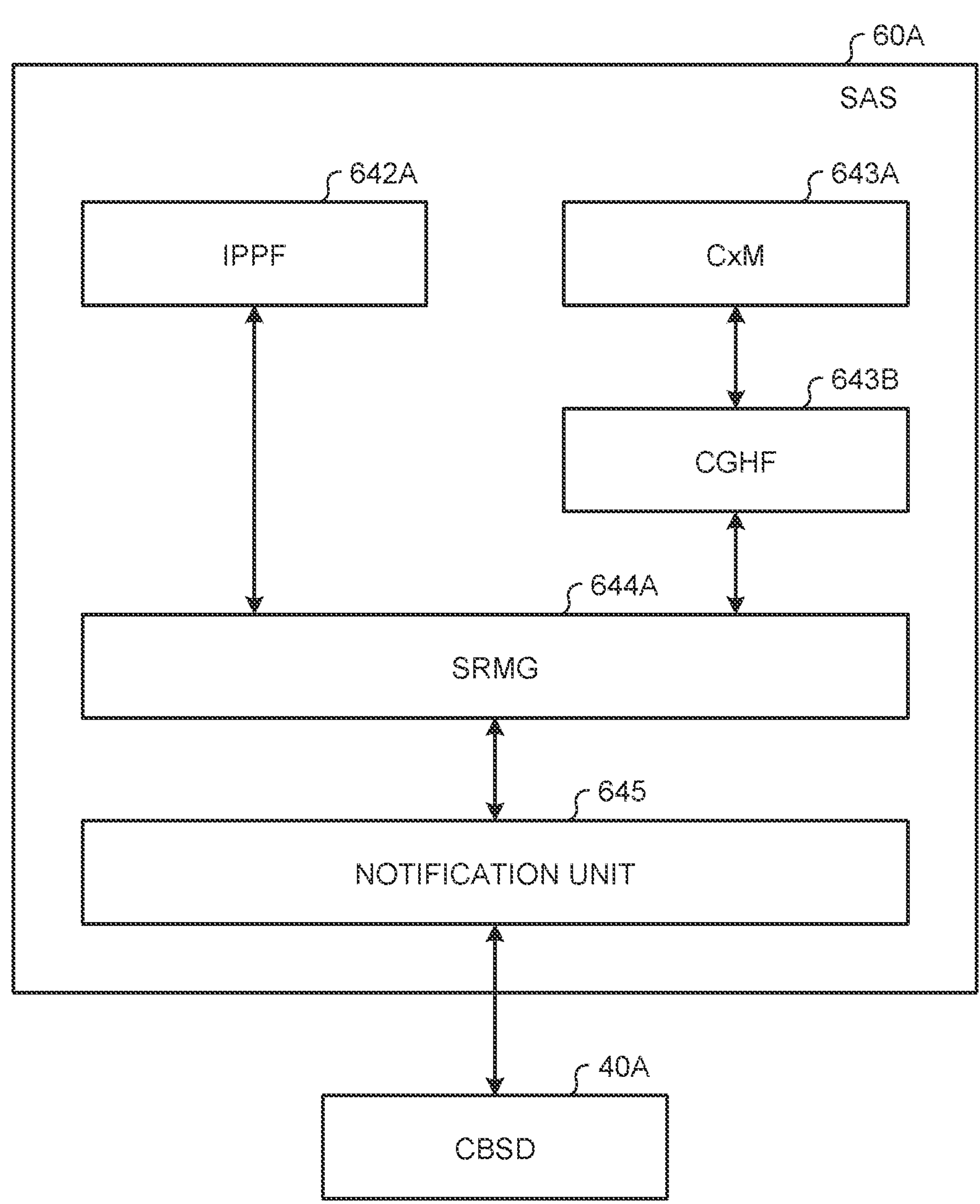
FIG. 48 is a diagram illustrating a configuration example of SAS according to a second embodiment.

FIG. 48 is a diagram illustrating a configuration example of the SAS 60A according to the second embodiment. In the example of FIG. 48, the communication control device 60 is an SAS 60A, and the communication device is a CBSD 40A.

As illustrated in FIG. 48, the SAS 60A includes an Incumbent/PAL protection function (IPPF) 642A, a CxM 643A, a CBSD group handling function (CGHF) 643B, an SAS response massage generator (SRMG) 644A, and the notification unit 645. The IPPF 642A corresponds to the first determination unit 642 in FIG. 35. The CxM 643A corresponds to the second determination unit 643 in FIG. 35. The SRMG 644A corresponds to the generation unit 644 in FIG. 35. The SAS 60A determines a request for use of a frequency band from the CBSD 40A which is an example of the base station 40.

The IPPF 642A is a functional block that determines use of a frequency band based on protection of an incumbent tier (Incumbent) or a priority access tier (PAL). The IPPF 642A generates a first response corresponding to a first determination. The first response may include a first response code.

The CxM 643A is referred to as a coexistence manager (CxM), and is an entity having a manager function that is responsible for coexistence between base stations of a general authorized access (GAA) tier or between base stations of a priority access tier. The CxM 643A generates a second response corresponding to a second determination. This second response can include a second response code, similar to the first response.

The CGHF 643B is a functional block that performs enhanced CBSD group handling introduced in Non Patent Literature 10 (WINNF-TS-3002).

The SRMG 644A is a functional block that generates a response message to the CBSD 40A. The SRMG 644A generates the response message including the first response generated by the IPPF 642A and the second response generated by the CxM 643A.

The notification unit 645 transmits the response message generated by the SRMG 644A to the CBSD 40A.

In the present embodiment as well, the SAS 60A transmits the response message including the first response corresponding to the first determination and the second response corresponding to the second determination to the CBSD 40A. Therefore, the first response code can be prevented from being overwritten with the second response code.

7. Modification

The above-described embodiments are examples, and various modifications and applications are possible.

7-1. Modification of Communication System

In general, in spectrum sharing, an existing system that uses a target band is referred to as a primary system, and a secondary user is referred to as a secondary system. However, the primary system and the secondary system may be replaced with different terms. A macro cell in a heterogeneous network (HetNET) may be the primary system, and a small cell or a relay station may be the secondary system. In addition, the base station may be the primary system, and relay user equipment (UE) or vehicle user equipment (UE) that implements D2D or vehicle-to-everything (V2X) existing in the coverage may be the secondary system. The base station is not limited to a fixed type, and may be a portable/mobile type.

Furthermore, an interface between the entities may be a wired interface or a radio interface. For example, the interface between the respective entities (the communication device, the communication control device, or the terminal device) appearing in the present embodiment may be a radio interface that does not depend on spectrum sharing. Examples of the radio interface that does not depend on spectrum sharing include a radio communication line provided by a mobile network operator via a licensed band, and wireless LAN communication using an existing license-exempt band.

7-2. Modification of Communication Control Device

The communication control device 60 of the present embodiment is not limited to the device described in the above-described embodiment. For example, the communication control device 60 may be a device having a function other than a function of controlling the base station 40 that secondarily uses a frequency band in which spectrum sharing is performed. For example, a network manager may have the function of the communication control device 60 of the present embodiment. At this time, the network manager may be, for example, a centralized base band unit (C-BBU) having a network configuration called a centralized radio access network (C-RAN) or a device including the C-BBU. Further, a base station (including an access point) may have the function of the network manager. These devices (the network manager and the like) can also be regarded as communication control devices.

Furthermore, in the above-described embodiment, the communication control device 60 is a device belonging to the communication system 2, but may not necessarily be a device belonging to the communication system 2. The communication control device 60 may be a device outside the communication system 2. The communication control device 60 may indirectly control the base station 40 via a device constituting the communication system 2 without directly controlling the base station 40. In addition, there may be a plurality of secondary systems (the communication systems 2). At this time, the communication control device 60 may manage a plurality of secondary systems. In this case, each secondary system may be considered as the second radio system.

7-3. Other Modifications

The control device that controls the radio wave use device 10, the management device 20, the terminal device 30, the base station 40, the intermediate device 50, or the communication control device 60 according to the present embodiment may be implemented by a dedicated computer system or a general-purpose computer system.

For example, a program for executing the above-described operation is stored and distributed in a computer-readable recording medium such as an optical disk, a semiconductor memory, a magnetic tape, or a flexible disk. Then, for example, the program is installed in a computer, and the above-described processing is executed to configure the control device. At this time, the control device may be a device (for example, a personal computer) outside the radio wave use device 10, the management device 20, the terminal device 30, the base station 40, the intermediate device 50, or the communication control device 60. Furthermore, the control device may be a device (for example, the control unit 13, the control unit 23, the control unit 34, the control unit 44, the control unit 54, or the control unit 64) inside the radio wave use device 10, the management device 20, the terminal device 30, the base station 40, the intermediate device 50, or the communication control device 60.

In addition, the communication program may be stored in a disk device included in a server device on a network such as the Internet so that the communication program can be downloaded to a computer. In addition, the above-described functions may be implemented by cooperation of an operating system (OS) and application software. In this case, a portion other than the OS may be stored in a medium and distributed, or a portion other than the OS may be stored in a server device and downloaded to a computer.

Further, among the pieces of processing described in the above embodiments, all or a part of the processing described as being performed automatically can be manually performed, or all or a part of the processing described as being performed manually can be automatically performed by a known method. In addition, the processing procedure, specific name, and information including various data and parameters illustrated in the document and the drawings can be freely and selectively changed unless otherwise specified. For example, the various types of information illustrated in each drawing are not limited to the illustrated information.

In addition, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in any unit depending on various loads, usage conditions, and the like.

In addition, the above-described embodiments can be appropriately combined in a region in which the processing contents do not contradict each other. For example, the first response message and the second response message may be transmitted as separate messages. In addition, the order of each step illustrated in the sequence diagram or the flowchart of the present embodiment can be changed as appropriate.

Furthermore, for example, the present embodiment can be implemented as any configuration constituting a device or a system, for example, a processor as a system large scale integration (LSI) or the like, a module using a plurality of processors or the like, a unit using a plurality of modules or the like, a set obtained by further adding other functions to a unit, or the like (that is, a configuration of a part of the device).

It is noted that, in the present embodiment, the system means a set of a plurality of components (devices, modules (parts), and the like), and it does not matter whether or not all the components are housed in the same housing. For example, a plurality of devices housed in separate housings and connected to each other via a network or the like, and one device in which a plurality of modules are housed in one housing are both “systems”.

Furthermore, for example, the present embodiment can adopt a configuration of cloud computing in which one function is shared and processed by a plurality of devices in cooperation via a network.

8. Conclusion

As described above, according to the embodiment of the present disclosure, the communication control device 60 acquires a request including the information on the basic zone and the information on the extension zone from the communication device (the base station 40 and the intermediate device 50). The communication control device 60 includes the first determination unit 642 that performs the first determination related to the information on the basic zone and the second determination unit 643 that performs the second determination related to the information on the extension zone. The communication control device 60 notifies the communication device configuring the secondary system of the first response corresponding to the first determination and the second response corresponding to the second determination by enclosing the first response and the second response in one message.

As a result, it is possible to prevent the first response code from being overwritten with the second response code, so that the communication device can recognize abnormality information in the basic zone and abnormality information in the extension zone separately. Therefore, the communication device can effectively perform a procedure of retransmitting only the extension information described in the extension zone without retransmitting the request described in the basic zone. As a result, the processing related to the secondary use of a frequency is smoothly performed, so that the effective use of radio wave resources is realized.

Although the embodiments of the present disclosure have been described above, the technical scope of the present disclosure is not limited to the above-described embodiments as it is, and various modifications can be made without departing from the gist of the present disclosure. In addition, components of different embodiments and modifications may be appropriately combined.

Furthermore, the effects of each embodiment described in the present specification are merely examples and are not limited, and other effects may be obtained.

It is noted that the present technology can also have the following configurations.

(1)

A communication control device comprising:

an acquisition unit configured to acquire a request to allow a communication device configuring a second radio system to secondarily use at least a part of a frequency band used by a first radio system, the request including information on at least one basic zone related to a basic operation of the communication device and information on at least one extension zone obtained by extending the basic zone;

a first determination unit configured to perform a first determination related to the information on the basic zone;

a second determination unit configured to perform a second determination related to the information on the extension zone; and a notification unit configured to notify the second radio system of a first response corresponding to the first determination and a second response corresponding to the second determination by enclosing the first response and the second response in one message.

(2)

The communication control device according to (1), wherein the request includes a plurality of pieces of the information on the extension zone, the second determination unit is configured to perform the second determination on each of the plurality of pieces of information on the extension zone, and the notification unit is configured to enclose a plurality of the second responses in the one message, wherein each of the second responses corresponds to a corresponding one of a plurality of the second determinations.

(3)

The communication control device according to (1) or (2), wherein the information on the extension zone is information that affects processing related to the information on the basic zone.

(4)

The communication control device according to any one of (1) to (3), wherein the information on the extension zone is an extension parameter for processing related to the information on the basic zone, the first determination and the second determination are both determinations related to the information on the basic zone, the first determination unit is configured to perform the first determination based on the information on the basic zone without using the extension parameter, and the second determination unit is configured to perform the second determination based on the information on the basic zone and the extension parameter.

(5)

The communication control device according to (1) or (2), wherein the information on the extension zone is information that does not affect processing related to the information on the basic zone.

(6)

The communication control device according to (1), (2) or (5), wherein the information on the extension zone is information included in an extension request selected from among a plurality of the extension requests that affect processing related to the basic operation of the communication device.

(7)

The communication control device according to (1), (2), (5) or (6), wherein the information on the basic zone is information included in a request selected from one or a plurality of first requests prepared for the communication device to secondarily use the frequency band, and the information on the extension zone is information included in a request selected from one or a plurality of second requests prepared separately from the first request.

(8)

The communication control device according to (7), wherein the first response includes a first response code indicating an outline of a first determination content for the first request, the second response includes a second response code indicating an outline of a second determination content for the second request, and the first response code and the second response code are response codes selected from code groups each having a different definition.

(9)

A communication device configuring a second radio system configured to secondarily use at least a part of a frequency band used by a first radio system, the communication device comprising:

a transmission unit configured to transmit, to a communication control device including an acquisition unit configured to acquire a request to allow the communication device to secondarily use the frequency band, the request including information on at least one basic zone related to a basic operation of the communication device and information on at least one extension zone obtained by extending the basic zone, a first determination unit configured to perform a first determination related to the information on the basic zone, a second determination unit configured to perform a second determination related to the information on the extension zone, and a notification unit configured to notify the second radio system of a first response corresponding to the first determination and a second response corresponding to the second determination by enclosing the first response and the second response in one message, the request including the information on the basic zone and the information on the extension zone; and a reception unit configured to receive the message in response to the request from the communication control device.

(10)

The communication device according to (9), further comprising a communication control unit configured to perform, based on the received message, communication control of the own or subordinate communication device.

(11)

The communication device according to (10), wherein the communication control unit is configured to perform, when the information on the extension zone affects processing related to the information on the basic zone, the communication control based on the first response, and to perform, when the information on the extension zone does not affect the processing related to the information on the basic zone, the communication control based on the first response and the second response.

(12)

The communication device according to (10) or (11), wherein the information on the extension zone is an extension parameter for processing related to the information on the basic zone, the first determination and the second determination are both determinations according to the processing related to the information on the basic zone, the communication control device is configured to perform the first determination based on the information on the basic zone without using the extension parameter, and to perform the second determination based on the information on the basic zone and the extension parameter, and the communication control unit is configured to select either the first determination or the second determination according to a predetermined condition related to the communication control, and to perform the communication control according to the selected determination.

(13)

The communication device according to any one of (9) to (11), wherein the information on the basic zone is information included in a request selected from one or a plurality of first requests prepared for the communication device to secondarily use the frequency band, and the information on the extension zone is information included in a request selected from one or a plurality of second requests prepared separately from the first request.

(14)

The communication device according to (13), wherein the first request is a request related to the basic operation of the communication device, and the second request is a request including only information that does not affect the basic operation.

(15)

The communication device according to (13) or (14), wherein the transmission unit is configured not to retransmit, when the first response indicates that processing related to the first determination is normally completed, the first request and the second request to the communication control device regardless of a content of the second response.

(16)

The communication device according to (13) or (14), wherein the transmission unit is configured to retransmit, when the first response indicates that processing related to the first determination is normally completed and the second response indicates that processing related to the second determination is abnormally completed, the second request that does not include the information on the basic zone but includes the information on the extension zone to the communication control device.

(17)

The communication device according to (13) or (14), wherein the transmission unit is configured to transmit the request including a plurality of pieces of the information on the extension zone to the communication control device, the communication control device is configured to perform the second determination for each of the plurality of pieces of information on the extension zone, and to enclose a plurality of the second responses in the one message, wherein each of the second responses corresponds to a corresponding one of a plurality of the second determinations, and the transmission unit is configured to retransmit, when the first response indicates normal completion of processing related to the first determination, and a part of the plurality of second responses indicates abnormal completion of processing related to the second determination, the second request that includes the information on the extension zone corresponding to the abnormal completion and does not include the information on the other extension zone and the information on the basic zone to the communication control device.

(18)

The communication device according to any one of (9) to (17), wherein the communication device is a base station having one or a plurality of terminal devices under control of the base station.

(19)

A communication control method comprising:

acquiring a request to allow a communication device configuring a second radio system to secondarily use at least a part of a frequency band used by a first radio system, the request including information on at least one basic zone related to a basic operation of the communication device and information on at least one extension zone obtained by extending the basic zone;

performing a first determination related to the information on the basic zone;

performing a second determination related to the information on the extension zone; and notifying the second radio system of a first response corresponding to the first determination and a second response corresponding to the second determination by enclosing the first response and the second response in one message.

(20)

A communication method executed by a communication device configuring a second radio system configured to secondarily use at least a part of a frequency band used by a first radio system, the communication method comprising:

transmitting, to a communication control device including an acquisition unit configured to acquire a request to allow the communication device to secondarily use the frequency band, the request including information on at least one basic zone related to a basic operation of the communication device and information on at least one extension zone obtained by extending the basic zone, a first determination unit configured to perform a first determination related to the information on the basic zone, a second determination unit configured to perform a second determination related to the information on the extension zone, and a notification unit configured to notify the second radio system of a first response corresponding to the first determination and a second response corresponding to the second determination by enclosing the first response and the second response in one message, the request including the information on the basic zone and the information on the extension zone; and receiving the message in response to the request from the communication control device.

REFERENCE SIGNS LIST

1, 2, 1000 COMMUNICATION SYSTEM
10 RADIO WAVE USE DEVICE
20 MANAGEMENT DEVICE
30 TERMINAL DEVICE
40 BASE STATION
40A CBSD
50 INTERMEDIATE DEVICE
60 COMMUNICATION CONTROL DEVICE
60A SAS
11 PROCESSING UNIT
12, 22, 32, 42, 52, 62 STORAGE UNIT
13, 23, 34, 44, 54, 64 CONTROL UNIT
21, 61 COMMUNICATION UNIT
31, 41, 51 RADIO COMMUNICATION UNIT
33 INPUT/OUTPUT UNIT
43, 53 NETWORK COMMUNICATION UNIT
311, 411 RECEPTION PROCESSING UNIT
312, 412 TRANSMISSION PROCESSING UNIT
313, 413 ANTENNA
441, 541 TRANSMISSION UNIT
442, 542 RECEPTION UNIT
641 ACQUISITION UNIT
642 FIRST DETERMINATION UNIT
642A IPPF
643 SECOND DETERMINATION UNIT
643A CxM
643B CGHF
644 GENERATION UNIT
644A SRMG
645 NOTIFICATION UNIT

The invention claimed is:

1. A communication control device, comprising:
an acquisition unit configured to acquire a request to allow a communication device configuring a second radio system to secondarily use at least a part of a frequency band used by a first radio system, the request including information on at least one basic zone related to a basic operation of the communication device and information on at least one extension zone obtained by extending the at least one basic zone;
a first determination unit configured to perform a first determination related to the information on the at least one basic zone;
a second determination unit configured to perform a second determination related to the information on the at least one extension zone; and
a notification unit configured to notify the second radio system of a first response corresponding to the first determination and a second response corresponding to the second determination by enclosing the first response and the second response in one message.

2. The communication control device according to claim 1, wherein
the request includes a plurality of pieces of information on the at least one extension zone including the information on the at least one extension zone,
the second determination unit is configured to perform the second determination on each of the plurality of pieces of information on the at least one extension zone, and
the notification unit is configured to enclose a plurality of second responses including the second response in the one message, wherein each of the second responses corresponds to a corresponding one of a plurality of second determinations including the second determination.

3. The communication control device according to claim 1, wherein the information on the at least one extension zone is information that affects processing related to the information on the at least one basic zone.

4. The communication control device according to claim 1, wherein
the information on the at least one extension zone is an extension parameter for processing related to the information on the at least one basic zone,
the first determination and the second determination are both determinations related to the information on the at least one basic zone,
the first determination unit is configured to perform the first determination based on the information on the at least one basic zone without using the extension parameter, and
the second determination unit is configured to perform the second determination based on the information on the at least one basic zone and the extension parameter.

5. The communication control device according to claim 1, wherein the information on the at least one extension zone is information that does not affect processing related to the information on the at least one basic zone.

6. The communication control device according to claim 1, wherein the information on the at least one extension zone is information included in an extension request selected from among a plurality of extension requests that affect processing related to the basic operation of the communication device.

7. The communication control device according to claim 1, wherein
the information on the at least one basic zone is information included in a first request selected from one or a plurality of first requests prepared for the communication device to secondarily use the frequency band, and
the information on the at least one extension zone is information included in a second request selected from one or a plurality of second requests prepared separately from the first request.

8. The communication control device according to claim 7, wherein
the first response includes a first response code indicating an outline of a first determination content for the first request,
the second response includes a second response code indicating an outline of a second determination content for the second request, and
the first response code and the second response code are response codes selected from code groups each having a different definition.

9. A communication device configuring a second radio system configured to secondarily use at least a part of a frequency band used by a first radio system, the communication device comprising:
a transmission unit configured to transmit, to a communication control device including an acquisition unit configured to acquire a request to allow the communication device to secondarily use the frequency band, the request including information on at least one basic zone related to a basic operation of the communication device and information on at least one extension zone obtained by extending the at least one basic zone, a first determination unit configured to perform a first determination related to the information on the at least one basic zone, a second determination unit configured to perform a second determination related to the information on the at least one extension zone, and a notification unit configured to notify the second radio system of a first response corresponding to the first determination and a second response corresponding to the second determination by enclosing the first response and the second response in one message, the request including the information on the at least one basic zone and the information on the at least one extension zone; and a reception unit configured to receive the message in response to the request from the communication control device.

10. The communication device according to claim 9, further comprising a communication control unit configured to perform, based on the received message, communication control of the own or subordinate communication device.

11. The communication device according to claim 10, wherein the communication control unit is configured to perform, when the information on the at least one extension zone affects processing related to the information on the at least one basic zone, the communication control based on the first response, and to perform, when the information on the at least one extension zone does not affect the processing related to the information on the at least one basic zone, the communication control based on the first response and the second response.

12. The communication device according to claim 10, wherein the information on the at least one extension zone is an extension parameter for processing related to the information on the at least one basic zone, the first determination and the second determination are both determinations according to the processing related to the information on the at least one basic zone, the communication control device is configured to perform the first determination based on the information on the at least one basic zone without using the extension parameter, and to perform the second determination based on the information on the at least one basic zone and the extension parameter, and the communication control unit is configured to select either the first determination or the second determination according to a predetermined condition related to the communication control, and to perform the communication control according to the selected determination.

13. The communication device according to claim 9, wherein the information on the at least one basic zone is information included in a first request selected from one or a plurality of first requests prepared for the communication device to secondarily use the frequency band, and the information on the at least one extension zone is information included in a second request selected from one or a plurality of second requests prepared separately from the first request.

14. The communication device according to claim 13, wherein the first request is a request related to the basic operation of the communication device, and the second request is a request including only information that does not affect the basic operation.

15. The communication device according to claim 13, wherein the transmission unit is configured not to retransmit, when the first response indicates that processing related to the first determination is normally completed, the first request and the second request to the communication control device regardless of a content of the second response.

16. The communication device according to claim 13, wherein the transmission unit is configured to retransmit, when the first response indicates that processing related to the first determination is normally completed and the second response indicates that processing related to the second determination is abnormally completed, the second request that does not include the information on the at least one basic zone but includes the information on the at least one extension zone to the communication control device.

17. The communication device according to claim 13, wherein the transmission unit is configured to transmit the request including a plurality of pieces of information on the at least one extension zone to the communication control device, the plurality of pieces of information on the at least one extension zone includes the information on the at least one extension zone, the communication control device is configured to perform the second determination for each of the plurality of pieces of information on the at least one extension zone, and to enclose a plurality of second responses including the second response in the one message, wherein each of the second responses corresponds to a corresponding one of a plurality of second determinations including the second determination, and the transmission unit is configured to retransmit, when the first response indicates normal completion of processing related to the first determination, and a part of the plurality of second responses indicates abnormal completion of processing related to the second determination, the second request that includes the information on the at least one extension zone corresponding to the abnormal completion and does not include the information on the other extension zone and the information on the at least one basic zone to the communication control device.

18. The communication device according to claim 9, wherein the communication device is a base station having one or a plurality of terminal devices under control of the base station.

19. A communication control method, comprising:

acquiring a request to allow a communication device configuring a second radio system to secondarily use at least a part of a frequency band used by a first radio system, the request including information on at least one basic zone related to a basic operation of the communication device and information on at least one extension zone obtained by extending the at least one basic zone;

performing a first determination related to the information on the at least one basic zone;

performing a second determination related to the information on the at least one extension zone; and notifying the second radio system of a first response corresponding to the first determination and a second response corresponding to the second determination by enclosing the first response and the second response in one message.

20. A communication method executed by a communication device configuring a second radio system configured to secondarily use at least a part of a frequency band used by a first radio system, the communication method comprising:

transmitting, to a communication control device including an acquisition unit configured to acquire a request to allow the communication device to secondarily use the frequency band, the request including information on at least one basic zone related to a basic operation of the communication device and information on at least one extension zone obtained by extending the at least one basic zone, a first determination unit configured to perform a first determination related to the information on the at least one basic zone, a second determination unit configured to perform a second determination related to the information on the at least one extension zone, and a notification unit configured to notify the second radio system of a first response corresponding to the first determination and a second response corresponding to the second determination by enclosing the first response and the second response in one message, the request including the information on the at least one basic zone and the information on the at least one extension zone; and receiving the message in response to the request from the communication control device.

* * * * *